(12) United States Patent
Takei et al.

(10) Patent No.: US 10,835,813 B2
(45) Date of Patent: Nov. 17, 2020

(54) GAME CONTROLLER

(71) Applicant: NINTENDO CO., LTD., Kyoto (JP)

(72) Inventors: Masaya Takei, Kyoto (JP); Shinta Minagawa, Kyoto (JP); Kazuhiro Maruyama, Kyoto (JP); Kohei Odanaka, Kyoto (JP)

(73) Assignee: NINTENDO CO., LTD., Kyoto (JP)

(*) Notice: Subject to any disclaimer, the term of this patent is extended or adjusted under 35 U.S.C. 154(b) by 0 days.

(21) Appl. No.: 16/377,734

(22) Filed: Apr. 8, 2019

(65) Prior Publication Data

US 2019/0358529 A1    Nov. 28, 2019

(30) Foreign Application Priority Data

May 25, 2018  (JP) ................... 2018-101076
May 25, 2018  (JP) ................... 2018-101077

(Continued)

(51) Int. Cl.
*A63F 13/24*       (2014.01)
*A63F 13/211*      (2014.01)
(Continued)

(52) U.S. Cl.
CPC ............ *A63F 13/24* (2014.09); *A63F 13/211* (2014.09); *A63F 13/219* (2014.09);
(Continued)

(58) Field of Classification Search
CPC ...... A63F 13/24; A63F 13/211; A63F 13/219; A63F 13/235; A63F 13/92; A63F 13/245; A63F 13/285; G06F 3/017; G06F 3/016
See application file for complete search history.

(56) References Cited

U.S. PATENT DOCUMENTS 5,491,462 A    2/1996   Cecchi et al.
8,192,285 B2*  6/2012   Cheng .................. A63F 13/02
                                                          463/37
(Continued)

FOREIGN PATENT DOCUMENTS

CN      107485852 A     12/2017
EP      2 112 641 A2    10/2009
(Continued)

OTHER PUBLICATIONS

Related U.S. Appl. No. 16/377,807, filed Apr. 8, 2019.
(Continued)

*Primary Examiner* — Robert T Clarke, Jr.
(74) *Attorney, Agent, or Firm* — Scully, Scott, Murphy & Presser, P.C.

(57) ABSTRACT

An example game controller includes a spherical housing, a joystick, an operation section, and a transmitter. The joystick protrudes from a surface of the spherical housing. The operation section includes an operation surface. The operation surface is capable of being depressed and is integral with the surface of the spherical housing. The transmitter transmits, to outside, information regarding an operation on the joystick and information regarding an operation on the operation section. Thus, it is possible to provide a game controller that allows for various types of operations.

39 Claims, 37 Drawing Sheets

(30) Foreign Application Priority Data

May 25, 2018 (JP) ................................ 2018-101078
May 25, 2018 (JP) ................................ 2018-101079

(51) Int. Cl.
*A63F 13/219* (2014.01)
*A63F 13/235* (2014.01)
*A63F 13/92* (2014.01)
*A63F 13/245* (2014.01)
*A63F 13/285* (2014.01)
*G06F 3/01* (2006.01)

(52) U.S. Cl.
CPC ............ *A63F 13/235* (2014.09); *A63F 13/92* (2014.09); *G06F 3/016* (2013.01); *G06F 3/017* (2013.01)

(56) References Cited

U.S. PATENT DOCUMENTS

| | | |
|---|---|---|
| 2004/0136682 A1 | 7/2004 | Watanabe |
| 2007/0281787 A1 | 12/2007 | Numata et al. |
| 2011/0034224 A1* | 2/2011 | Liu ................. A63F 13/812 463/3 |
| 2012/0252584 A1 | 10/2012 | Mitchell |
| 2017/0043478 A1 | 2/2017 | Blakely et al. |
| 2017/0070256 A1 | 3/2017 | Nakamura et al. |
| 2017/0348596 A1 | 12/2017 | Igarashi et al. |
| 2017/0354868 A1 | 12/2017 | Kaneko et al. |
| 2017/0354869 A1 | 12/2017 | Suetake et al. |
| 2017/0354871 A1 | 12/2017 | Okamura |
| 2017/0361222 A1 | 12/2017 | Tsuchiya et al. |
| 2018/0117762 A1 | 5/2018 | Earwood et al. |
| 2018/0188850 A1* | 7/2018 | Heath ................. G10H 1/344 |

FOREIGN PATENT DOCUMENTS

| | | |
|---|---|---|
| EP | 2 903 012 A1 | 8/2015 |
| JP | S51-155364 U | 12/1976 |
| JP | H10-293645 A | 11/1998 |
| JP | 2001-076590 A | 3/2001 |
| JP | 2005-339088 A | 12/2005 |
| JP | 2007-299706 A | 11/2007 |
| JP | 2008-113719 A | 5/2008 |
| JP | 2010-259597 A | 11/2010 |
| JP | 2014-239758 A | 12/2014 |
| JP | 2017-054686 A | 3/2017 |
| JP | 2017-147569 A | 8/2017 |
| JP | 2017-220185 A | 12/2017 |
| WO | 2008/139552 A1 | 11/2008 |

OTHER PUBLICATIONS

Related U.S. Appl. No. 16/377,791, filed Apr. 8, 2019.
Related U.S. Appl. No. 16/377,765, filed Apr. 8, 2019.
Anonymous, "The Pokeball Game Controller with Power Bank Makes You Like a Real Pokemon Trainer", https://gadgetsin.com/the-pokeball-game-controller-with-power-bank-makes-you-like-a-real-pokemon-trainer.htm, Aug. 21, 2016.
Official Action dated Dec. 6, 2018 received from the Japanese Patent Office in application JP 2018-101077 together with an English language translation.
Official Action dated Jan. 11, 2019 received from the Japanese Patent Office in application JP 2018-101079 together with an English language translation.

* cited by examiner

GAME CONTROLLER

CROSS REFERENCE TO RELATED APPLICATION

The disclosure of Japanese Patent Application Nos. 2018-101076, 2018-101077, 2018-101078 and 2018-101079, filed on May 25, 2018, is incorporated herein by reference.

FIELD

The present technique relates to a game controller.

BACKGROUND AND SUMMARY

There are conventional game controllers capable of transmitting information regarding an operation performed thereon to other apparatuses.

These game controllers only allow for button operations, and there has been room for improvement in allowing for various types of operations.

Therefore, the present application discloses a game controller that allows for various types of operations.

(1)
An example of a game controller described herein includes a spherical housing, a joystick, an operation section, and a transmitter. The joystick protrudes from a surface of the spherical housing. The operation section includes an operation surface. The operation surface is capable of being depressed and is integral with the surface of the spherical housing. The transmitter transmits, to outside, information regarding an operation on the joystick and information regarding an operation on the operation section.

With configuration (1) above, it is possible to use a game controller having a spherical outer shape to perform a direction input operation using the joystick. The user can use a game controller to perform both a direction input operation using the joystick and a depressing operation on the operation surface. Thus, it is possible to provide a game controller that allows for various types of operations.

(2)
The operation surface of the operation section may have a surface which forms a part of a spherical shape.

With configuration (2) above, the shape of the game controller as seen from outside can be made closer to a sphere.

(3)
The operation surface of the operation section may be at such a position that a straight line that passes through a center of the spherical housing and a center of the operation surface and a straight line that passes through the center of the spherical housing and a center of an operation surface of the joystick are substantially orthogonal to each other.

(4)
Where a direction in which a shaft portion of the joystick is tilted in order to give an up instruction is defined as an upward direction, the operation surface of the operation section may be at a position that crosses a straight line that extends in the upward direction from a center of the spherical housing.

(5)
Where a direction in which a shaft portion of the joystick is tilted in order to give an up instruction is defined as an upward direction, the operation surface of the operation section may be on an upward direction side relative to the joystick.

With any of configurations (3) to (5) above, the user can easily operate the joystick and the operation surface with two fingers (e.g., the thumb and the index finger) of one hand. Thus, it is possible to improve the operability of the game controller.

(6)
The operation surface of the operation section may be capable of being depressed in a direction substantially opposite to the upward direction.

With configuration (6) above, the operation surface can be configured so that it is easy for the user to depress.

(7)
The spherical housing may include a first hemispherical portion and a second hemispherical portion. The joystick may be positioned at a boundary between the first hemispherical portion and the second hemispherical portion. The operation surface of the operation section may be at an apex portion of the first hemispherical portion.

(8)
The transmitter may include an antenna. The antenna may be inside the first hemispherical portion.

(9)
The spherical housing may include: a hemispherical first housing part; and a hemispherical second housing part. The joystick may be positioned between the first housing part and the second housing part. The operation surface of the operation section may be at an apex portion of the first housing part.

(10)
The transmitter may include an antenna. The antenna may be inside the first housing part.

(11)
At least a portion of the operation surface of the operation section may be on a side of the joystick relative to a plane that includes the center of the spherical housing and is perpendicular to a direction extending from a center of an operation surface of the joystick to a center of the spherical housing.

(12)
The operation surface of the operation section may be at a position that crosses a straight line that passes through the center of the spherical housing and that is substantially orthogonal to a straight line that passes through a center of the spherical housing and a center of an operation surface of the joystick.

With any of configurations (7), (9), (11) and (12), the user can easily operate the joystick and the operation surface with two fingers (e.g., the thumb and the index finger) of one hand. Thus, it is possible to improve the operability of the game controller.

(13)
The transmitter may include an antenna. The antenna may be between a center of the spherical housing and the operation surface of the operation section.

(14)
The transmitter may include an antenna. A position of the antenna with respect to a direction parallel to a straight line that passes through a center of the spherical housing and a center of the operation surface of the operation section may be between a position of the center of the spherical housing with respect to the direction and a position of the operation surface with respect to the direction.

(15)
The transmitter may include an antenna. Where a direction in which a shaft portion of the joystick is tilted in order to give an up instruction is defined as an upward direction, the operation surface of the operation section may be on an upward direction side relative to the joystick. The antenna may be on the upward direction side relative to a center of the spherical housing. The operation surface of the operation section may be on the upward direction side relative to the antenna.

(16)

The transmitter may include an antenna. The game controller may include an electronic substrate. The electronic substrate may carry thereon a contact and the antenna, wherein the contact is configured to detect a depressing operation on the operation surface of the operation section.

(17)

The transmitter may include an antenna. The spherical housing may include a hemispherical housing part. The operation surface of the operation section may be on the hemispherical housing part. The antenna may be inside the hemispherical housing part.

(18)

The antenna may be on a side of the joystick relative to a plane that includes the center of the spherical housing and is perpendicular to a straight line passing through a center of the spherical housing and a center of an operation surface of the joystick.

(19)

The transmitter may include an antenna. The operation surface of the operation section may be in an upper end portion of the spherical housing. The joystick may be in a front end portion of the spherical housing. The antenna may be on a front side and on an upper side relative to a center of the spherical housing.

(20)

The transmitter may include an antenna. At least a portion of the antenna may be inside of a region having a fan shape of a circular region along a cross section that passes through a center of the operation surface of the operation section, a center of an operation surface of the joystick and a center of the spherical housing. The fan shape is defined by a radius extending between the center of the operation surface of the operation section and the center of the spherical housing and another radius extending between the center of the operation surface of the joystick and the center of the spherical housing, and the fan shape has a central angle that is a minor angle.

(21)

The operation surface of the operation section and a portion of a surface of the spherical housing that is around the operation surface may be made of an elastic material. The spherical housing may include an inner wall portion. The inner wall portion is on an inner side of the surface made of the elastic material and is harder than the elastic material.

With configuration (21) above, the operation surface which is integral with the surface of the spherical housing is allowed to be depressed.

(22)

An indication that indicates a position of the operation surface may be on the spherical housing and/or the operation surface of the operation section.

With configuration (22) above, the user can easily recognize which part of the surface of the spherical housing is the operation surface.

(23)

The operation section may include a movable portion. The movable portion is covered by the spherical housing and the operation surface of the operation section and moves in response to the operation surface of the operation section being depressed. The game controller may include a detector configured to detect an operation on the operation surface of the operation section in response to the movement of the movable portion.

With configuration (23) above, the game controller can detect the operation surface being depressed with a simple configuration.

(24)

The movable portion may be capable of pivoting about a rotation shaft that is substantially perpendicular to a straight line that connects between a center of the spherical housing and a center of the operation surface of the operation section. The detector may be configured to detect an operation on the operation surface of the operation section in response to the pivoting of the movable portion.

With configuration (24) above, it is made easier for the detector to detect a depressing operation, irrespective of the position at which the operation surface is depressed. Thus, it is possible to reduce the possibility that an operation on the operation surface fails to be detected.

(25)

The rotation shaft may be at such a position that a distance from the joystick to the rotation shaft is shorter than a distance from the joystick to the operation surface of the operation section.

With configuration (25) above, it is possible to improve the operability of the depressing operation on the operation surface.

(26)

The operation surface of the operation section may have a larger area than an operation surface of the joystick.

With configuration (26) above, the operation surface can be configured so that it is easy for the user to depress.

(27)

The spherical housing may include housing parts that are connected together. A seam that is formed on a surface of the spherical housing as the housing parts are connected together may include a line portion that appears linear as the game controller is seen in a direction from a center of an operation surface of the joystick toward a center of the spherical housing.

(28)

The spherical housing may include a first hemispherical portion and a second hemispherical portion. A boundary between the first hemispherical portion and the second hemispherical portion may include a line portion that appears linear as the game controller is seen in a direction from a center of an operation surface of the joystick toward a center of the spherical housing.

With configuration (27) and (28) above, it is possible to make it easy for the user to recognize the orientation of the spherical game controller.

(29)

The joystick may be on an extension of the line portion as the game controller is seen from a direction from the center of an operation surface of the joystick toward the center of the spherical housing.

With configuration (29) above, the game controller can allow the user to easily recognize appropriate input directions on the joystick based on the direction of the line portion.

(30)

The line portion may be formed on both sides of the joystick.

With configuration (30) above, the joystick and the line portion can be presented to the user in an easy-to-see manner, and the user can easily recognize appropriate input directions on the joystick.

(31)

The spherical housing may include a first housing part, a second housing part and a third housing part. The third housing part may be between the first housing part and the second housing part, and may be spherical zone-shaped.

With configuration (31) above, it is possible to make it easy for the user to recognize the orientation of the spherical game controller.

(32)

The joystick may be at least partially within the third housing part.

With configuration (32) above, the game controller can allow the user can to easily recognize appropriate input directions on the joystick.

(33) A shaft portion of the joystick may be oriented substantially toward a center of the spherical housing while the joystick is not being operated.

With configuration (33) above, it is possible to improve the operability of the joystick.

(34)

The spherical housing may include a spherical surface and an opening surface. The spherical surface may be at a radial distance from a center of the spherical housing. The opening surface is a surface at a shorter distance than the radial distance from the center of the spherical housing, wherein the opening surface has an opening. The joystick protrudes through the opening toward an outside of the spherical housing.

With configuration (34) above, the joystick is made easier to operate.

(35)

A shaft portion of the joystick may include a rod-shaped portion and a tip portion. The tip portion is at a tip of the rod-shaped portion and has a larger cross section than the rod-shaped portion in a direction perpendicular to an axial direction of the shaft portion. The tip portion may be at a position that overlaps a reference spherical surface that is a spherical surface whose center is at the center of the spherical housing and whose radius is equal to the radial distance.

With configuration (35) above, the joystick is made even easier to operate.

(36)

The tip portion may be at a position that overlaps the reference spherical surface whether the joystick is being operated or not.

With configuration (36) above, it is possible to further improve the feel of operating the joystick.

(37)

A shaft portion of the joystick may be capable of being depressed along an axial direction of the shaft portion. The transmitter may transmit, to outside, information regarding an operation of tilting the shaft portion and an operation of depressing the shaft portion.

With configuration (37) above, it is possible to provide a game controller that allows for more various types of operations.

(38)

The spherical housing may include a hemispherical first housing part and a hemispherical second housing part.

With configuration (38) above, the game controller can allow the user to recognize the orientation of the game controller based on the positional relationship between the two hemispherical housing parts.

(39)

The first housing part and the second housing part may be different from each other in terms of at least one of color and pattern.

With configuration (39) above, the game controller can allow the user to more easily recognize the orientation of the game controller.

(40)

The spherical housing may include a plurality of housing parts that are connected together. At least one of the plurality of housing parts may have a spherical surface-shaped first surface. The game controller may include a recessed surface provided at a position recessed from the first surface. The recessed surface may be formed with a hole for receiving therethrough a screw for securing together the housing part having the first surface and the recessed surface. The game controller may include a cover portion. The cover portion covers the recessed surface and has a spherical surface-shaped second surface.

With configuration (40) above, since a screw hole is at a position different from the surface of the spherical housing, the shape of the game controller as seen from outside can be made closer to a sphere.

(41) A center of gravity position of the game controller may be between a center of the spherical housing and a floor contact portion on a surface of the spherical housing.

With configuration (41) above, since the user can check the up-down orientation by placing the game controller on the floor, it is possible to allow the user to easily recognize the orientation of the game controller.

(42)

The floor contact portion may be a position that is different from a position of the spherical housing where the joystick is provided and that is on an opposite side from the operation section with respect to the center of the spherical housing.

With configuration (42) above, the possibility that the operation surface comes into contact with the floor is reduced. Therefore, it is possible to reduce the possibility that the operation surface inadvertently hits the floor, resulting in the operation surface being operated without the user intending to do so.

(43)

The game controller may include a vibrator. The vibrator is between the center of the spherical housing and the floor contact portion and configured to generate a vibration to vibrate the spherical housing.

With configuration (43) above, the game controller can output a vibration from the vibrator.

(44)

The vibrator may generate a sound in response an input signal.

With configuration (44) above, the game controller can output a sound using the vibrator.

(45)

The vibrator may have a cylindrical outer shape.

With configuration (45) above, it is possible to efficiently use the space inside the spherical housing.

(46)

The spherical housing may include a first portion and a second portion. The first portion is surrounding the joystick. The second portion is surrounding the first portion and the surface thereof is made of a material softer than a surface of the first portion With configuration (46) above, it is possible to reduce the possibility that the spherical housing around the joystick is scratched or worn out.

(47)

At least a portion of a surface of the spherical housing may be made of an elastic material.

With configuration (47) above, it is possible to improve the feel when the user holds the spherical housing.

(48)

The game controller may include an inertia sensor in a vicinity of a center of the spherical housing.

With configuration (48) above, it is possible to improve the sensing accuracy of the inertia sensor.

(49)

The spherical housing may include a strap hole thereon at a position on a straight line extended from a center of the spherical housing in a direction opposite to a direction from the center of the spherical housing toward a center of an operation surface of the joystick, wherein a strap can be attached to the strap hole.

With configuration (49) above, a strap can be attached at a position that is unlikely to interfere with operations on the joystick, and it is possible to improve the operability of the game controller.

(50)

The game controller may include a reboot button used to reboot the game controller. An operation surface of the reboot button may be recessed from a surface of the spherical housing.

With configuration (50) above, it is possible to reduce the possibility that the reboot button is operated inadvertently.

(51) An outer circumference of the operation surface of the operation section may be circular.

Note that disclosed herein is an example of an information processing system including any of the game controllers set forth in (1) to (51) above, and an information processing apparatus capable of communicating with the game controller.

With such game controllers, it is possible to allow for various types of operations using a game controller.

These and other objects, features, aspects and advantages of the present invention will become more apparent from the following detailed description of the present invention when taken in conjunction with the accompanying drawings.

DETAILED DESCRIPTION OF NON-LIMITING EXAMPLE EMBODIMENTS

[1. Game System in which Spherical Controller is Used]

Before describing a spherical controller according to an exemplary embodiment, a game system in which the spherical controller is used will be described first. An example of a game system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the control of the game system 1 according to the exemplary embodiment is described.

Figure 1:
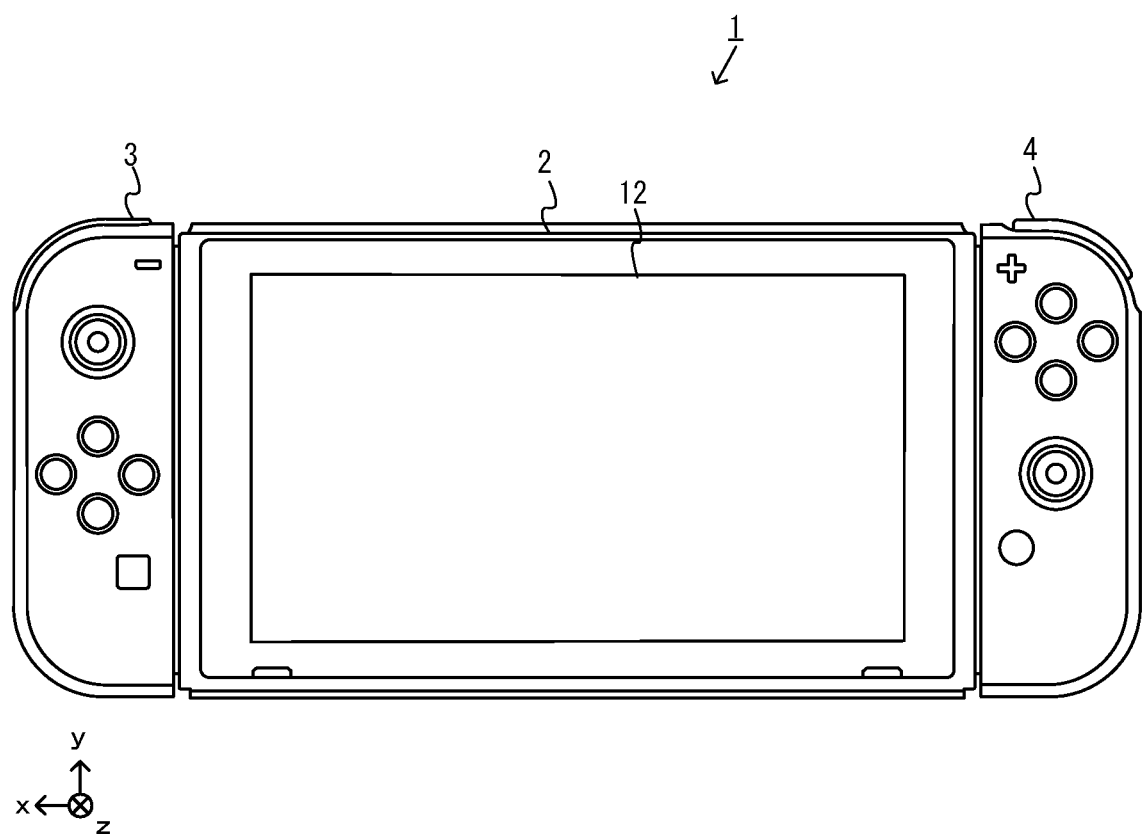
FIG. 1 is a diagram showing an example of a state where a non-limiting left controller and a non-limiting right controller are attached to a non-limiting main body apparatus.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
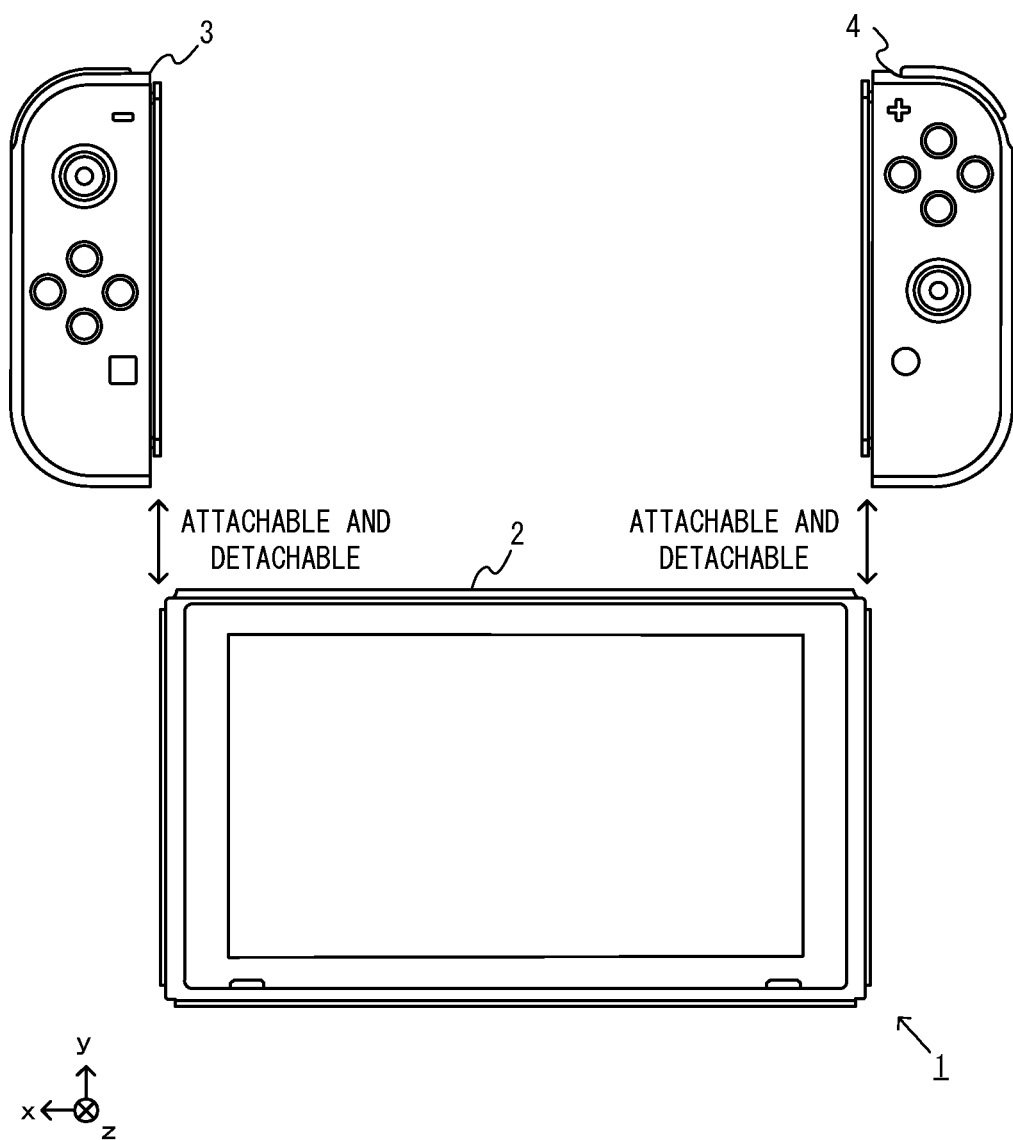
FIG. 2 is a diagram showing an example of a state where a non-limiting left controller and a non-limiting right controller are detached from a non-limiting main body apparatus.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
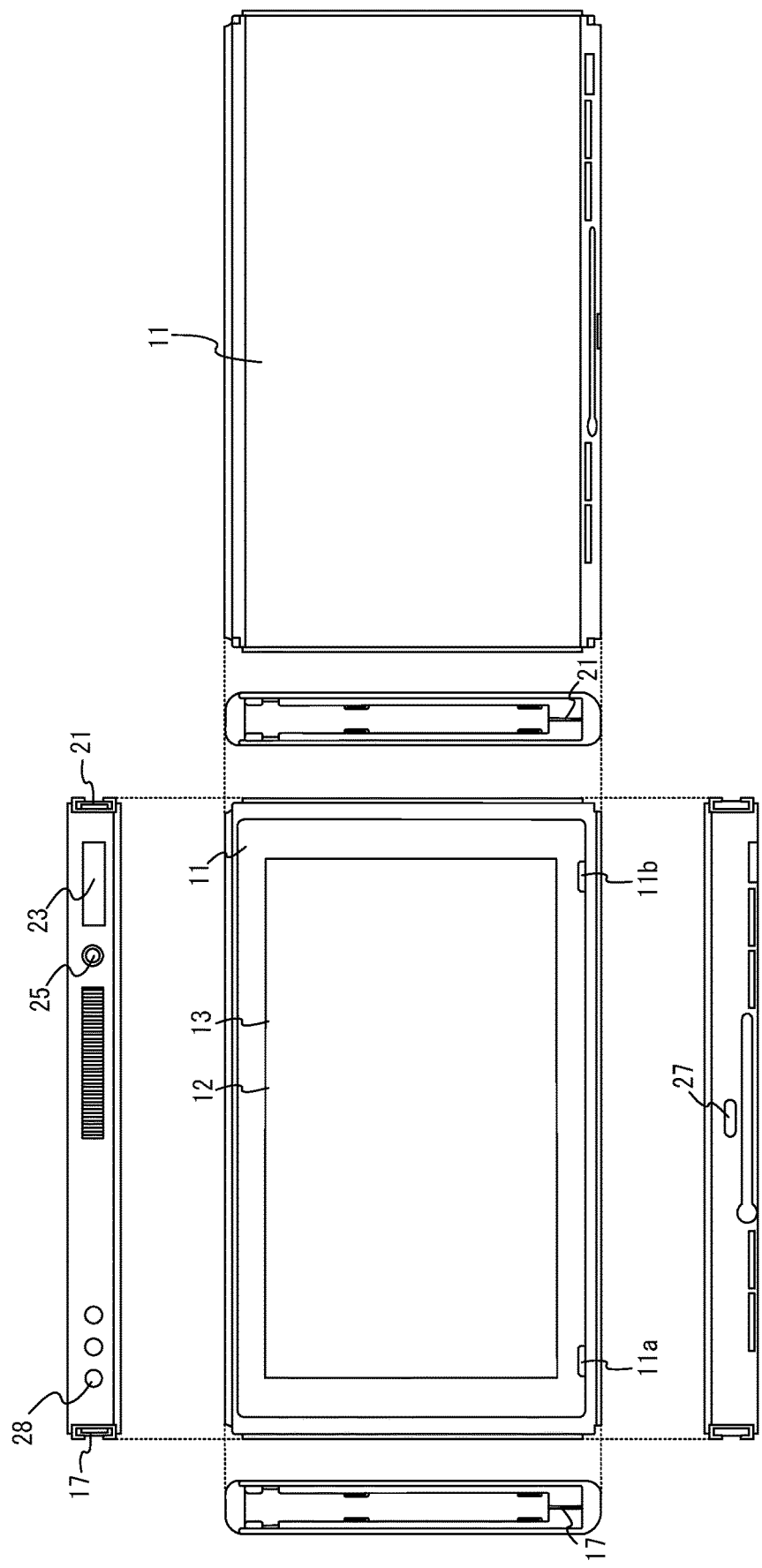
FIG. 3 shows six orthogonal views showing an example of a non-limiting main body apparatus.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are output through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
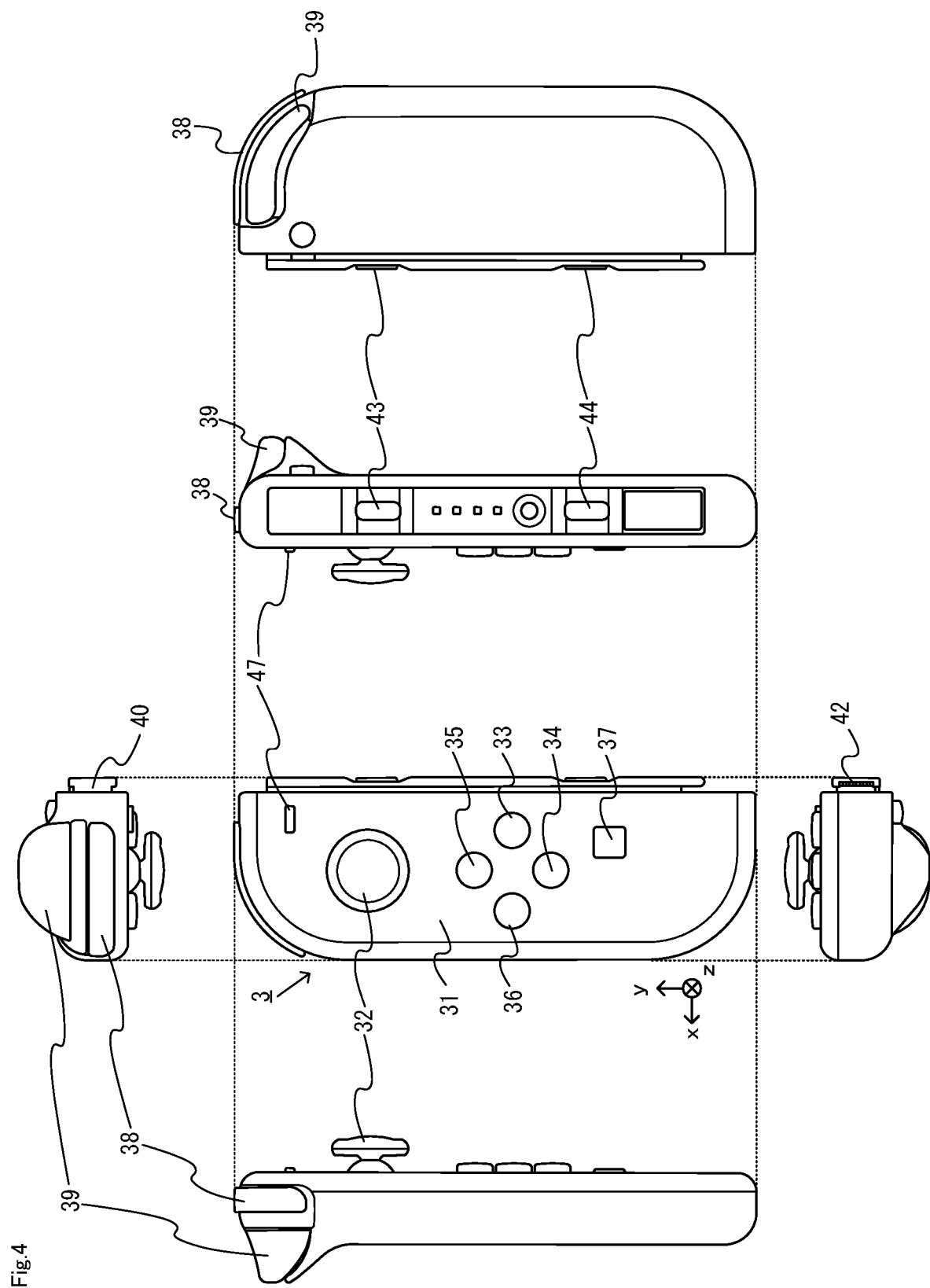
FIG. 4 shows six orthogonal views showing an example of a non-limiting left controller.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
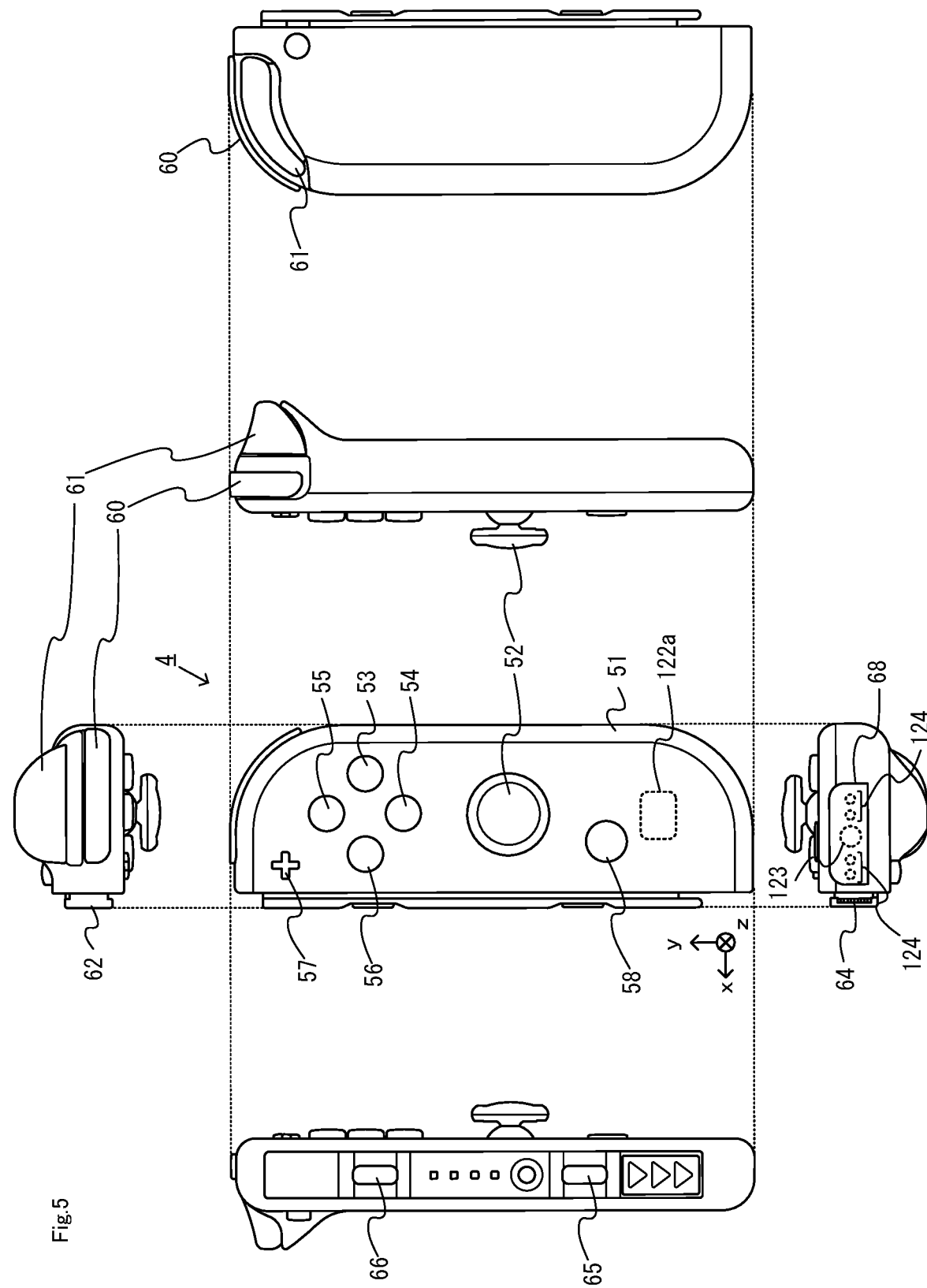
FIG. 5 shows six orthogonal views showing an example of a non-limiting right controller.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, a window portion 68 is provided on a lower side surface of the housing 51. Although the details will be described later, the right controller 4 includes an infrared image capturing section 123 and an infrared light-emitting section 124, which are placed within the housing 51. The infrared image capturing section 123 captures a portion around the right controller 4 through the window portion 68 such that a down direction of the right controller 4 (a negative y-axis direction shown in FIG. 5) is the image capturing direction. The infrared light-emitting section 124 emits infrared light through the window portion 68 to an image capturing target to be captured by the infrared image capturing section 123 such that a predetermined range about the down direction of the right controller 4 (the negative y-axis direction shown in FIG. 5) is the emission range. The window portion 68 is used to protect a lens of a camera of the infrared image capturing section 123, a light emitter of the infrared light-emitting section 124, and the like and composed of a material (e.g., a transparent material) that transmits light of a wavelength sensed by the camera and light emitted from the light emitter. It should be noted that the window portion 68 may be a hole formed in the housing 51. It should be noted that in the exemplary embodiment, the infrared image capturing section 123 itself includes a filter member for inhibiting the transmission of light of a wavelength other than light sensed by the camera (infrared light in the exemplary embodiment). In another exemplary embodiment, the window portion 68 may have the function of a filter.

Further, although the details will be described later, the right controller 4 includes an NFC communication section 122. The NFC communication section 122 performs short-range wireless communication based on the NFC (Near Field Communication) standard. The NFC communication section 122 includes an antenna 122a, which is used for short-range wireless communication, and a circuit (e.g., an NFC chip) for generating a signal (a radio wave) to be sent from the antenna 122a. It should be noted that the NFC communication section 122 may perform short-range wireless communication through any proximity communication (or contactless communication), instead of performing short-range wireless communication based on the NFC standard. Here, the NFC standard can be used for proximity communication (contactless communication), and "may perform short-range wireless communication through any proximity communication (or contactless communication)" is intended to mean that short-range wireless communication may be performed through other proximity communication except for proximity communication based on the NFC standard.

Further, the right controller 4 includes a terminal 64 for the right controller 4 to perform wired communication with the main body apparatus 2.

Figure 6:
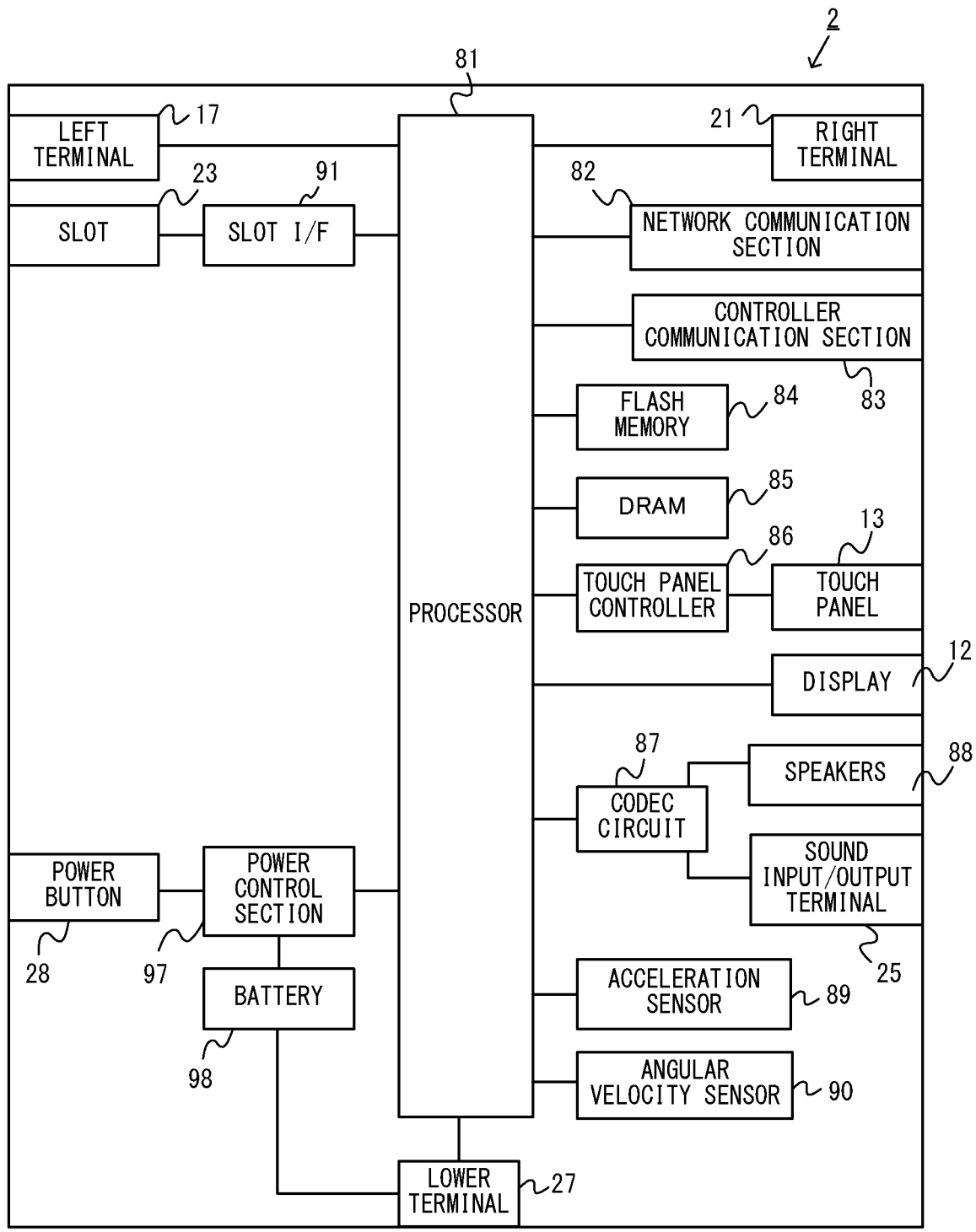
FIG. 6 is a block diagram showing an example of an internal configuration of the non-limiting main body apparatus.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 includes a touch panel controller 86, which is a circuit for controlling the touch panel 13. The touch panel controller 86 is connected between the touch panel 13 and the processor 81. Based on a signal from the touch panel 13, the touch panel controller 86 generates, for example, data indicating the position where a touch input is provided. Then, the touch panel controller 86 outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

Further, the main body apparatus 2 includes an acceleration sensor 89. In the exemplary embodiment, the acceleration sensor 89 detects the magnitudes of accelerations along predetermined three axial (e.g., xyz axes shown in FIG. 1) directions. It should be noted that the acceleration sensor 89 may detect an acceleration along one axial direction or accelerations along two axial directions.

Further, the main body apparatus 2 includes an angular velocity sensor 90. In the exemplary embodiment, the angular velocity sensor 90 detects angular velocities about predetermined three axes (e.g., the xyz axes shown in FIG. 1). It should be noted that the angular velocity sensor 90 may detect an angular velocity about one axis or angular velocities about two axes.

The acceleration sensor 89 and the angular velocity sensor 90 are connected to the processor 81, and the detection results of the acceleration sensor 89 and the angular velocity sensor 90 are output to the processor 81. Based on the detection results of the acceleration sensor 89 and the angular velocity sensor 90, the processor 81 can calculate information regarding the motion and/or the orientation of the main body apparatus 2.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
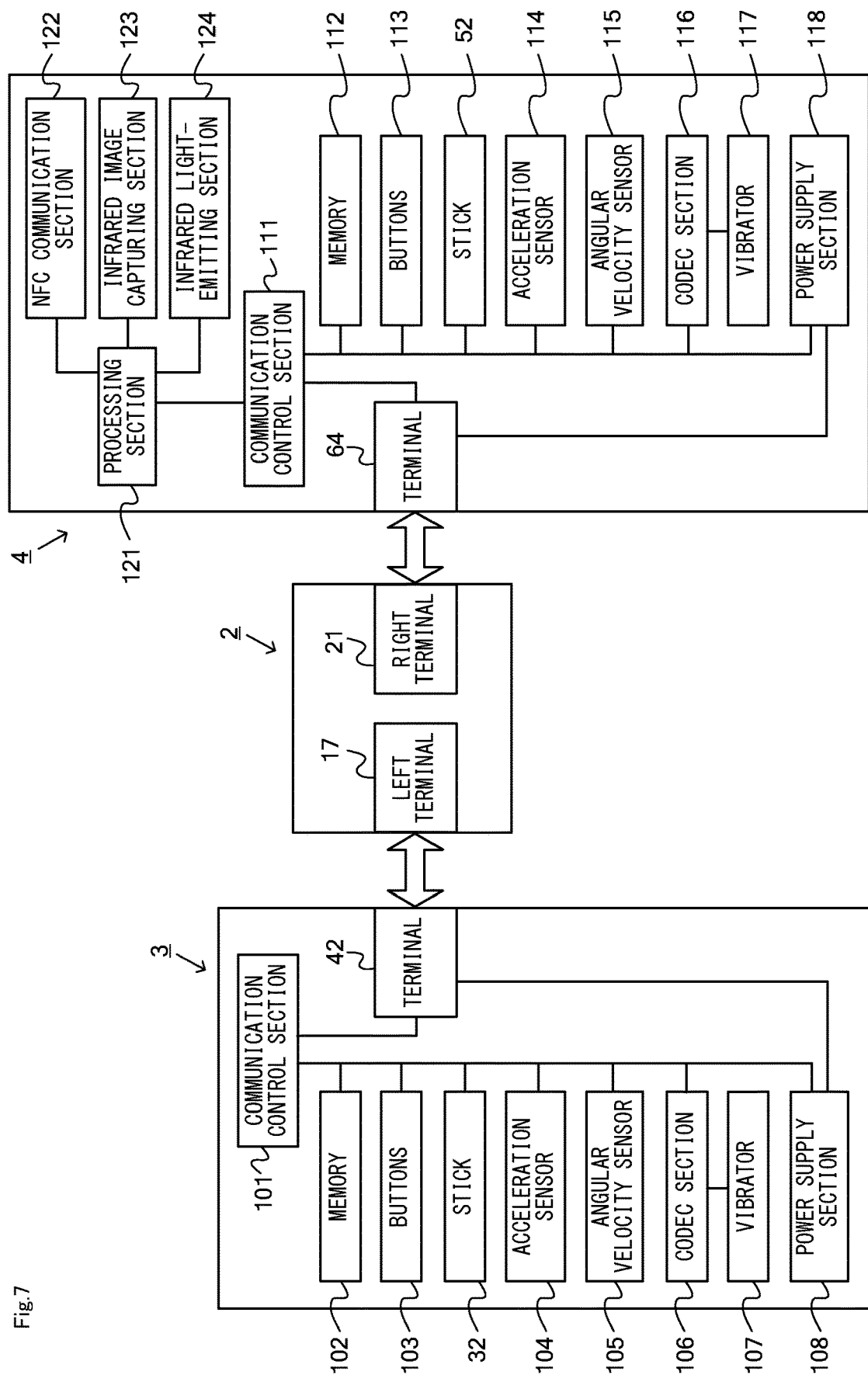
FIG. 7 is a block diagram showing an example of an internal configuration of the non-limiting main body apparatus, the non-limiting left controller and the non-limiting right controller.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., xyz axes shown in FIG. 4) directions. It should be noted that the acceleration sensor 104 may detect an acceleration along one axial direction or accelerations along two axial directions. In the exemplary embodiment, the angular velocity sensor 105 detects angular velocities about predetermined three axes (e.g., the xyz axes shown in FIG. 4). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are output to the communication control section 101 repeatedly at appropriate timing.

The communication control section 101 acquires information regarding an input (specifically, information regarding an operation or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

The left controller 3 includes a vibrator 107 for giving notification to the user by a vibration. In the exemplary embodiment, the vibrator 107 is controlled by a command from the main body apparatus 2. That is, if receiving the above command from the main body apparatus 2, the communication control section 101 drives the vibrator 107 in accordance with the received command. Here, the left controller 3 includes a codec section 106. If receiving the above command, the communication control section 101 outputs a control signal corresponding to the command to the codec section 106. The codec section 106 generates a driving signal for driving the vibrator 107 from the control signal from the communication control section 101 and outputs the driving signal to the vibrator 107. Consequently, the vibrator 107 operates.

More specifically, the vibrator 107 is a linear vibration motor. Unlike a regular motor that rotationally moves, the linear vibration motor is driven in a predetermined direction in accordance with an input voltage and therefore can be vibrated at an amplitude and a frequency corresponding to the waveform of the input voltage. In the exemplary embodiment, a vibration control signal transmitted from the main body apparatus 2 to the left controller 3 may be a digital signal representing the frequency and the amplitude every unit of time. In another exemplary embodiment, the main body apparatus 2 may transmit information indicating the waveform itself. The transmission of only the amplitude and the frequency, however, enables a reduction in the amount of communication data. Additionally, to further reduce the amount of data, only the differences between the numerical values of the amplitude and the frequency at that time and the previous values may be transmitted, instead of the numerical values. In this case, the codec section 106 converts a digital signal indicating the values of the amplitude and the frequency acquired from the communication control section 101 into the waveform of an analog voltage and inputs a voltage in accordance with the resulting waveform, thereby driving the vibrator 107. Thus, the main body apparatus 2 changes the amplitude and the frequency to be transmitted every unit of time and thereby can control the amplitude and the frequency at which the vibrator 107 is to be vibrated at that time. It should be noted that not only a single amplitude and a single frequency, but also two or more amplitudes and two or more frequencies may be transmitted from the main body apparatus 2 to the left controller 3. In this case, the codec section 106 combines waveforms indicated by the plurality of received amplitudes and frequencies and thereby can generate the waveform of a voltage for controlling the vibrator 107.

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the analog stick 52, and inertial sensors (an acceleration sensor 114 and an angular velocity sensor 115). These input sections have functions similar to those of the input sections of the left controller 3 and operate similarly to the input sections of the left controller 3.

Further, the right controller 4 includes a vibrator 117 and a codec section 116. The vibrator 117 and the codec section 116 operate similarly to the vibrator 107 and the codec section 106, respectively, of the left controller 3. That is, in accordance with a command from the main body apparatus 2, the communication control section 111 causes the vibrator 117 to operate, using the codec section 116.

The right controller 4 includes the NFC communication section 122, which performs short-range wireless communication based on the NFC standard. The NFC communication section 122 has the function of a so-called NFC reader/writer. Here, the term "short-range wireless communication" as used herein includes a communication method where a radio wave from an apparatus (here, the right controller 4) develops an electromotive force (e.g., by electromagnetic induction) in another device (here, a device near the antenna 122*a*). The other device can operate by the developed electromotive force, and may or may not have a power supply. When the right controller 4 (the antenna 122*a*) and a communication target come close to each other (typically, the distance between the right controller 4 and the communication target becomes dozen centimeters or less), the NFC communication section 122 becomes able to communicate with the communication target. The communication target is any apparatus capable of performing short-range wireless communication with the NFC communication section 122 and is, for example, an NFC tag or a storage medium having the function of an NFC tag. Alternatively, the communication target may be another apparatus having an NFC card emulation function.

Further, the right controller 4 includes the infrared image capturing section 123. The infrared image capturing section 123 includes an infrared camera for capturing a portion around the right controller 4. As an example, the main body apparatus 2 and/or the right controller 4 calculate information of a captured image (e.g., information related to the luminance of a plurality of blocks into which at least the entirety of a partial area of a captured image is divided or the like), and based on the calculated information, determine a change in the portion around the right controller 4. Further, the infrared image capturing section 123 may capture an image using ambient light, but in the exemplary embodiment, includes the infrared light-emitting section 124, which emits infrared light. The infrared light-emitting section 124 emits infrared light, for example, in synchronization with the timing when the infrared camera captures an image. Then, the infrared light emitted from the infrared light-emitting section 124 is reflected by an image capturing target, and the infrared camera receives the reflected infrared light, thereby acquiring an image of the infrared light. This enables the infrared image capturing section 123 to obtain a clearer infrared light image. It should be noted that the infrared image capturing section 123 and the infrared light-emitting section 124 may be provided as different devices in the right controller 4, or may be provided as a single device in the same package in the right controller 4. Further, in the exemplary embodiment, the infrared image capturing section 123 including an infrared camera is used. In another exemplary embodiment, a visible light camera (a camera using a visible light image sensor) may be used as image capturing means, instead of the infrared camera.

The right controller 4 includes a processing section 121. The processing section 121 is connected to the communication control section 111. Further, the processing section 121 is connected to the NFC communication section 122, the infrared image capturing section 123, and the infrared light-emitting section 124. In accordance with a command from the main body apparatus 2, the processing section 121 performs the process of managing the NFC communication section 122. For example, in accordance with a command from the main body apparatus 2, the processing section 121 controls the operation of the NFC communication section 122. Further, the processing section 121 controls the start of the NFC communication section 122 or controls the operations (specifically, reading, writing, and the like) of the NFC communication section 122 performed on a communication target (e.g., an NFC tag). Further, the processing section 121 receives, from the main body apparatus 2, information to be transmitted to the communication target via the communication control section 111 and passes the information to the NFC communication section 122. Further, the processing section 121 acquires, from the NFC communication section 122, information received from the communication target and transmits the information to the main body apparatus 2 via the communication control section 111.

Further, the processing section 121 includes a CPU, a memory, and the like. Based on a predetermined program (e.g., an application program for performing image processing and various calculations) stored in a storage device (e.g., a non-volatile memory or the like) (not shown) included in the right controller 4, and in accordance with a command from the main body apparatus 2, the processing section 121 performs the process of managing the infrared image capturing section 123. For example, the processing section 121 causes the infrared image capturing section 123 to perform an image capturing operation. Further, the processing section 121 acquires and/or calculates information based on an image capturing result (information of a captured image, information calculated from this information, or the like) and transmits the information to the main body apparatus 2 via the communication control section 111. Further, in accordance with a command from the main body apparatus 2, the processing section 121 performs the process of managing the infrared light-emitting section 124. For example, in accordance with a command from the main body apparatus 2, the processing section 121 controls the light emission of the infrared light-emitting section 124. It should be noted that a memory used by the processing section 121 to perform processing may be provided in the processing section 121 or may be the memory 112.

The right controller 4 includes a power supply section 118. The power supply section 118 has a function similar to that of the power supply section 108 of the left controller 3 and operates similarly to the power supply section 108.

[2. Spherical Controller]

Next, a spherical controller according to the exemplary embodiment will be described. In the exemplary embodiment, the spherical controller may be used as a controller device for giving instructions to the main body apparatus 2, instead of the controllers 3 and 4, or together with the controllers 3 and/or 4. The details of the spherical controller will now be described.

Figure 8:
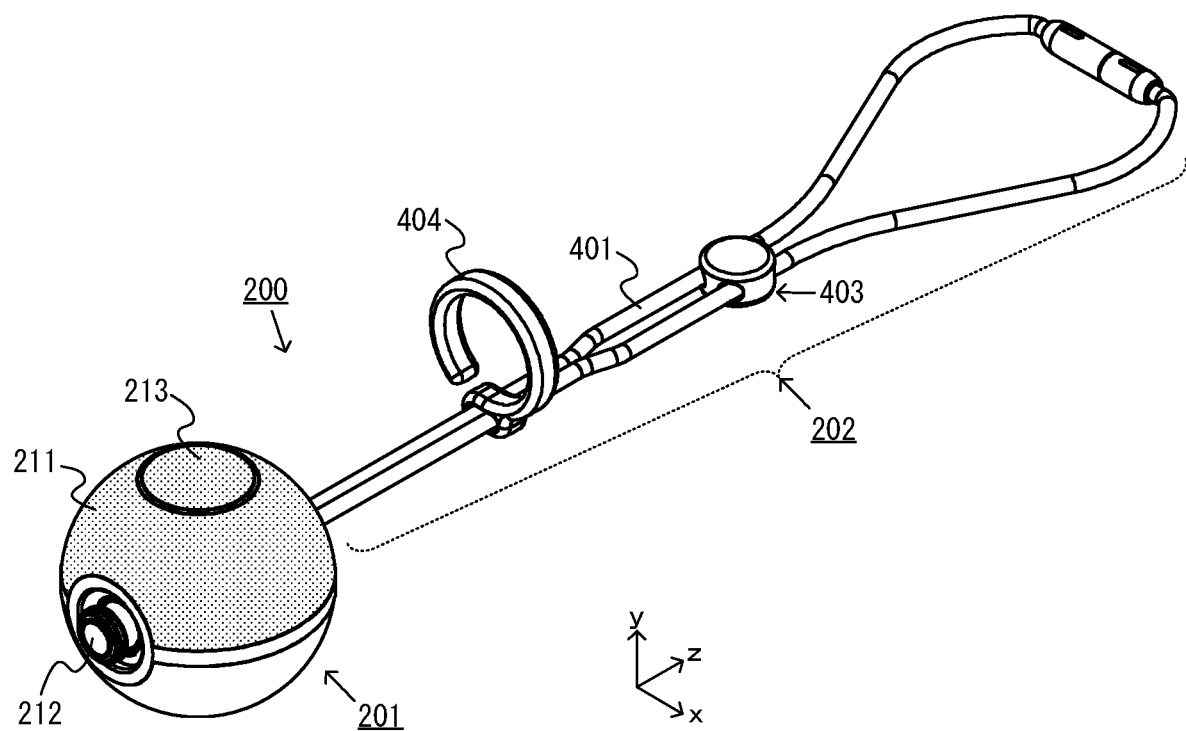
FIG. 8 is a perspective view showing an example of a non-limiting spherical controller.
Figure 9:
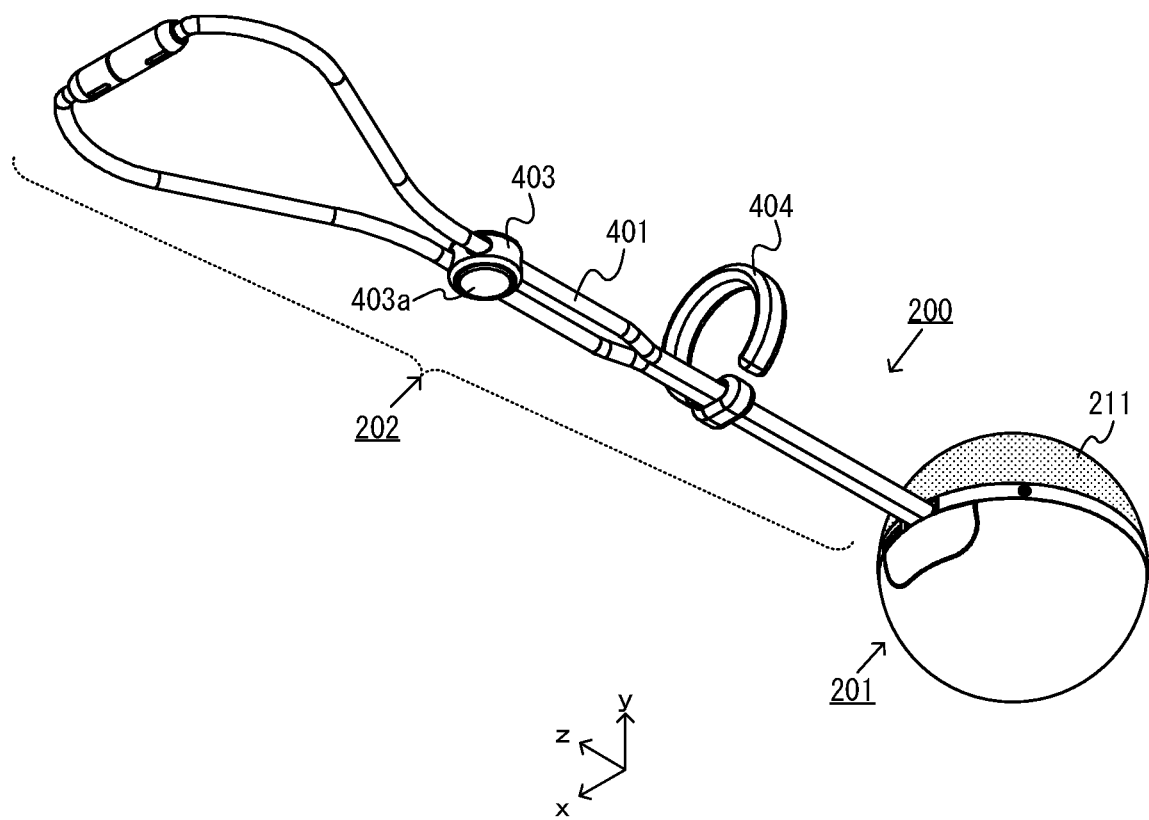
FIG. 9 is a perspective view showing an example of a non-limiting spherical controller.

FIG. 8 and FIG. 9 are perspective views showing an example of the spherical controller. FIG. 8 is a perspective view of a spherical controller 200 as seen from the upper front direction, and FIG. 9 is a perspective view of the spherical controller 200 as seen from the lower rear direction. As shown in FIG. 8 and FIG. 9, the spherical controller 200 includes a spherical controller main body 201 and a strap portion 202. For example, the user uses the spherical controller 200 while holding the controller main body 201 with the strap portion 202 wound around the arm.

In the following description regarding the spherical controller 200 (specifically, the controller main body 201), the up-down direction, the left-right direction and the front-rear direction are defined as follows. That is, the direction from the center of the spherical controller main body 201 toward a joystick 212 (i.e., the z-axis negative direction shown in FIG. 8) is defined as the front direction, and the opposite direction thereto (i.e., the z-axis positive direction shown in FIG. 8) as the rear direction. As seen from the front-rear direction, the direction from the center of the controller main body 201 toward the center of an operation surface 213 (i.e., the y-axis positive direction shown in FIG. 8) is defined as the upper direction, and the opposite direction thereto (i.e., the y-axis negative direction shown in FIG. 8) as the lower direction. Moreover, the direction from the center of the controller main body 201 toward the right edge of the controller main body 201 as seen from the front side (i.e., the x-axis positive direction shown in FIG. 8) is defined as the right direction, and the opposite direction thereto (i.e., the x-axis negative direction shown in FIG. 8) as the left direction. Note that the up-down direction, the left-right direction and the front-rear direction are orthogonal to each other.

[2-1. External Configuration of Controller Main Body]

Figure 10:
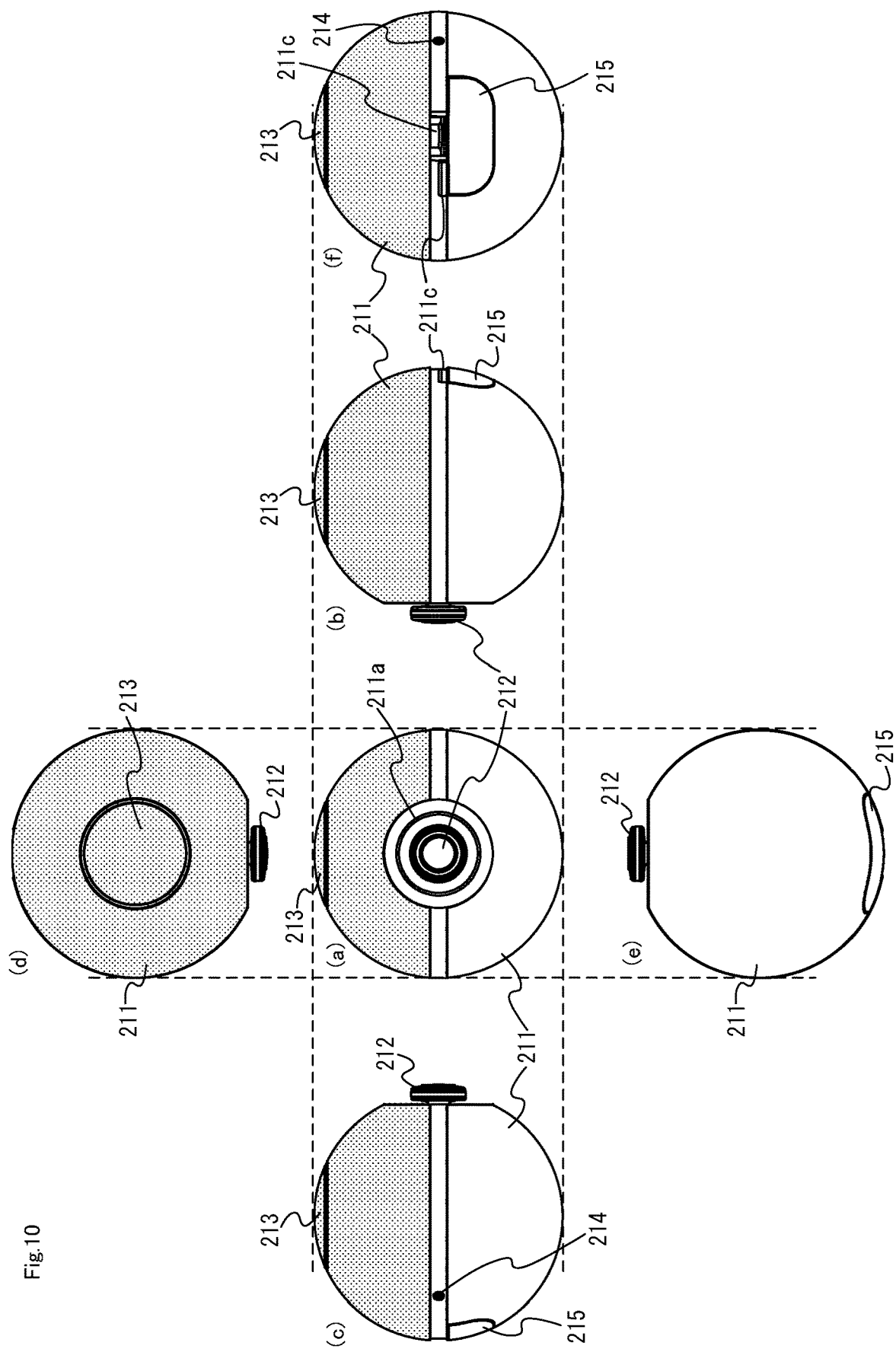
FIG. 10 shows six orthogonal views showing an example of a non-limiting controller main body.

FIG. 10 shows six orthogonal views showing an example of the controller main body. In FIG. 10, (a) is a front view, (b) a right side view, (c) a left side view, (d) a plan view, (e) a bottom view, and (f) a back view.

As shown in FIG. 10, the controller main body 201 has a spherical shape. Herein, "spherical shape" means a shape that generally appears to be a sphere from outside. A spherical shape may be a perfectly spherical shape, or may be a perfectly spherical shape except it has cutout portions and/or protruding portions. A spherical shape may also be a shape a part of which is not spherical. A spherical shape may be a perfectly spherical shape except it is slightly distorted.

(Housing)

As shown in FIG. 10, the controller main body 201 has a spherical housing 211. In the exemplary embodiment, the controller main body 201 (in other words, the housing 211) is sized so that it can be held in one hand by the user (see FIG. 12). The diameter of the housing 211 is set in the range of 4 cm to 10 cm, for example.

Figure 11:
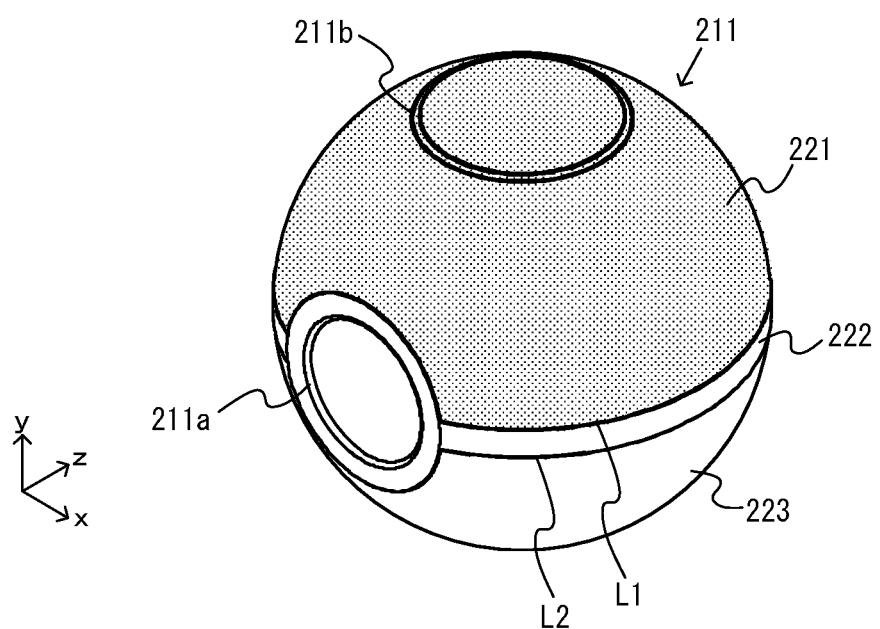
FIG. 11 is a diagram showing an example of a non-limiting housing.

FIG. 11 is a diagram showing an example of the housing 211. In the exemplary embodiment, the surface of the housing 211 is a substantially spherical surface except for holes or cutouts therein to be described below. Note that in other embodiments, the housing 211 may have a spherical surface with protruding portions or depressed portions. Such portions may be provided for design purposes, for example.

In the present specification, "substantially (in a certain state)" means to include both cases where the certain state is achieved in a strict sense and cases where the certain state is generally achieved. For example, "substantially spherical (surface)" means to include embodiments where the surface is spherical in a strict sense and embodiments where the surface is not strictly spherical but is generally spherical.

In the exemplary embodiment, the housing 211 has a spherical shape with cutouts and holes therein. The housing 211 is provided with holes for the purpose of providing operation sections (e.g., the joystick 212 and a reboot button 214 to be described later) on the housing 211 and attaching other components (e.g., the strap portion 202) to the housing 211, the details of which will be described later.

Specifically, in the exemplary embodiment, the front end portion of the housing 211 is a flat surface (see (b) to (e) of FIG. 10). Hereinafter, the flat surface of the front end portion of the housing 211 will be referred to as the "front end surface". It can be said that the housing 211 has a shape obtained by cutting off the front end portion of the spherical shape by truncating the spherical shape along a plane that includes the front end surface. As shown in FIG. 11, an opening 211a is provided in the front end surface of the housing 211. The joystick 212 is provided so as to be exposed through the opening 211a, the details of which will be described later. While the opening 211a has a circular shape in the exemplary embodiment, the opening 211a may have any other shape in other embodiments. For example, the shape of the opening 211a may be a polygonal shape (specifically, a triangular shape, a quadrilateral shape, a pentagonal shape, etc.), an elliptical shape or a star shape.

As shown in FIG. 11, in the exemplary embodiment, the housing 211 includes an upper housing part 221, a middle housing part 222, and a lower housing part 223. The upper housing part 221 and the lower housing part 223 are each a hemispherical shape. The middle housing part 222 is a portion that includes the front end surface and where the opening 211a is provided. These three housing parts 221 to 223 are connected together to form the spherical housing 211.

As shown in FIG. 11, the upper housing part 221 has a hemispherical shape. The lower housing part 223 also has a hemispherical shape as does the upper housing part 221. It can be said that the upper housing part 221 and the lower housing part 223 are each a hemispherical housing. Herein, "hemispherical shape" means a shape that generally appears to be a hemisphere from outside. A hemispherical shape may be a perfectly hemispherical shape, or may be a perfectly hemispherical shape except it has cutout portions and/or protruding portions. A hemispherical shape may also be a shape a part of which is not spherical. A hemispherical shape may be one half of a perfectly spherical shape except it is slightly distorted.

Figure 19:
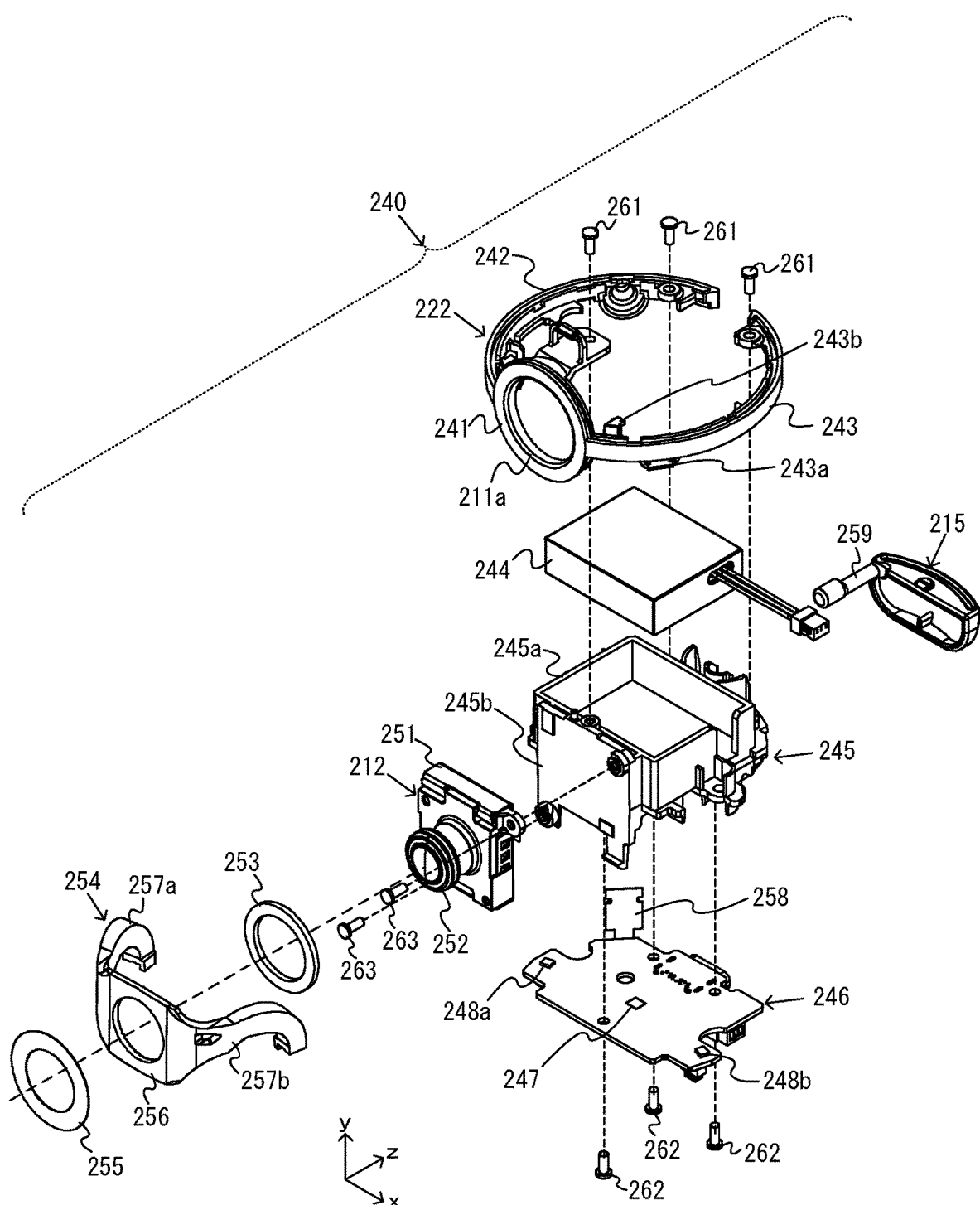
FIG. 19 is an exploded perspective view of an example of a non-limiting middle unit.

The middle housing part 222 has a ring (or "annular") shape as shown in FIG. 11 and FIG. 19 to be discussed later. The middle housing part 222 is provided between the upper housing part 221 and the lower housing part 223. In the exemplary embodiment, the middle housing part 222 has a spherical zone shape (i.e., a band-shaped piece of a sphere that is defined between two parallel planes running through the sphere).

Thus, in the exemplary embodiment, the housing 211 is composed of three housing parts. Note that in other embodiments, there is no limitation on the number of housing parts of the housing 211, and it may be two or four or more. Alternatively, the entire housing 211 may be integral.

(Regarding External Appearance of Housing)

As shown in FIG. 11, in the exemplary embodiment, two housing parts are connected together to form a seam on the surface of the housing 211. That is, the upper housing part 221 and the middle housing part 222 form a seam therebetween, and the middle housing part 222 and the lower housing part 223 form a seam therebetween. Herein, the seam includes line portions (e.g., the lines L1 and L2 shown in FIG. 11) that appear to be straight when the spherical controller 200 is seen from the direction from the center of an operation surface 252c of the joystick 212 (see FIG. 13) toward the center of the housing 211 (i.e., the direction from the front side toward the rear side; see (a) of FIG. 10). Note that it can be said that the seam is the boundary between a first hemispherical portion (e.g., the upper housing part 221) and a second hemispherical portion (e.g., the middle housing part 222 and the lower housing part 223) included in the housing 211.

Herein, since the controller main body 201 is a sphere, it may be difficult for the user to recognize the orientation of the controller main body 201 based only on the outer shape of the controller main body 201. In the exemplary embodiment, with the line portions described above, it is easier for the user to recognize the orientation of the controller main body 201. For example, in the exemplary embodiment, the user can recognize that the direction in which the line portions described above extend is the left-right direction of the controller main body 201.

In the exemplary embodiment, the joystick 212 is provided so as to be located on the extensions of the line portions as the spherical controller 200 is seen from the direction from the joystick 212 toward the center of the housing 211 (i.e., the direction from the front side toward the rear side) (see (a) of FIG. 10). Thus, the user can judge the orientation of the joystick 212 based on the direction of the line portions. For example, in the exemplary embodiment, the user can recognize that the direction along the line portions is the direction of left-right inputs on the joystick 212.

In the exemplary embodiment, the line portions of the seam are formed on opposite sides of the joystick 212 (see (a) of FIG. 10). Then, the joystick 212 and the line portions can be presented to the user in an easy-to-see manner, and the relationship between the joystick 212 and the line portions is made easier to understand. For example, the user can recognize the relationship between the joystick 212 and the line portions whether the joystick 212 is seen from one side (e.g., the left side) or from the other side (e.g., the right side).

As described above, in the exemplary embodiment, the housing 211 includes the first housing part (i.e., the upper housing part 221), the second housing part (i.e., the lower housing part 223), and a spherical zone-shaped third housing part (i.e., the middle housing part 222) provided between the first housing part and the second housing part. Herein, since the third housing part is spherical zone-shaped, the third housing part has a band-shaped portion that extends along a spherical zone that is defined between two parallel planes running through the housing 211 (see FIG. 11). The band-shaped portion provides a similar effect to that of the line portions of the seam. That is, in the exemplary embodiment, the band-shaped portion makes it easier for the user to recognize the orientation of the controller main body 201. For example, in the exemplary embodiment, the user can recognize that the direction in which the band-shaped portion extends is the left-right direction of the controller main body 201.

In the exemplary embodiment, the joystick 212 is provided on the third housing part (see (a) of FIG. 10). That is the joystick 212 is provided on the extension of the band-shaped portion as the spherical controller 200 is seen from the direction from the joystick 212 toward the center of the housing 211 (i.e., the direction from the front side toward the rear side) (see (a) of FIG. 10). Then, the user can judge the orientation of the joystick 212 based on the direction in which the band-shaped portion extends. For example, in the exemplary embodiment, the user can recognize that the direction in which the band-shaped portion extends is the direction of left-right inputs on the joystick 212.

In the exemplary embodiment, the band-shaped portion is provided on both sides of the joystick 212 (see (a) of FIG. 10). Then, the joystick 212 and the band-shaped portion can be presented to the user in an easy-to-see manner, and the relationship between the joystick 212 and the band-shaped portion is made easier to understand. For example, the user can visually recognize the relationship between the joystick 212 and the band-shaped portion whether the joystick 212 is seen from one side (e.g., the left side) or from the other side (e.g., the right side).

In the exemplary embodiment, the housing 211 includes a hemispherical first housing part (i.e., the upper housing part 221) and a hemispherical second housing part (i.e., the lower housing part 223). Thus, the user can recognize the orientation of the controller main body 201 based on the positional relationship between the two hemispherical housing parts. For example, in the exemplary embodiment, the user can recognize that one side where one housing part is provided is the upper side of the controller main body 201, and the other side where the other housing part is provided is the lower side of the controller main body 201.

In the exemplary embodiment, the hemispherical upper housing part 221 and the hemispherical lower housing part 223 have different colors. Specifically, the surface of the upper housing part 221 is red (the color of red is represented by dots in FIG. 11), and the surface of the lower housing part 223 is white. Note that in other embodiments, the upper housing part 221 and the lower housing part 223 may have different patterns from each other, or may have both different colors and different patterns from each other. Thus, as the upper housing part 221 and the lower housing part 223 are different from each other in terms of at least one of color and pattern, the user can recognize, in an easy-to-understand manner, the upper and lower sides of the spherical controller 200.

(Joystick)

The controller main body 201 includes the joystick 212, which is an example of a direction input section (see (a) to (e) of FIG. 10). In the exemplary embodiment, the joystick 212 includes a shaft portion that can be tilted in any direction by the user (i.e., a shaft portion 252 shown in FIG. 19 to be discussed later). In the exemplary embodiment, the joystick 212 is a type of a joystick such that the shaft portion is capable of being depressed in addition to being tilted, the details of which will be described later. Note that in other embodiments, the joystick 212 may be another type of an input device (see "[3. Variations]" to be described later).

In the exemplary embodiment, the joystick 212 is provided in the front end portion of the housing 211. As shown in FIG. 10, the joystick 212 is provided so that a portion (specifically, the shaft portion) of the joystick 212 is exposed through the opening 211a of the housing 211. The position of the joystick 212 is at the center of the spherical controller main body 201 with respect to the up-down direction and the left-right direction (see (a) of FIG. 10).

In the exemplary embodiment, the joystick 212 is provided so that the shaft portion thereof is arranged along a straight line (specifically, the straight line L4 shown in FIG. 13 to be discussed later) that passes through the center of the housing 211 and is parallel to the front-rear direction. In the exemplary embodiment, the joystick 212 is provided so that the axis of the shaft portion thereof is parallel to the front-rear direction. Note that in the exemplary embodiment, the front-rear direction of the spherical controller 200 is defined to be the direction from the center of the housing 211 toward the center of the tip surface of the shaft portion (i.e., the front side surface of a tip portion 252b shown in FIG. 21 to be discussed later).

Note that in the present specification, a straight line passing through a certain component, such as the "straight line that passes through the center of the housing 211", for example, may be used in the description of the spherical controller 200. Similarly, in the exemplary embodiment, a plane (e.g., a plane P1 shown in FIG. 13) or a region (e.g., a region R shown in FIG. 27) associated with a certain component may be used in the description. Herein, a straight line, a plane and a region as described above are those that are defined virtually for the sake of discussion, and do not need to be components that actually exist (in other words, that the spherical controller 200 is provided with).

In the exemplary embodiment, a portion of the joystick 212 (more specifically, a portion of the shaft portion) protrudes from the plane of the front end portion of the housing 211 (see (b) and (c) of FIG. 10). Therefore, the user can easily perform the operation of tilting the shaft portion. Note that in other embodiments, the joystick 212 may not protrude from the plane but may be exposed through the opening 211a.

As described above, in the exemplary embodiment, the spherical controller 200 includes the spherical housing 211 with the opening 211a in the surface thereof, and the joystick 212 that includes the shaft portion 252 that can be tilted and is at least partially exposed through the opening 211a. Then, the user can use a game controller having a spherical outer shape to perform a direction input operation of tilting the shaft portion. That is, in the exemplary embodiment, it is possible to perform subtler operations using a game controller having a spherical outer shape.

(Operation Surface)

As shown in (d) of FIG. 10, the operation surface 213 is provided in the upper end portion of the housing 211. The position of the operation surface 213 is at the center of the spherical controller main body 201 with respect to the left-right direction and the front-rear direction (see (d) of FIG. 10). In the exemplary embodiment, the operation surface 213 (in other words, the outer circumference of the operation surface 213) has a circular shape on the spherical surface of the housing 211. Note however that in other embodiments, there is no limitation on the shape of the operation surface 213, and the shape may be a quadrilateral shape or a triangular shape, etc., for example. The operation surface 213 is configured so that it is capable of being depressed from above, the details of which will be described later.

In the exemplary embodiment, the operation surface 213 is integral with the surface of the housing 211. The operation surface 213 is a part of an operation section (or an "operation button") that is capable of being depressed. Note however that since the operation surface 213 is integral with the rest of the housing 211 other than the operation surface 213, it can be said to be a part of the housing 211. Note that in the exemplary embodiment, the operation surface 213 can be deformed by being depressed, the details of which will be described later. An input is made on the operation section having the operation surface 213 by depressing the operation surface 213.

(Regarding Arrangement of Joystick and Operation Surface)

Figure 12:
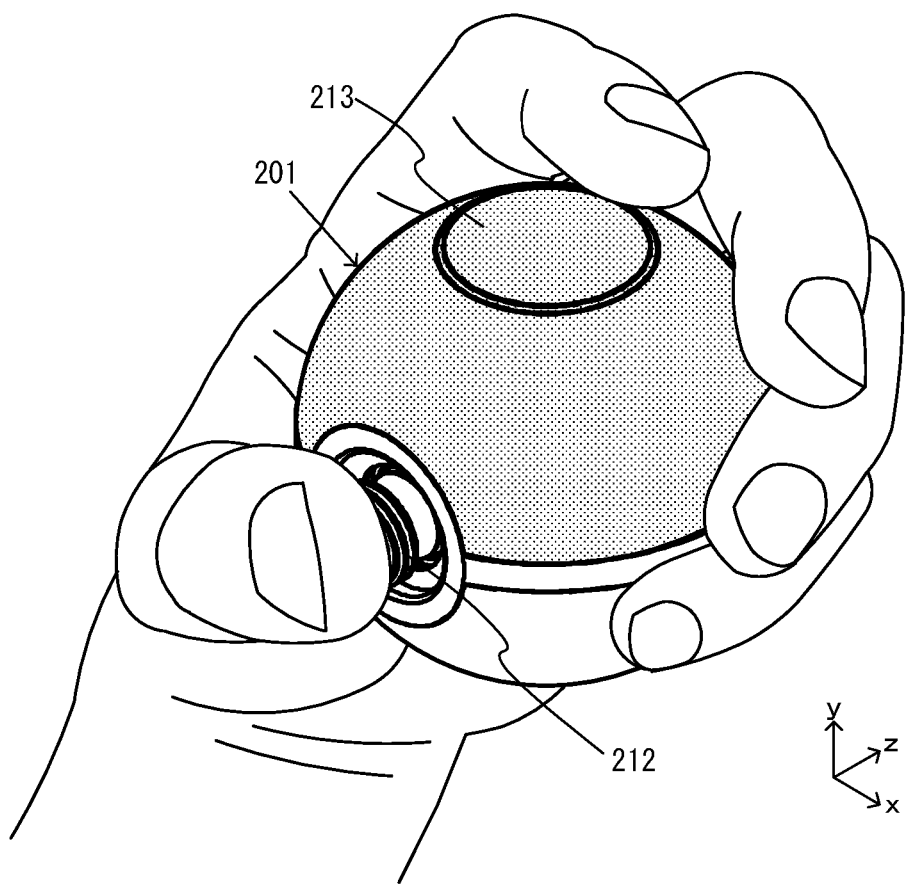
FIG. 12 is a diagram showing an example of how a non-limiting controller main body is held by a user.
Figure 13:
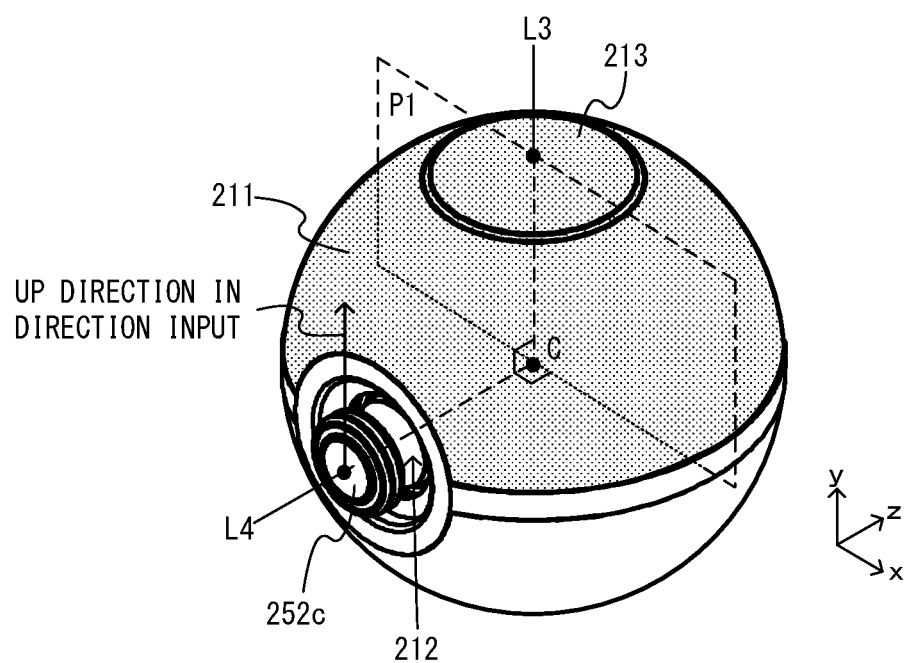
FIG. 13 is a diagram showing an example of a positional relationship between a non-limiting joystick and a non-limiting operation surface.

Referring to FIG. 12 and FIG. 13, the positional relationship between the joystick 212 and the operation surface 213 will now be described. FIG. 12 is a diagram showing an example of how the controller main body is held by the user. As shown in FIG. 12, the user, while holding the controller main body 201 in one hand, is allowed to operate the joystick 212 with the thumb and operate the operation surface 213 with the index finger. Note that FIG. 12 shows an example where the controller main body 201 is held in the left hand of the user. Note however that also when the controller main body 201 is held in the right hand by the user, the user is similarly allowed to operate the joystick 212 with the thumb of the right hand and operate the operation surface 213 with the index finger of the right hand.

As described above, in the exemplary embodiment, the operation surface 213 is provided that is capable of being depressed. Then, the user can use the game controller having a spherical outer shape both to make a direction input using the joystick and to depress the operation surface 213. Thus, it is possible to perform various operations using the game controller having a spherical outer shape.

FIG. 13 is a diagram showing an example of the positional relationship between the joystick and the operation surface. As shown in FIG. 13, in the exemplary embodiment, the operation surface 213 is provided at a position where the straight line L3 passing through the center C of the housing 211 and the operation surface 213 substantially orthogonally crosses the straight line L4 passing through the center C and the joystick 212.

According to the description above, the user can easily operate the joystick 212 and the operation surface 213 with two fingers (e.g., the thumb and the index finger) of one hand. Specifically, in the exemplary embodiment, the user is allowed to hold the controller main body 201 so that the thumb for operating the joystick 212 and the index finger for operating the operation surface 213 can both easily be bent toward the center C of the housing 211 (see FIG. 12). Therefore, since the user can easily apply force on the joystick 212 and the operation surface 213, the user can easily operate the joystick 212 and the operation surface 213.

The "straight line passing through the operation surface 213" is the straight line L3 that passes through the center of the operation surface 213 (see FIG. 13). The "straight line passing through the joystick 212" is the straight line L4 that passes through the center of the operation surface 252c of the joystick 212. Note that the operation surface 252c is a surface on the front side (in other words, the tip side) of the shaft portion (more specifically, the tip portion 252b) of the joystick 212, the details of which will be described later.

Note that it can also be said that the operation surface 213 is provided at such a position that the operation surface 213 crosses the orthogonal straight line that passes through the center C of the housing 211 and that is substantially orthogonal to the straight line L4 that passes through the center C and the joystick 212. Thus, the operation surface 213 may be provided not only at such a position that the center of the operation surface 213 is aligned with the orthogonal straight line in a strict sense, but may also be provided so that the orthogonal straight line crosses the operation surface 213 at any position of the operation surface 213, for example. Also in such a case, the user can easily operate the joystick 212 and the operation surface 213.

In the exemplary embodiment, it can be said that the operation surface 213 is provided at such a position that the direction from the center C of the housing 211 toward the operation surface 213 substantially coincides with the "up input direction" (in other words, provided at a position through which the straight line extending from the center C of the housing 211 in the up input direction passes). Herein, the "up input direction" is the direction in which the shaft portion of the joystick 212 is tilted in order to give an up instruction (see FIG. 13). More specifically, the "up input direction" is the direction in which the shaft portion of the joystick 212 is tilted in order to give an up instruction in a state where no operation is being performed on the joystick 212. That is, in the exemplary embodiment, the "up input direction" is a direction that is perpendicular to the direction from the center of the operation surface 252c of the joystick 212 toward the center C of the housing 211. Note that in a game application in which operations are performed by using the spherical controller 200, for example, an instruction to move up an object (e.g., a game character or a cursor) displayed on the screen can be said to be an "up instruction". Specifically, in the exemplary embodiment, the "up input direction" is the up direction described above. Note that the "down input direction", the "left input direction" and the "right input direction" are defined in a similar manner to the "up input direction".

According to the description above, the operation surface 213 is provided in the direction in which the joystick 212 is tilted to make an up direction. Thus, the operation surface 213 can be arranged at such a position that the operation surface 213 can be operated with the index finger in a case where the joystick 212 is operated with the thumb. That is, it is possible to improve the operability of the joystick 212 and the operation surface 213.

Figure 14:
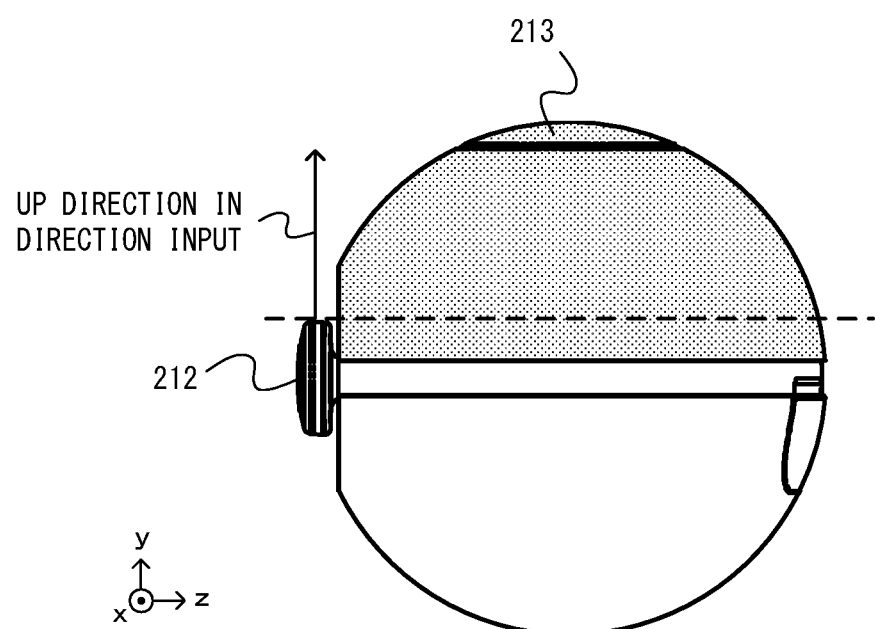
FIG. 14 is a diagram showing an example of a positional relationship between a non-limiting joystick and a non-limiting operation surface.

FIG. 14 is a diagram showing an example of the positional relationship between the joystick and the operation surface. As shown in FIG. 14, it can also be said that the operation surface 213 is provided on the side of the up input direction relative to the joystick 212 (i.e., above the dotted line shown in FIG. 14) in the exemplary embodiment. In other embodiments, the operation surface 213 may be provided at a position that is not the upper end of the controller main body 201 as in the exemplary embodiment but that is on the side of the "up input direction" relative to the joystick. Then, in a case where the joystick 212 is operated with the thumb, the user can easily operate the operation surface 213 with a finger other than the thumb (e.g., the index finger or the middle finger). Therefore, as the operation surface 213 is provided on the side of the up input direction relative to the joystick, it is possible to improve the operability of the joystick 212 and the operation surface 213.

In the exemplary embodiment, the operation surface 213 is capable of being depressed in a direction that is substantially opposite to the up input direction (i.e., the down direction). That is, in the exemplary embodiment, the direction in which the shaft portion is tilted in order to given an up instruction using the joystick 212 is substantially opposite to the direction in which the operation surface 213 is depressed. Thus, it is possible to realize a configuration such that the operation surface 213 can be depressed easily.

Note that the "direction substantially opposite to the up input direction" does not need to be the "direction substantially opposite to the up input direction" in a strict sense, but means to include a direction that generally coincides with the "direction substantially opposite to the up input direction". Note that in the exemplary embodiment, in response to being depressed, the operation surface 213 is deformed while moving downward as a whole, the details of which will be described later. A key top 235 to be described later pivots in response to the operation surface 213 being depressed. Thus, even in an embodiment where the operation surface 213 and/or the key top 235 does not move in the "direction opposite to the up input direction" in a strict sense, it can be said that the operation surface 213 "is capable of being depressed in a direction that is substantially opposite to the up input direction".

As shown in FIG. 13, in the exemplary embodiment, at least a portion (the front half in the exemplary embodiment) of the operation surface 213 is located on the side of the joystick 212 relative to the plane P1 that includes the center C of the housing 211 and that is perpendicular to the direction from the joystick 212 toward the center C of the housing 211 (specifically, the direction from the center of the operation surface 252c of the joystick 212 toward the center C of the housing 211). Then, the operation surface 213 can be arranged at such a position that the operation surface 213 can be easily operated with the index finger in a case where the joystick 212 is operated with the thumb, and it is therefore possible to improve the operability of the joystick 212 and the operation surface 213. Note that in other embodiments, the operation surface 213 may be provided at any position on the side of the joystick 212 relative to the plane P1. In other embodiments, the operation surface 213 may be provided at a position that is on the opposite side from the joystick 212 relative to the plane P1.

In the exemplary embodiment, the joystick 212 is provided between the upper housing part 221 and the lower housing part 223 (i.e., in the middle housing part 222) on the surface of the housing 211, and the operation surface 213 is provided near the zenith of the upper housing part 221 (in other words, near the center of the surface of the upper housing part). In other words, the joystick 212 is positioned at the boundary (e.g., the middle housing part 222) between the first hemispherical portion (e.g., the upper housing part 221) and the second hemispherical portion (e.g., the lower housing part 223) of the spherical housing 211, and the operation surface 213 is provided at the zenith, which is the apex of the first hemispherical portion. According to the description above, it is possible to realize an arrangement such that the joystick 212 and the operation surface 213 can be operated easily with the thumb and the index finger as described above. Note that the "zenith" of a hemisphere refers to a point where a vertical line extended from the center of the hemisphere (i.e., the center of a sphere which the hemisphere is a part of) crosses the spherical surface of the hemisphere when the hemisphere is placed on a horizontal surface with the bottom surface facing down (note however that "zenith" may be referred to simply as "apex").

Herein, the "boundary between the first hemispherical portion and the second hemispherical portion" in the exemplary embodiment refers to a component (e.g., the middle housing part 222) provided between the first hemispherical portion (e.g., the upper housing part 221) and the second hemispherical portion (e.g., the lower housing part 223). Thus, the boundary between the first hemispherical portion and the second hemispherical portion may be a section having a certain area. Note however that the boundary is not limited to a component provided between two hemispherical portions. For example, in other embodiments, the boundary may be a seam between the two hemispherical portions, or a line on the housing 211 (e.g., a line drawn on the housing).

Note that there is no limitation on the position of the operation surface 213, and in other embodiments, the operation surface 213 may be provided at any other position on the upper portion of the housing 211 (i.e., the upper housing part 221) or may be provided on the lower portion of the housing 211 (i.e., the lower housing part 223).

As shown in FIG. 11, an indication 211b indicating the position of the operation surface 213 is provided on the housing 211 in the exemplary embodiment. In the exemplary embodiment, the indication 211b indicates the position corresponding to the outer circumference of the operation surface 213. Specifically, the indication 211b is provided around the boundary between the housing 211 and the operation surface 213. Note that the indication 211b may be provided on the housing 211 or on the operation surface 213. According to the exemplary embodiment, the indication 211b allows the user to recognize a region of the housing 211 to be the operation surface 213 (i.e., a region that can be depressed).

In the exemplary embodiment, the indication 211b is a line of groove (in other words, depression) formed on the surface of the housing 211. Note however that the indication 211b may be any indication with which the user can identify the position of the operation surface 213. Note that in other embodiments, the indication 211b may be a projection (or a depression) provided at the center of the operation surface 213, for example. Thus, by forming a projection and/or a depression on the surface of the housing 211 as the indication, the user can tactilely know the position of the operation surface 213. Note that in other embodiments, the indication 211b may indicate the region of the operation surface 213 by using a color that is different from the color of the region of the housing 211 other than the operation surface 213. Note however that in other embodiments, the indication 211b may be drawn with a paint on the surface of the housing 211. In this way, as in the exemplary embodiment, the indication 211b allows the user to recognize the region of the housing 211 to be the operation surface 213 (i.e., the region that can be depressed).

(Strap Hole)

As shown in (f) of FIG. 10, a strap hole 211c to which the strap portion 202 is attached is provided in the rear end portion of the housing 211. The position of the strap hole 211c is at the center of the spherical controller main body 201 with respect to the up-down direction and the left-right direction (see (f) of FIG. 10). The strap portion 202 is attached to the controller main body 201 by passing the strap chord of the strap portion 202 through the strap hole 211c, the details of which will be described later. Note that in other embodiments, there is no limitation on the position of the strap hole 211c, and the strap hole 211c may be provided at any position on the rear side of the housing 211 or may be provided in the lower end portion of the housing 211, for example.

(Reboot Button)

The controller main body 201 includes the reboot button 214. The reboot button 214 is a button for giving an instruction to reboot the spherical controller 200, the details of which will be described later.

As shown in (c) and (f) of FIG. 10, the reboot button 214 is provided at a position that is on the left side of the rear end of the housing 211. The position in the up-down direction of the reboot button 214 is at the center of the spherical controller main body 201. The position in the front-rear direction of the reboot button 214 is on the rear side relative to the center of the spherical controller main body 201. Note that in other embodiments, there is no limitation on the position of the reboot button 214, and the reboot button 214 may be provided at any position on the rear side of the housing 211, for example.

(Cover Portion)

As shown in (f) of FIG. 10, a cover portion 215 is provided under the strap hole 211c of the housing 211. The cover portion 215 can be opened/closed relative to the portion of the controller main body 201 other than the cover portion 215, the details of which will be described later. A recessed surface (i.e., a recessed surface 245d shown in FIG. 20) is provided on the inside of the cover portion 215, the details of which will be described later. The cover portion 215 is provided so as to cover the recessed surface when the cover portion 215 is in the closed position. On the other hand, when the cover portion 215 is in the open position, the recessed surface is exposed to the outside of the controller main body 201. As shown in (b), (c) and (e) of FIG. 10, the surface of the cover portion 215 is a spherical surface forming a part of the spherical surface of the spherical controller main body 201. Therefore, it can also be said that the cover portion 215 is a part of the housing 211.

[2-2. Internal Configuration of Controller Main Body]

Next, an internal configuration of the controller main body 201 will be described. In the exemplary embodiment, the controller main body 201 is composed of an upper unit including the upper housing part 221 described above, a middle unit including the middle housing part 222 described above, and lower unit including the lower housing part 223 described above (see FIG. 24 and FIG. 25 to be discussed later). The internal configuration will now be described for each unit.

[2-2-1. Upper Unit]

Figure 15:
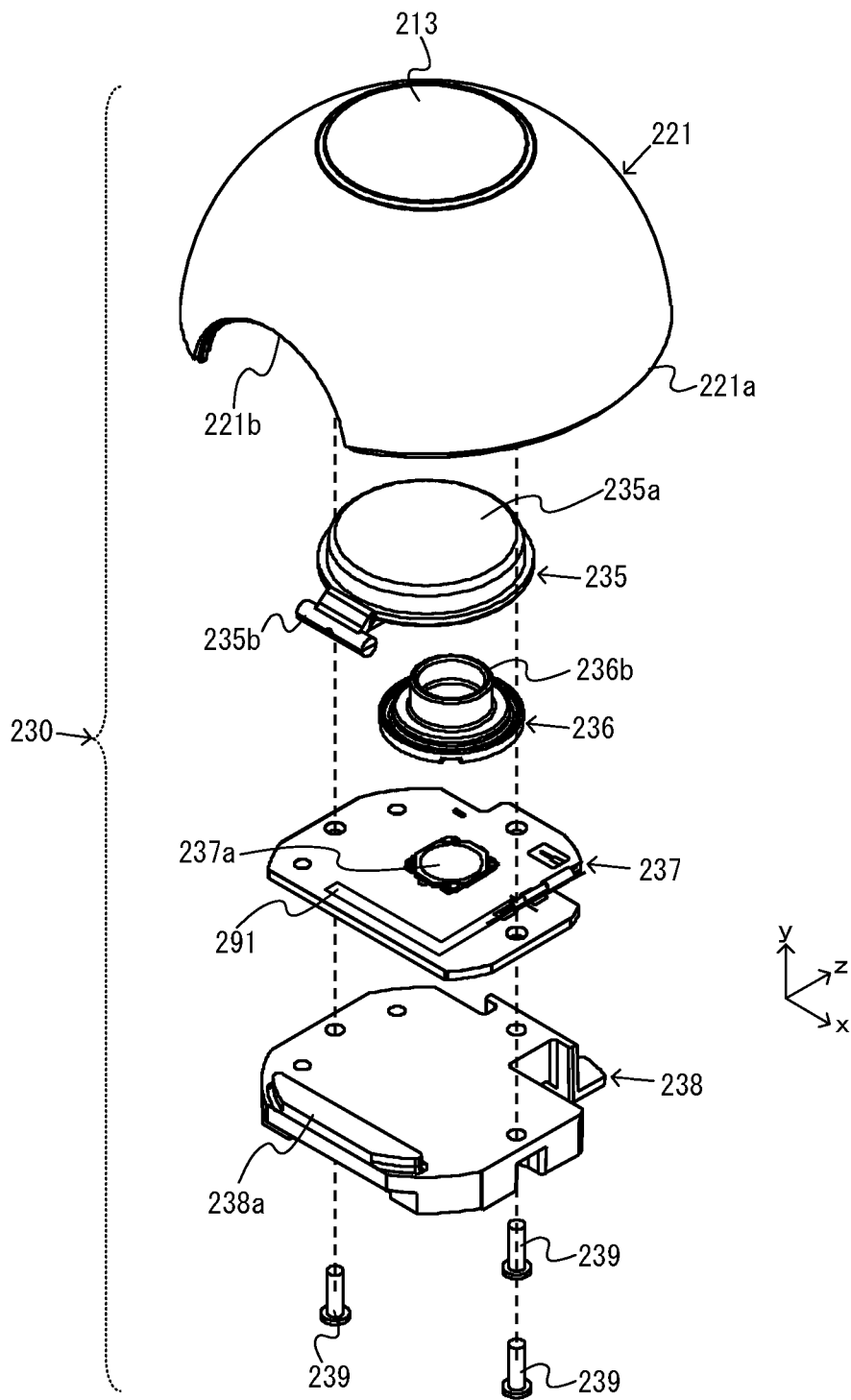
FIG. 15 is an exploded perspective view of an example of a non-limiting upper unit.
Figure 16:
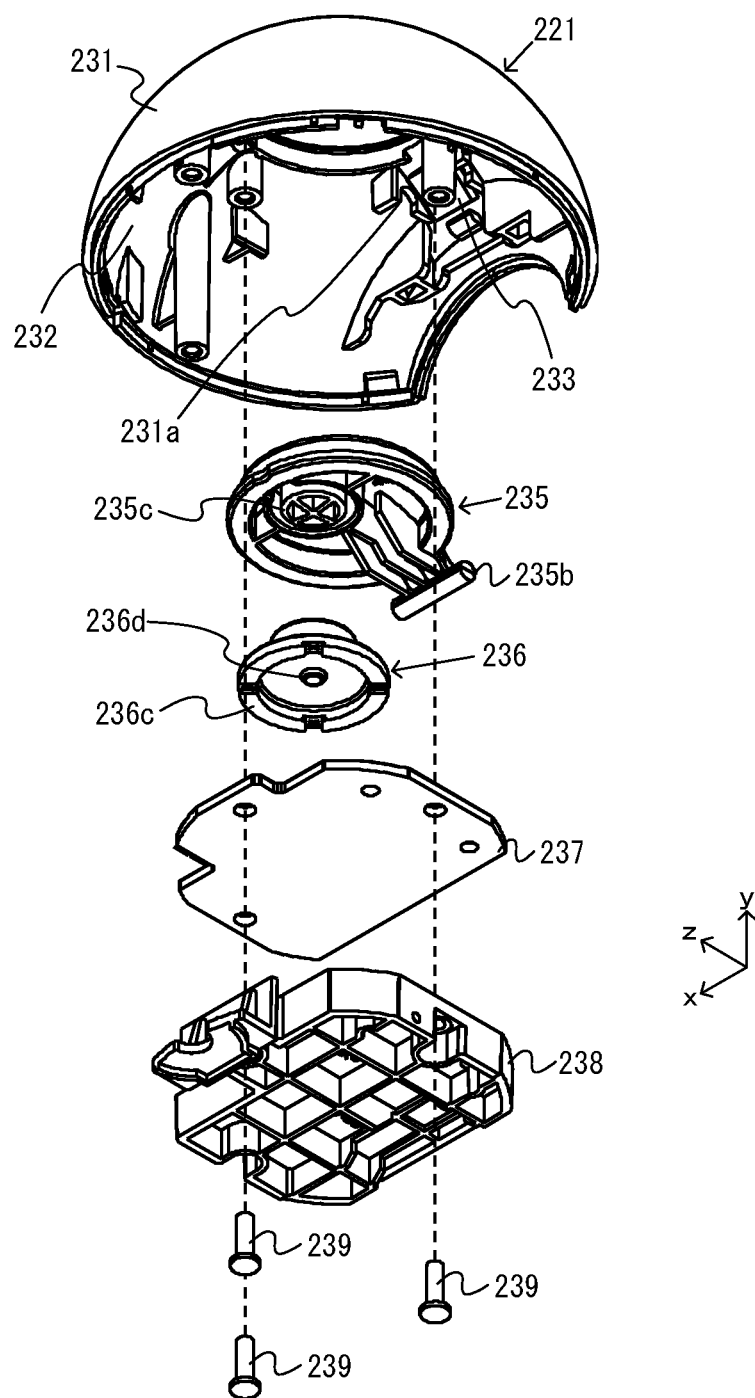
FIG. 16 is an exploded perspective view of an example of a non-limiting upper unit.
Figure 17:
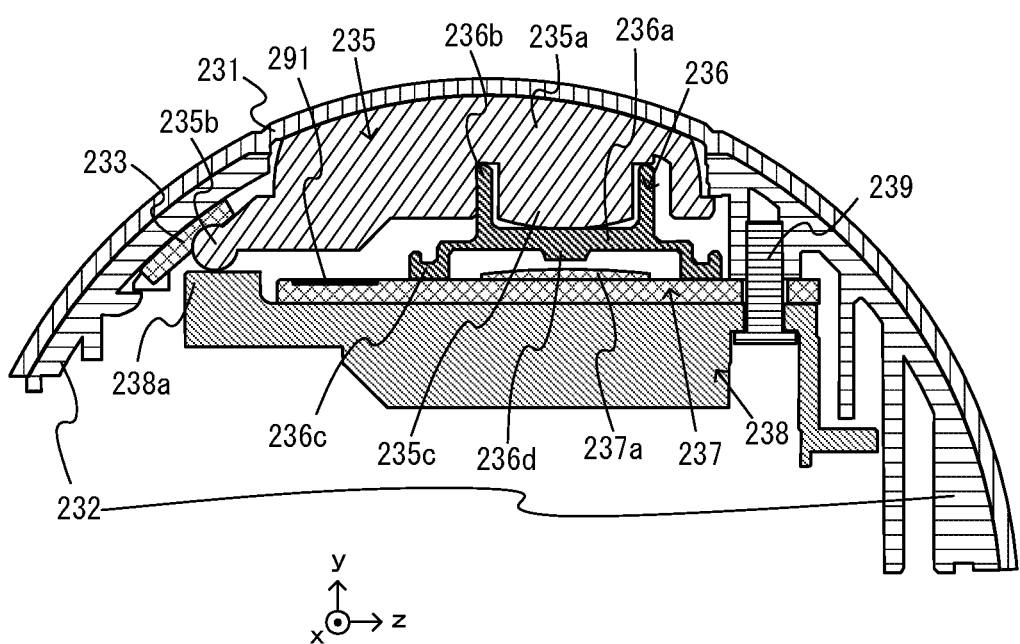
FIG. 17 is a cross-sectional view of an example of a non-limiting upper unit.

FIG. 15 and FIG. 16 are exploded perspective views of an example of an upper unit. FIG. 15 is an exploded perspective view as the upper unit is seen from the upper front side, and FIG. 16 is an exploded perspective view as the upper unit is seen from the lower rear side. FIG. 17 is a cross-sectional view of an example of an upper unit. FIG. 17 is a cross-sectional view showing a cross section that passes through the center of the controller main body 201 and is perpendicular to the left-right direction.

(Upper Housing Part)

As shown in FIG. 15 and FIG. 16, an upper unit 230 includes the upper housing part 221. As described above, the upper housing part 221 has a hemispherical shape. Note that as shown in FIG. 16, the upper housing part 221 is open on the lower side thereof, and does not have a surface that corresponds to the bottom surface of the hemisphere. Therefore, it can also be said that the upper housing part 221 has a hemispherical surface shape. It can also be said that the upper housing part 221 has a shape of a spherical cap (i.e., a side surface portion of a solid obtained by cutting a sphere along a plane (i.e., a spherical segment)).

As shown in FIG. 15 and FIG. 16, in the exemplary embodiment, the upper housing part 221 has a hemispherical shape with a front end portion thereof cut off. Specifically, the upper housing part 221 has a hemispherical shape with a front end portion thereof cut off along a plane that is perpendicular to the front-rear direction. The upper housing part 221 has an edge 221a that is the circumference of the bottom surface of the hemisphere, and an edge 221b that is produced by cutting off the front end portion of the hemispherical surface along the plane described above. The edge 221b defines a shape that appears to be semicircular as the upper housing part 221 is seen from the front side. Note that the shape of the cutout of the upper housing part 221 is a shape corresponding to the shape of the front end surface described above of the middle housing part 222 (specifically, a shape that substantially coincides with the upper edge of the front end surface), and specifically the shape is semicircular. Note however that there is no limitation on the shape of the cutout, and the shape may be any shape other than semicircular in other embodiments.

As shown in FIG. 16 and FIG. 17, the upper housing part 221 has an outer surface portion 231 and an inner wall portion 232. The outer surface portion 231 is a component that forms the outer surface of the upper housing part 221. That is, the outer surface portion 231 has a hemispherical shape as does the upper housing part 221. In the exemplary embodiment, the outer surface portion 231 is integral with the operation surface 213. As does the upper housing part 221, the outer surface portion 231 has a shape obtained by cutting off a front end portion of the hemispherical surface.

In the exemplary embodiment, the outer surface portion 231 is made of a material that is relatively soft (specifically, softer than the inner wall portion 232 or softer than the middle housing part 222). Specifically, the material of the outer surface portion 231 in the exemplary embodiment is an elastomer. The operation surface 213 that is integral with the outer surface portion 231 is also made of the same material as the outer surface portion 231. Note that in the exemplary embodiment, an outer surface portion 272 forming the surface of the lower housing part 223 is also made of an elastic material as is the outer surface portion 231, the details of which will be described later. Thus, in the exemplary embodiment, at least a portion of the surface of the housing 211 is made of an elastic material, making it easier for the user to hold the housing 211. This also improves the feel when the user holds the housing 211. This also makes it easier to absorb a shock on the controller main body 201, and it is possible to reduce the influence of the shock reaching the components inside of the housing 211.

As shown in FIG. 16 and FIG. 17, the inner wall portion 232 is a component that forms the inner wall of the upper housing part 221. The inner wall portion 232 has a hemispherical shape as does the upper housing part 221. More specifically, as does the upper housing part 221, the inner wall portion 232 has a shape obtained by cutting off a front end portion of the hemispherical surface. In the exemplary embodiment, the inner wall portion 232 is made of a material that is harder than the outer surface portion 231. For example, the material of the inner wall portion 232 is a resin that is harder than the elastomer of the outer surface portion 231. The inner wall portion 232 is connected to the inner side of the outer surface portion 231 (see FIG. 17). The inner wall portion 232 is attached to the inner side of the outer surface portion 231 via an adhesive or thermal fusion, for example. Note that the inner wall portion 232 is sized so that the outer surface of the inner wall portion 232 coincides with the inner surface of the outer surface portion 231.

Herein, the inner wall portion 232 has a hole therein provided in the upper end portion of the hemispherical surface. Specifically, the inner wall portion 232 has a hole therein provided so as to correspond to the operation surface 213. The hole in the inner wall portion 232 has a circular shape of substantially the same size as the circular operation surface 213. Of the inner surface of the outer surface portion 231 and the operation surface 213, the region other than the reverse side of the operation surface 213 is attached to the inner wall portion 232, and the region on the reverse side of the operation surface 213 is not attached to the inner wall portion 232. Therefore, since the outer surface portion 231 is reinforced by the inner wall portion 232, the outer surface portion 231 does not deform significantly even when some force is applied thereto. On the other hand, the operation surface 213 is not reinforced by the inner wall portion 232, and deforms when some force is applied thereto. For example, the operation surface 213 deforms by being depressed from above, and moves downward. Thus, in the exemplary embodiment, the outer surface portion 231 and the operation surface 213 are integral together and the region of the operation surface 213 can be depressed.

In the exemplary embodiment, the inner wall portion 232 is black. In the exemplary embodiment, a light-emitting section (i.e., a light-emitting section 248 shown in FIG. 19) is provided inside the housing 211, and light is emitted through the opening 211a of the housing 211 to the outside of the housing 211, the details of which will be described later. Therefore, in the exemplary embodiment, the inner wall portion 232 is made of a black material so as to prevent light from the light-emitting section from passing through the inner wall portion 232 as much as possible.

As shown in FIG. 16, the inner wall portion 232 is provided with a bearing portion 231a. The bearing portion 231a has a groove into which a rotation shaft 235b of the key top 235 to be described later can be inserted.

As shown in FIG. 16 and FIG. 17, the upper housing part 221 includes a shock absorber 233. The shock absorber 233 is provided on a portion of the inner surface of the inner wall portion 232 with which the rotation shaft of the key top to be described later comes into contact, the details of which will be described later.

(Key Top)

As shown in FIG. 15 to FIG. 17, the upper unit 230 includes the key top 235. The key top 235 is an example of a movable portion that can move in response to the operation surface 213 being depressed. In the exemplary embodiment, the key top 235 pivots in response to the operation surface 213 being depressed, the details of which will be described later. Therefore, it can also be said that the key top 235 is an example of a pivot portion that pivots in response to the operation surface 213 being depressed.

As shown in FIG. 15 and FIG. 17, the key top 235 includes a disc portion 235a having a disc shape, and the rotation shaft 235b. In the exemplary embodiment, the rotation shaft 235b is provided on the front side of the disc portion 235a. The key top 235 is provided so that it can pivot about the rotation shaft 235b, the details of which will be described later. As shown in FIG. 16 and FIG. 17, a protruding portion 235c is provided on the lower side of the disc portion 235a.

(Key Rubber)

As shown in FIG. 15, the upper unit 230 includes a key rubber 236. The key rubber 236 is made of an elastic material such as a rubber, for example. The key rubber 236 deforms as the key top 235 (specifically, the protruding portion 235c) moves downward, the details of which will be described later.

As shown in FIG. 15 and FIG. 17, the key rubber 236 includes a disc portion 236a having a disc shape. As shown in FIG. 15 and FIG. 17, the key rubber 236 includes a cylindrical portion 236b having a cylindrical shape provided on the upper side of the disc portion 236a. The cylindrical portion 236b is provided so as to extend upward from the vicinity of the center of the disc portion 236a. The cylindrical portion 236b is provided for the purpose of deforming the key rubber 236 in response to the movement of the key top 235, the details of which will be described later.

As shown in FIG. 16 and FIG. 17, the key rubber 236 includes an annular portion 236c protruding downward from the outer circumference portion of the disc portion 236a. The key rubber 236 also includes a protruding portion 236d protruding downward from the vicinity of the center of the disc portion 236a. As shown in FIG. 17, with no force applied to the key rubber 236, the annular portion 236c protrudes below the protruding portion 236d.

(Sub-Substrate)

As shown in FIG. 15 and FIG. 16, the upper unit 230 includes a sub-substrate 237. In the exemplary embodiment, the sub-substrate 237 is a plate-shaped substrate. Note however that the sub-substrate 237 may be a flexible print circuit board that can be bent. The sub-substrate 237 is provided with a contact 237a which the key rubber 236 comes into contact with when the operation surface 213 is operated, and a detection circuit for detecting the contact of the key rubber 236 with the contact 237a, the details of which will be described later. Note that there is no limitation on the specific configuration of the contact 237a. For example, the contact 237a may include a movable contact that moves in response to the downward movement of the key rubber 236, and a fixed contact which the movable contact comes into contact with when the movable contact moves. While a component including a movable contact and a fixed contact is referred to as a contact in the present specification, such a component can also be called a switch. As shown in FIG. 17, the sub-substrate 237 is also provided with an antenna 291. In the exemplary embodiment, the antenna 291 is provided on the front side of the sub-substrate 237.

(Sub-Substrate Holding Portion)

As shown in FIG. 15 and FIG. 16, the upper unit 230 includes a sub-substrate holding portion 238 for holding the sub-substrate 237. The sub-substrate holding portion 238 includes a flat upper surface to which the sub-substrate 237 is attached. The sub-substrate holding portion 238 also includes a protruding portion 238a protruding from the upper surface. The protruding portion 238a is provided at the front end of the upper surface of the sub-substrate holding portion 238.

(Arrangement of Components)

As shown in FIG. 15 and FIG. 16, the components included in the upper unit 230 are arranged in the following order from top to bottom: the upper housing part 221, the key top 235, the key rubber 236, the sub-substrate 237 and the sub-substrate holding portion 238. In the exemplary embodiment, the components included in the upper unit 230 are secured by screws 239 (three screws 239 in the exemplary embodiment). Specifically, screw holes that are open on the lower side are provided on the inner surface of the inner wall portion 232 of the upper housing part 221. The sub-substrate 237 and the sub-substrate holding portion 238 are provided with holes at positions corresponding to the screw holes. As shown in FIG. 15 and FIG. 16, the screws 239 are screwed into the screw holes of the upper housing part 221 through the holes of the sub-substrate 237 and the holes of the sub-substrate holding portion 238, thereby securing together the upper housing part 221, the sub-substrate 237 and the sub-substrate holding portion 238.

The key top 235 is held by being sandwiched between the upper housing part 221 and the sub-substrate 237. Specifically, as shown in FIG. 17, the rotation shaft 235b of the key top 235 is sandwiched between the upper housing part 221 and the protruding portion 238a of the sub-substrate holding portion 238. Thus, the rotation shaft 235b is secured with respect to the up-down direction. The key top 235 is provided in such an orientation that the rotation shaft 235b is parallel to the left-right direction. The rotation shaft 235b is inserted into the groove of the bearing portion 231a. The rotation shaft 235b is secured with respect to the left-right direction by this groove. Thus, the key top 235 is held so that the key top 235 can pivot about the rotation shaft 235b with respect to the upper housing part 221.

Note that in the exemplary embodiment, the shock absorber 233 is provided on a portion of the inner surface of the upper housing part 221 where the rotation shaft 235b comes into contact. Therefore, the rotation shaft 235b sandwiched between the upper housing part 221 and the sub-substrate 237 is held while pressing and deforming the shock absorber 233. Thus, it is possible to reduce the rattling of the rotation shaft 235b.

As shown in FIG. 17, the key top 235 is provided on the inner side of the upper housing part 221. The upper surface of the disc portion 235a of the key top 235 is in contact with the reverse side of the operation surface 213, which is continuous with the outer surface portion 231 of the upper housing part 221.

As shown in FIG. 15, the key rubber 236 is attached under the key top 235. The key rubber 236 is provided between the key top 235 and the sub-substrate 237. Specifically, the protruding portion 235c of the key top 235 is inserted into the cylindrical portion 236b of the key rubber 236 (see FIG. 17). Thus, the key top 235 and the key rubber 236 are connected together. Therefore, when the key top 235 moves, the cylindrical portion 236b moves integrally with the key top 235, deforming the key rubber 236. As shown in FIG. 17, the key rubber 236 is provided so that the annular portion 236c is in contact with the sub-substrate 237 with the protruding portion 235c inserted in the cylindrical portion 236b. Note that the protruding portion 236d is arranged at a position opposing the contact 237a of the sub-substrate 237.

Herein, while the operation surface 213 is not being operated (e.g., the state shown in FIG. 17), the key rubber 236 is kept in its original shape (i.e., un-deformed shape). That is, in this state, the annular portion 236c is in contact with the sub-substrate 237, and the protruding portion 236d is not in contact with the contact 237a of the sub-substrate 237.

Figure 18:
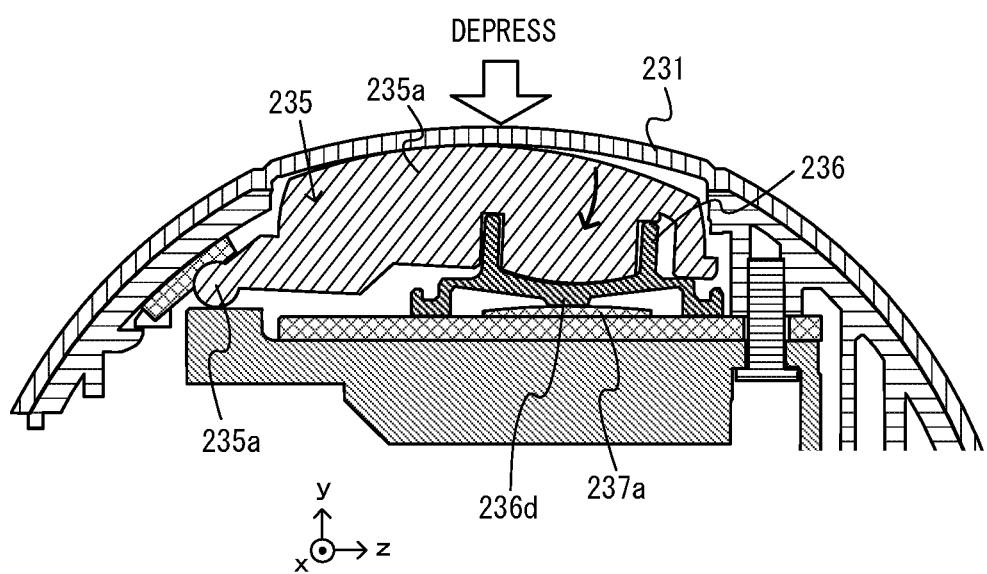
FIG. 18 is a cross-sectional view of an example of a non-limiting upper unit with a non-limiting operation surface depressed.

FIG. 18 is a cross-sectional view of an example of the upper unit with the operation surface 213 depressed. As shown in FIG. 18, when the operation surface 213 is depressed, the operation surface 213 deforms and moves downward (see the arrow shown in FIG. 18). In response to the downward movement of the operation surface 213, the key top 235 pivots about the rotation shaft 235b, and the disc portion 235a moves downward. In response to the downward movement of the disc portion 235a, the key rubber 236 deforms, and the protruding portion 236d moves downward. As a result, the protruding portion 236d comes into contact with the contact 237a of the sub-substrate 237. The detection circuit of the sub-substrate 237 detects the contact of the protruding portion 236*d* with the contact 237*a*. Thus, the spherical controller 200 can detect an operation performed on the operation surface 213.

Note that when there is no longer a depressing operation on the operation surface 213, the key rubber 236 returns to its original shape by its own elasticity. Thus, the protruding portion 236*d* and the contact 237*a* are no longer in contact with each other.

As described above, in the exemplary embodiment, the spherical controller 200 includes a movable portion (i.e., the key top 235), a detection section (i.e., a detection circuit provided on the sub-substrate 237). The movable portion can pivot about a rotation shaft (specifically, the rotation shaft 235*b* parallel to the left-right direction) that is substantially perpendicular to the straight line that connects together the center of the housing 211 and the operation surface 213, and pivots in response to the operation surface 213 being depressed. The detection section detects the operation on the operation surface 213 in response to the pivot of the movable portion. Therefore, according to the exemplary embodiment, no matter which part of the operation surface 213 is depressed, the movable portion pivots in one direction, and the detection section detects the operation based on the pivot of the movable portion. Thus, the detection section can easily detect the operation no matter which part of the operation surface 213 is depressed. Therefore, according to the exemplary embodiment, it is possible to reduce the possibility that the operation on the operation surface 213 is not detected.

In the exemplary embodiment, the rotation shaft 235*b* of the key top 235 is provided on the front side of the disc portion 235*a* (see FIG. 17). In other words, the rotation shaft 235*b* is provided on the front side relative to the center of the operation surface 213. Therefore, it can be said that the rotation shaft 235*b* is provided at such a position that the distance from the joystick 212 to the rotation shaft 235*b* is shorter than the distance from the joystick 212 to the operation surface 213.

By providing the rotation shaft 235*b* at such a position, the rear side of the key top 235 moves farther than the front side thereof when the operation surface 213 is depressed. Therefore, it is easier for the user to depress a rear position of the operation surface 213 because the distance by which the operation surface 213 is depressed is greater, than to depress a front position thereof. On the other hand, assuming a case where the user operates the joystick 212 with the thumb and the operation surface 213 with the index finger (see FIG. 12), it is believed that it is more likely that the user depresses a rear side, than a front side, relative to the center of the operation surface 213. Therefore, according to the exemplary embodiment, it is made easier for the user to depress a position (i.e., a rear position) of the operation surface 213 that the user is more likely to operate, thus improving the operability of the depressing operation.

As described above, in the exemplary embodiment, the rotation shaft 235*b* of the key top 235 is provided parallel to the left-right direction. In other embodiments, the orientation of the rotation shaft 235*b* is not limited to the left-right direction, but may be any other orientation. For example, in other embodiments, the rotation shaft 235*b* may be provided to be parallel to the front-rear direction. Then, the rotation shaft 235*b* may be provided on the left side relative to the center of the operation surface 213 or may be provided on the right side relative to the center of the operation surface 213. For example, when it is assumed that the spherical controller 200 is to be held and operated by the left hand, the rotation shaft 235*b* may be provided on the left side relative to the center of the operation surface 213 so as to make it easier for the user to depress the right side of the operation surface 213. For example, when it is assumed that the spherical controller 200 is to be held and operated by the right hand, the rotation shaft 235*b* may be provided on the right side relative to the center of the operation surface 213 so as to make it easier for the user to depress the left side of the operation surface 213.

Note that there is no limitation on the configuration for detecting the operation surface 213 being depressed, and it is not limited to that of the exemplary embodiment. For example, in other embodiments, the key top and the key rubber may be integral together by an elastic material, for example. In other embodiments, the spherical controller 200 may include no key top and no key rubber, in which case the contact 237*a* of the sub-substrate 237 may be provided at such a position that the operation surface 213 depressed directly comes into contact with the contact 237*a*. In other embodiments, the spherical controller 200 may include a movable portion that can move in parallel to the up-down direction, instead of a movable portion that can pivot (i.e., the key top 235 and the key rubber 236).

[2-2-2. Middle Unit]

Figure 20:
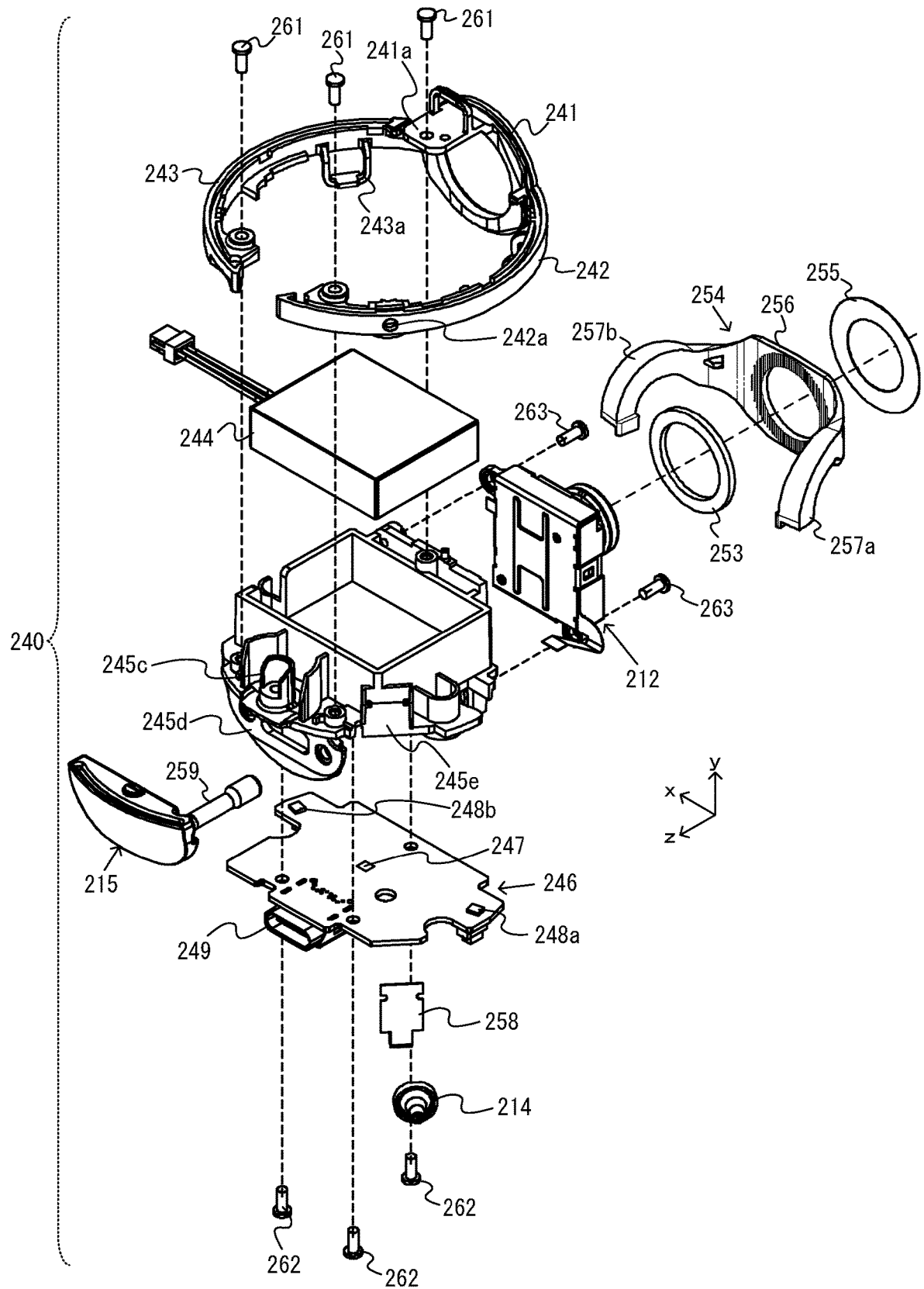
FIG. 20 is an exploded perspective view of an example of a non-limiting middle unit.
Figure 21:
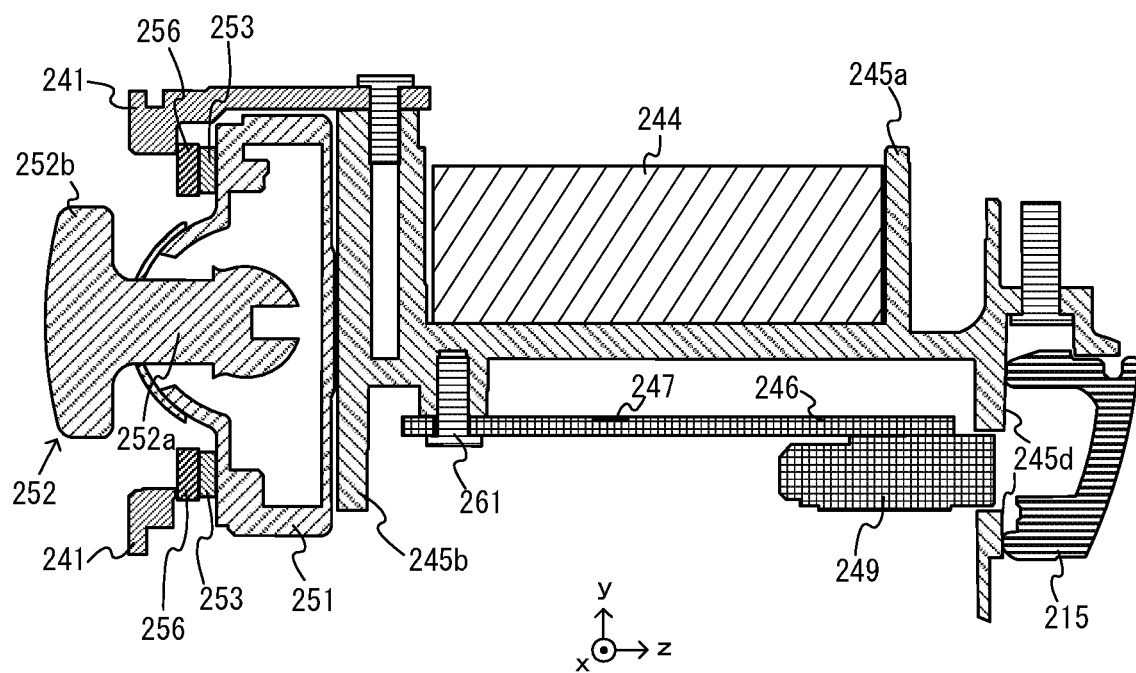
FIG. 21 is a cross-sectional view of an example of a non-limiting middle unit.

FIG. 19 and FIG. 20 are exploded perspective views of an example of a middle unit. FIG. 19 is an exploded perspective view of the middle unit as seen from the upper front side, and FIG. 20 is an exploded perspective view of the middle unit as seen from the upper rear side. FIG. 21 is a cross-sectional view of the example of the middle unit. FIG. 21 is a cross-sectional view showing a cross section that passes through the center of the controller main body 201 and is perpendicular to the left-right direction.

(Middle Housing Part)

As shown in FIG. 19 to FIG. 21, a middle unit 240 includes the middle housing part 222. The middle housing part 222 has a ring shape with a portion at the rear end thereof cut off. Specifically, the middle housing part 222 includes a front surface portion 241, a left band-shaped portion 242 and a right band-shaped portion 243.

The front surface portion 241 is provided in the front end portion of the middle housing part 222. The front surface portion 241 includes a flat surface portion on the front side. The front side surface of the front surface portion 241 is the front end surface (i.e., the flat surface of the front end portion of the housing 211). The opening 211*a* described above is provided in the front end surface of the front surface portion 241. Therefore, it can be said that the front surface portion 241 is an annular portion surrounding the opening 211*a*. In the exemplary embodiment, the front end surface has a circular shape. Note however that in other embodiments, there is no limitation on the shape of the front end surface, and it may be a quadrilateral shape, for example.

As shown in FIG. 20, the front surface portion 241 includes an attachment portion 241*a*, on the upper side of the front end surface, that extends toward the inside of the housing 211. The attachment portion 241*a* is provided with a hole for receiving therethrough a screw for securing the main substrate support portion to be described later on the middle housing part 222.

The two band-shaped portions 242 and 243 are provided so as to extend from the left and right ends of the front surface portion 241. That is, the left band-shaped portion 242 is band-shaped and is provided so as to extend from the left end of the front surface portion 241. In other words, the left band-shaped portion 242 extends from the front surface portion 241 to the left input direction of the joystick 212.

The right band-shaped portion 243 is band-shaped and is provided so as to extend from the right end of the front surface portion 241. In other words, the right band-shaped portion 243 extends from the front surface portion 241 to the right input direction of the joystick 212. The band-shaped portions 242 and 243 each form a part of the spherical surface of the spherical housing 211. Specifically, the band-shaped portions 242 and 243 are provided along the spherical zone defined by two planes perpendicular to the up-down direction running through the housing 211 (i.e., a band-shaped portion of a spherical surface that is defined between two parallel planes running through the spherical surface). Note that "the band-shaped portions provided along the spherical zone" means to include embodiments where the surfaces of the band-shaped portions coincide with the spherical zone and embodiments where the surfaces of the band-shaped portions do not coincide with the spherical zone in a strict sense. For example, in other embodiments, the surfaces of the band-shaped portions may not be spherical surfaces but may be curved surfaces similar to those of the side surface of a cylinder.

In the exemplary embodiment, the rear end of the left band-shaped portion 242 is not continuous with the rear end of the right band-shaped portion 243. The space defined between the rear end of the left band-shaped portion 242 and the rear end of the right band-shaped portion 243 becomes the strap hole 211c described above (FIG. 10), the details of which will be described later. Holes for receiving therethrough screws for securing the main substrate support portion to be described later on the middle housing part 222 are provided in the band-shaped portions 242 and 243 near the rear end thereof (see FIG. 19 and FIG. 20).

As shown in FIG. 19 and FIG. 20, the right band-shaped portion 243 includes a tab-receiving portion 243a. Although not shown in the figure, the left band-shaped portion 242 includes a tab-receiving portion similar to the tab-receiving portion 243a of the right band-shaped portion 243. When the middle housing part 222 and the lower housing part 223 are connected together, the tab of the lower housing part 223 (i.e., a tab 273e shown in FIG. 23) engages with the tab-receiving portion, the details of which will be described later. Note that while the tab-receiving portion is provided on the front side relative to the center of the controller main body 201 in the exemplary embodiment, there is no limitation on the position of the tab-receiving portion.

As shown in FIG. 19, the right band-shaped portion 243 includes a tab 243b. The tab 243b is provided so as to extend upward from the right band-shaped portion 243 and further extend toward the inside of the housing 211. The left band-shaped portion 242 includes a tab similar to the tab 243b of the right band-shaped portion 243. The tab engages with a hole (i.e., a hole 257c shown in FIG. 31) provided in a lightguide 254, the details of which will be described later.

As shown in FIG. 20, a hole 242a is provided in the left band-shaped portion 242. In the exemplary embodiment, the hole 242a is provided on the rear side relative to the center of the controller main body 201. The hole 242a is provided for exposing the reboot button 214 described above to the outside of the housing 211.

In the exemplary embodiment, the middle housing part 222 is made of a material that is harder than the outer surface portion 231 of the upper housing part 221 (and the lower housing part 223). For example, the material of the middle housing part 222 is a resin that is harder than the outer surface portion 231 (herein, an elastomer). Therefore, in the exemplary embodiment, the housing 211 includes a first portion (i.e., the middle housing part 222) that is provided surrounding the joystick 212, and a second portion (i.e., the upper housing part 221 and the lower housing part 223) that is provided surrounding the first portion and whose surface is made of a material that is softer than the surface of the first portion. Then, a portion of the housing 211 that is around the joystick 212 (i.e., the first portion) is made of a hard material. Therefore, when the user is operating the joystick 212, for example, it is possible to reduce the possibility that this portion is scratched or worn out by the finger of the user and/or the joystick 212, for example.

The middle housing part 222 is made of a black material, for example, as is the inner wall portion 232 of the upper housing part 221, so that light from the light-emitting section is prevented from passing through the middle housing part 222 as much as possible.

(Main Substrate Holding Portion)

As shown in FIG. 19 and FIG. 20, the middle unit 240 includes a main substrate holding portion 245. The main substrate holding portion 245 holds some components included in the middle unit 240 (e.g., a rechargeable battery 244, a main substrate 246, etc.).

As shown in FIG. 19 and FIG. 21, the main substrate holding portion 245 includes a frame portion 245a to which the rechargeable battery 244 is attached. The frame portion 245a is shaped so that the rechargeable battery 244 can be accommodated inside the frame portion 245a. Specifically, in the exemplary embodiment, the frame portion 245a includes four walls to be in contact with the side surfaces of the rechargeable battery 244 having a rectangular parallelepiped shape.

As shown in FIG. 19 and FIG. 21, the main substrate holding portion 245 includes a stick attachment portion 245b to which the joystick 212 is attached. The stick attachment portion 245b is provided on the front side of the frame portion 245a. The front side surface of the stick attachment portion 245b is a flat surface perpendicular to the front-rear direction. A screw hole that is open on the front side is provided in the front side flat surface of the stick attachment portion 245b. The screw hole is for attaching the joystick 212 to the main substrate holding portion 245.

A screw hole that is open on the upper side is provided between the frame portion 245a and the stick attachment portion 245b (see FIG. 19). The screw hole is for securing together the main substrate holding portion 245 and the middle housing part 222.

As shown in FIG. 20, the main substrate holding portion 245 includes a strap attachment shaft 245c to which the strap portion 202 is attached. The strap attachment shaft 245c is provided on the rear side of the frame portion 245a. The strap attachment shaft 245c has a tubular shape extending in the up-down direction. The hole provided at the center of the strap attachment shaft 245c is for receiving therethrough a screw for securing together the main substrate holding portion 245 and the upper housing part 221, the details of which will be described later. As described above, the strap portion 202 can be attached to the controller main body 201 by passing the strap chord of the strap portion 202 around the strap attachment shaft 245c.

Note that on the rear side of the frame portion 245a, screw holes that are open on the upper side are provided on the opposite (left and right) sides of the strap attachment shaft 245c (see FIG. 20). The screw holes are for securing together the main substrate holding portion 245 and the middle housing part 222.

As shown in FIG. 20 and FIG. 21, the main substrate holding portion 245 has the recessed surface 245d. The recessed surface 245d is provided on the rear side of the frame portion 245a and on the lower side of the strap attachment shaft 245c. In the exemplary embodiment, the recessed surface 245d is provided so as to be substantially perpendicular to the front-rear direction. The recessed surface 245d is provided with a hole through which the charging terminal provided on the main substrate 246 is exposed to the outside of the recessed surface 245d (see FIG. 29), the details of which will be described later. The recessed surface 245d is also provided with a hole for receiving therethrough a screw for securing together the main substrate holding portion 245 and the lower housing part 223 (see FIG. 26). Moreover, the recessed surface 245d is provided with an attachment hole (i.e., a hole 245f shown in FIG. 29) for the attachment of the cover portion 215 described above (see FIG. 10).

As shown in FIG. 20, the main substrate holding portion 245 includes a detection circuit attachment portion 245e to which a button detection section 258 to be described later is attached. The detection circuit attachment portion 245e is provided at a position on the outer surface of the frame portion 245a that corresponds to the hole 242a of the middle housing part 222. The detection circuit attachment portion 245e is provided at the rear left corner on the outer surface of the frame portion 245a.

As shown in FIG. 19 and FIG. 20, the main substrate holding portion 245 is secured on the middle housing part 222. The main substrate holding portion 245 is provided at such a position that the main substrate holding portion 245 is surrounded by the annular middle housing part 222. In the exemplary embodiment, the main substrate holding portion 245 and the middle housing part 222 are secured together by screws 261 (three screws 261 in the exemplary embodiment). As described above, three screw holes that are open on the upper side are provided in the main substrate holding portion 245. The middle housing part 222 is provided with holes at positions corresponding to the screw holes. As shown in FIG. 19 and FIG. 20, the middle housing part 222 and the main substrate holding portion 245 are secured together by screwing the screws 261 into the screw holes of the main substrate holding portion 245 through the holes of the middle housing part 222.

(Rechargeable Battery)

As shown in FIG. 19 to FIG. 21, the middle unit 240 includes the rechargeable battery 244. The rechargeable battery 244 supplies power to the electronic components of the spherical controller 200. The rechargeable battery 244 is electrically connected to the main substrate 246 to be described later. The rechargeable battery 244 is provided in the frame portion 245a of the main substrate holding portion 245. The rechargeable battery 244 is secured on the frame portion 245a by a double-side tape, an adhesive, or the like, for example.

(Main Substrate)

As shown in FIG. 19 to FIG. 21, the middle unit 240 includes the main substrate 246. In the exemplary embodiment, the main substrate 246 is a plate-shaped substrate. Note however that the main substrate 246 may be a flexible print circuit board that can be bent.

An acceleration sensor 247 is provided on the main substrate 246 (see FIG. 19). The acceleration sensor 247 is an example of an inertia sensor and senses movement and rotation about three axis directions (specifically, the up-down direction, the left-right direction and the front-rear direction). In other embodiments, a gyrosensor may be provided as an example of an inertia sensor. The acceleration sensor 247 is provided in the vicinity of the center of the upper surface of the main substrate 246 so that the acceleration sensor 247 is arranged in the vicinity of the center of the controller main body 201 (see FIG. 19 and FIG. 21), the details of which will be described later.

A light-emitting section for emitting light is provided on the main substrate 246. In the exemplary embodiment, the spherical controller 200 includes two light-emitting sections 248a and 248b (see FIG. 19). Specifically, the left light-emitting section 248a is provided near the left end of the upper surface of the main substrate 246, and the other, right light-emitting section 248b is provided near the end of the upper surface of the main substrate 246. Note that in the present specification, the left light-emitting section 248a and the right light-emitting section 248b may be referred to collectively as "the light-emitting section 248". In the exemplary embodiment, the light-emitting sections 248 are each provided on the outer side of the joystick 212 with respect to the left-right direction. That is, the light-emitting sections 248 are provided at such positions that they do not overlap the joystick 212 as seen from the front-rear direction.

A charging terminal 249 is provided on the main substrate 246 (see FIG. 20). The charging terminal 249 is a terminal for receiving power supply for charging the rechargeable battery 244 from outside the spherical controller 200. In the exemplary embodiment, the charging terminal 249 is provided at the rear end of the lower surface of the main substrate 246. The charging terminal 249 is provided so that the rear end of the charging terminal 249 protrudes from the rear end of the main substrate 246.

Although not shown in the figures, a control section (in other words, a processor) for controlling the operation of the spherical controller 200 is provided on the main substrate 246. Holes for receiving therethrough screws for securing the main substrate 246 on the main substrate holding portion 245 are provided in the main substrate 246 (see FIG. 19 and FIG. 20).

As shown in FIG. 19 to FIG. 21, the main substrate 246 is provided on the lower side of the main substrate holding portion 245. In the exemplary embodiment, the main substrate 246 and the main substrate holding portion 245 are secured together by screws 262 (three screws 262 in the exemplary embodiment). Specifically, screw holes that are open on the lower side are provided on the lower side of the main substrate holding portion 245. As described above, holes are provided in the main substrate 246 at positions corresponding to the screw holes. As shown in FIG. 19 to FIG. 21, the screws 262 are screwed into the screw holes of the main substrate holding portion 245 through the holes of the main substrate 246, thereby securing together the main substrate 246 and the main substrate holding portion 245.

As shown in FIG. 21, with the main substrate 246 secured on the main substrate holding portion 245, the charging terminal 249 is exposed through the hole in the recessed surface 245d of the main substrate holding portion 245. As shown in FIG. 21, the rear end of the charging terminal 249 is provided so as not to protrude past the recessed surface 245d (i.e., on the front side relative to the recessed surface 245d).

(Joystick)

As shown in FIG. 19 and FIG. 20, the middle unit 240 includes the joystick 212 described above. The joystick 212 includes a base portion 251 and the shaft portion 252. The base portion 251 has a rectangular parallelepiped shape, and the shaft portion 252 is provided on the front side of the base portion 251. As shown in FIG. 21, the shaft portion 252 includes a rod-shaped portion 252a and the tip portion 252b. Specifically, the rod-shaped portion 252a has a rod-like shape extending in the front-rear direction, and is connected to the base portion 251 on the rear end. The tip portion 252b has a disc shape and is provided on the front end of the rod-shaped portion 252a. The front side surface of the tip portion 252b is the operation surface of the joystick 212 (i.e., the operation surface 252c shown in FIG. 13). Note that while the shaft portion 252 is not operated, the tip portion 252b is arranged so that the operation surface is substantially perpendicular to the front-rear direction. The shaft portion 252 is provided so that the shaft portion 252 can be tilted with respect to the base portion 251 in response to a tilt operation by the user. The shaft portion 252 is provided so that the shaft portion 252 can move in response to the push-in operation by the user. Note that the configuration of the joystick 212 may be similar to those of conventional analog stick units.

As shown in FIG. 19 to FIG. 21, the joystick 212 is provided on the front side of the main substrate holding portion 245. Specifically, the joystick 212 is attached to the stick attachment portion 245b of the main substrate holding portion 245. In the exemplary embodiment, the joystick 212 and the main substrate holding portion 245 are secured together by screws 263 (two screws 263 in the exemplary embodiment). As described above, screw holes that are open on the front side are provided in the stick attachment portion 245b. Holes are provided in the base portion 251 of the joystick 212 at positions corresponding to the screw holes. As shown in FIG. 19 and FIG. 20, the screws 263 are screwed into the screw holes of the stick attachment portion 245b through the holes of the base portion 251, thereby securing together the joystick 212 and the main substrate holding portion 245.

In the exemplary embodiment, the joystick 212 is attached in such an orientation that the rear surface of the base portion 251 opposes the stick attachment portion 245b. Therefore, the joystick 212 is provided so that the shaft portion 252 (specifically, the axial direction of the shaft portion 252 or the operation surface of the tip portion 252b) is facing in the front direction as shown in FIG. 19. The joystick 212 is provided so that the rod-shaped portion 252a is substantially parallel to the front-rear direction while the shaft portion 252 is not being operated (see FIG. 21).

As described above, the shaft portion 252 of the joystick 212 is provided so as to be oriented substantially toward the center of the housing 211 while the shaft portion 252 is not being operated. Then, it is easy for the user to apply force on the joystick 212, making it easier for the user to operate the joystick 212. Moreover, in the exemplary embodiment, the shaft portion 252 of the joystick 212 is capable of being depressed along the axial direction of the shaft portion 252. Therefore, in the exemplary embodiment, it is made easy to perform the operation of depressing the shaft portion 252, in addition to the direction input operation. That is, it is possible to improve the operability of the joystick 212.

(Lightguide, Etc.)

As shown in FIG. 19 to FIG. 21, the middle unit 240 includes a reflective portion 253, the lightguide 254 and a diffusion sheet 255. These members 253 to 255 are for guiding light emitted from the light-emitting section 248 to output the light through the opening 211a of the housing 211.

The lightguide 254 is made of a transparent material, and functions as a lightguide that receives light emitted from the light-emitting section 248 on the light-receiving surface to output the light having passed through the inside of the lightguide 254 from the light-exiting surface. Specifically, the lightguide 254 includes a plate-shaped surrounding portion 256 with a hole provided at the center. The surrounding portion 256 is provided surrounding the joystick 212. In the exemplary embodiment, the front surface of the surrounding portion 256 functions as the light-exiting surface. The lightguide 254 includes two extended portions 257. The left extended portion 257a is provided so as to extend from the left end of the surrounding portion 256, and the other right extended portion 257b is provided so as to extend from the right end of the surrounding portion 256. Note that in the present specification, the left extended portion 257a and the right extended portion 257b may be referred to collectively as "the extended portion 257". The tips of the extended portions 257 extended from the surrounding portion 256 each function as a light-receiving surface. Note that the lightguide 254 will be described in detail in "[2-3. Configuration related to light emission]" below.

The reflective portion 253 has an annular shape, and is made of a white material. The reflective portion 253 is provided on the rear side of the surrounding portion 256 of the lightguide 254 (in other words, the reverse side of the light-exiting surface) so as to reflect light output from the reverse side of the light-exiting surface so that more light is output from the light-exiting surface, the details of which will be described later. In the exemplary embodiment, the reflective portion 253 is made of a microcell polymer sheet, and functions also as a shock absorber.

The diffusion sheet 255 is made of a translucent sheet material, and has a property of diffusing light that passes through the diffusion sheet 255. Note that the diffusion sheet 255 is a thin sheet, and the diffusion sheet 255 is not shown in the cross-sectional view of FIG. 21. The diffusion sheet 255 diffuses light output from the light-exiting surface of the lightguide 254 to output the diffused light forward. In the exemplary embodiment, the diffusion sheet 255 has an annular shape. The diffusion sheet 255 is provided surrounding the hole provided in the light-exiting surface of the lightguide 254.

As shown in FIG. 19 to FIG. 21, the reflective portion 253, the lightguide 254 and the diffusion sheet 255 are provided on the front side of the base portion 251 of the joystick 212. Specifically, the reflective portion 253 is provided in front of the base portion 251, the surrounding portion 256 of the lightguide 254 is provided in front of the reflective portion 253, and the diffusion sheet 255 is provided in front of the surrounding portion 256. As shown in FIG. 21, the reflective portion 253, the surrounding portion 256 and the diffusion sheet 255 is secured sandwiched between the base portion 251 and the front surface portion 241 of the middle housing part 222. Therefore, the reflective portion 253 and the surrounding portion 256 are in contact with each other, and the surrounding portion 256 and the diffusion sheet 255 are in contact with each other.

The reflective portion 253, the surrounding portion 256 and the diffusion sheet 255 are each arranged so that the shaft portion 252 passes through the hole provided therein. Thus, the reflective portion 253, the surrounding portion 256 and the diffusion sheet 255 are provided surrounding the shaft portion 252. In the exemplary embodiment, the diffusion sheet 255 provided surrounding the shaft portion 252 (and the surrounding portion 256 and the reflective portion 253 rearward thereof) is visually recognizable through the opening 211a, as the controller main body 201 is seen from the front side, the details of which will be described later.

Note that in the exemplary embodiment, the surrounding portion 256 (this similarly applies also to the reflective portion 253 and the diffusion sheet 255) is provided extending along the entire circumference of the joystick 212.

Herein, in other embodiments, the surrounding portion 256 does not need to be provided so as to completely surround the entire circumference of the joystick 212. For example, in other embodiments, the surrounding portion 256 (this similarly applies also to the reflective portion 253 and the diffusion sheet 255) may have an annular shape with a portion thereof cut off.

Figure 22:
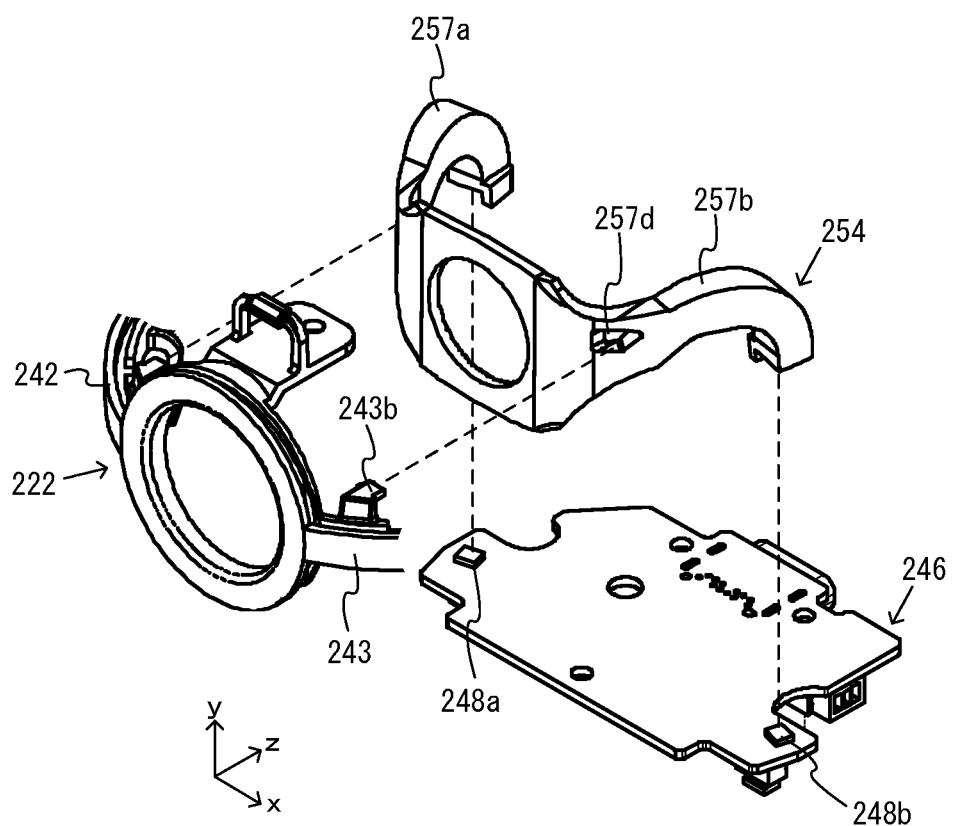
FIG. 22 is a perspective view showing an example of a positional relationship between a non-limiting middle housing part, a lightguide and a main substrate.

FIG. 22 is a perspective view showing an example of a positional relationship between the middle housing part, the lightguide and the main substrate. Note that FIG. 22 does not show a part of the middle housing part for the purpose of making it easier to see the positional relationship between these components. As shown in FIG. 22, the light-receiving surface at the tip of the right extended portion 257b of the lightguide 254 is provided in the vicinity of (specifically, directly above) the right light-emitting section 248b provided on the main substrate 246. Similarly, the light-receiving surface at the tip of the left extended portion 257a of the lightguide 254 is provided in the vicinity of (specifically, directly above) the left light-emitting section 248a provided on the main substrate 246.

As shown in FIG. 22, a hole 257d is provided in the right extended portion 257b. With the lightguide 254 attached to the middle housing part 222, the tab 243b provided on the right band-shaped portion 243 of the middle housing part 222 engages with the hole 257d. As with the right extended portion 257b, a hole (the hole 257c shown in FIG. 31 to be discussed later) is provided also in the left extended portion 257a. With the lightguide 254 attached to the middle housing part 222, the tab provided on the left band-shaped portion 242 of the middle housing part 222 engages with the hole. Thus, the lightguide 254 is provided so that tabs engage with the holes of the respective extended portions 257. With the tabs engaging with the holes, the lightguide 254 can be secured firmly.

(Reboot Button)

As shown in FIG. 20, the middle unit 240 includes the reboot button 214 described above. The reboot button 214 is made of an elastic material such as a rubber, for example, and can deform in response to the operation surface thereof being depressed. The reboot button 214 is provided so that the operation surface thereof is exposed through the hole 242a of the middle housing part 222 (see (f) of FIG. 10). Note that in the exemplary embodiment, the reboot button 214 is provided so that the operation surface thereof is recessed from the surface of the middle housing part 222.

The middle unit 240 includes the button detection section 258 for detecting a depressing operation on the reboot button 214. Although not shown in the figures, the button detection section 258 is provided with a contact for detecting an operation on the reboot button 214, and a detection circuit for detecting the reboot button 214 coming into contact with the contact. The button detection section 258 is attached to the detection circuit attachment portion 245e of the main substrate holding portion 245.

The button detection section 258 is provided on the inner side of the reboot button 214. Specifically, the button detection section 258 is arranged so that the contact is located on the reverse side from the operation surface of the reboot button 214. Therefore, when the reboot button 214 deforms in response to a depressing operation on the reboot button 214, a portion of the reboot button 214 comes into contact with the contact of the button detection section 258. The detection circuit of the button detection section 258 detects the reboot button 214 coming into contact with the contact.

Although not shown in the figures, the detection circuit of the button detection section 258 is electrically connected to the main substrate 246.

(Cover Portion)

As shown in FIG. 19 to FIG. 21, the middle unit 240 includes the cover portion 215 described above. In the exemplary embodiment, as is the outer surface portion of the upper housing part 221 and the lower housing part 223, the cover portion 215 is made of a material (e.g., an elastomer similar to that of the outer surface portion) that is softer than the middle housing part 222.

As shown in FIG. 19 and FIG. 20, the cover portion 215 includes a surface which forms a part of a spherical shape, and a rod-shaped portion 259 provided on the reverse side of the surface. When the cover portion 215 is attached to the main substrate holding portion 245, the rod-shaped portion 259 is inserted into the attachment hole (i.e., the hole 245f shown in FIG. 29) provided in the recessed surface 245d of the main substrate holding portion 245. Note that the tip portion of the rod-shaped portion 259 is slightly thicker than the other portion other than the tip portion. Therefore, the rod-shaped portion 259 having been inserted in the attachment hole does not come off the attachment hole with a force that is not so strong. The cover portion 215 is attached so as to cover the recessed surface 245d with the rod-shaped portion 259 inserted in the attachment hole.

[2-2-3. Lower Unit]

Figure 23:
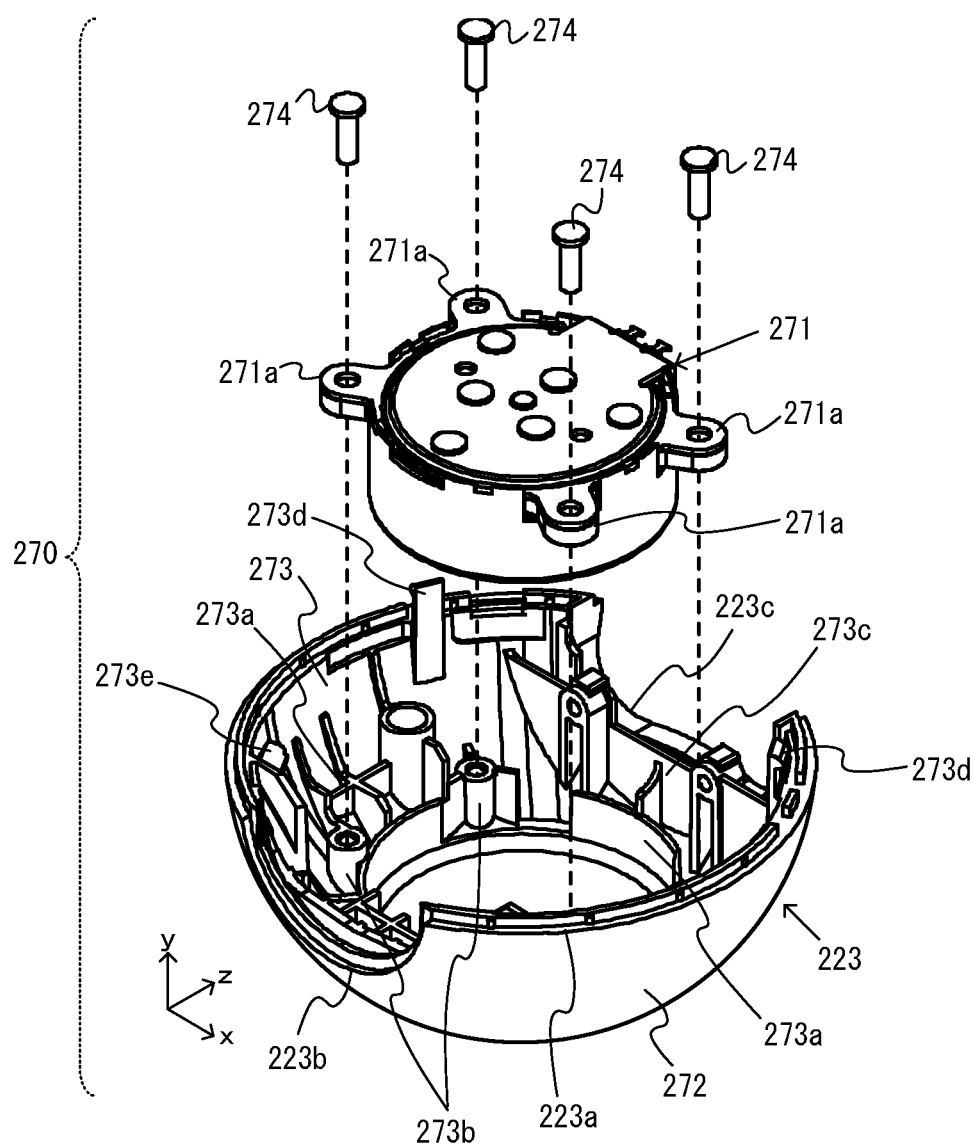
FIG. 23 is an exploded perspective view of an example of a non-limiting lower unit.

FIG. 23 is an exploded perspective view of an example of a lower unit. FIG. 23 is an exploded perspective view of a lower unit 270 as seen from the upper front side.

(Lower Housing Part)

As shown in FIG. 23, the lower unit 270 includes the lower housing part 223. As described above, the lower housing part 223 has a hemispherical shape as does the upper housing part 221. As shown in FIG. 23, the lower housing part 223 is open on the upper side and does not have a surface that corresponds to the bottom surface of the hemisphere. Therefore, it can also be said that the lower housing part 223 has a hemispherical surface shape. It can also be said that the lower housing part 223 has a spherical cap shape as does the upper housing part 221.

As shown in FIG. 23, in the exemplary embodiment, the lower housing part 223 has a hemispherical shape with a front end portion thereof cut off. Specifically, the lower housing part 223 has a hemispherical shape with a front end portion thereof cut off along a plane that is perpendicular to the front-rear direction. That is, the lower housing part 223 has an edge 223a that is the circumference of the bottom surface of the hemisphere, and an edge 223b that is produced by cutting off the front end portion of the hemispherical surface along the plane described above. The edge 223b defines a shape that appears to be semicircular as the lower housing part 223 is seen from the front side. Note that the shape of the cutout of the lower housing part 223 is a shape corresponding to the shape of the front end surface described above of the middle housing part 222 (specifically, a shape that substantially coincides with the lower edge of the front end surface), and specifically the shape is semicircular. Note however that there is no limitation on the shape of the cutout, and the shape may be any shape other than semicircular in other embodiments.

The lower housing part 223 has a hemispherical shape with a rear end portion thereof cut off as well as a front end portion thereof. Therefore, the lower housing part 223 has an edge 223c that is produced by cutting off the rear end portion. The shape of the cutout of the rear end portion substantially coincides with the shape of the surface of the cover portion 215. That is, the cover portion 215 is provided so as to cover the cutout portion of the rear end of the lower housing part 223.

As shown in FIG. 23, the lower housing part 223 includes the outer surface portion 272 and an inner wall portion 273, as does the upper housing part 221. The outer surface portion 272 is a component that forms the outer surface of the lower housing part 223. The inner wall portion 273 is a component that forms the inner wall of the lower housing part 223. The outer surface portion 272 and the inner wall portion 273 each have a hemispherical shape similar to the lower housing part 223, and each have a hemispherical shape with a front end portion thereof and a rear end portion thereof cut off as does the lower housing part 223. The inner wall portion 273 is connected to the inner side of the outer surface portion 272. For example, the inner wall portion 273 is attached to the inner side of the outer surface portion 272 via an adhesive. Note that the inner wall portion 273 is sized so that the outer surface of the inner wall portion 273 coincides with the inner surface of the outer surface portion 272.

The outer surface portion 272 of the lower housing part 223 is made of an elastic material that is softer than the middle housing part 222 and the inner wall portion 273 (e.g., an elastomer) as is the outer surface portion 231 of the upper housing part 221. The inner wall portion 273 of the lower housing part 223 is made of a material that is harder than the outer surface portion 272 (e.g., a resin) as is the inner wall portion 232 of the upper housing part 221.

As is the inner wall portion 232 of the upper housing part 221, the inner wall portion 273 is made of a black material, for example, so as to prevent light from the light-emitting section 248 from passing through the inner wall portion 273 as much as possible.

As shown in FIG. 23, the inner wall portion 273 is provided with ribs 273a. The ribs 273a are provided so as to protrude relative to the inner wall of the spherical surface of the lower housing part 223. Note that the ribs 273a are provided so as not to come into contact with a vibrating section 271 (in other words, so as to avoid the position of the vibrating section 271). Note that there is no limitation on the position and the number of the ribs 273a. With the provision of the ribs 273a, the mechanical strength (in other words, rigidity) of the lower housing part 223 can be improved.

Note that in the exemplary embodiment, the number of ribs provided on the inner wall of the upper housing part 221 is smaller than the number of ribs provided on the inner wall of the lower housing part 223 (this means to include embodiments where there are no ribs on the inner wall of the upper housing part 221). For the upper housing part 221, the sub-substrate 237 and the sub-substrate holding portion 238 may be secured on the upper housing part 221, thereby improving the mechanical strength of the upper housing part 221. That is, in the exemplary embodiment, by providing fewer ribs on the upper housing part 221 than on the lower housing part 223, more components can be accommodated therein, and the components accommodated therein (i.e., the sub-substrate 237 and the sub-substrate holding portion 238) can be secured on the upper housing part 221, thereby improving the mechanical strength.

As shown in FIG. 23, vibrating section attachment portions 273b are provided on the inner wall portion 273. Note that while FIG. 23 only shows two vibrating section attachment portions 273b, four vibrating section attachment portions 273b are provided on the inner wall portion 273. The vibrating section attachment portions 273b each have a screw hole that is open on the upper side. The screw hole is a screw hole for attaching the vibrating section 271 to be described later to the lower housing part 223.

As shown in FIG. 23, a housing attachment portion 273c is provided on the inner wall portion 273. The housing attachment portion 273c includes two screw holes running therethrough in the front-rear direction. The screw holes are screw holes for attaching the lower housing part 223 (in other words, the lower unit 270) to the main substrate holding portion 245 (in other words, the middle unit 240).

As shown in FIG. 23, projecting tabs 273d are provided on the inner wall portion 273. The projecting tabs 273d are provided so as to protrude upward relative to the edge 223a of the lower housing part 223. In the exemplary embodiment, the projecting tabs 273d are provided, one on a rear right portion and another one on a rear left portion of the edge of the lower housing part 223. When the middle housing part 222 and the lower housing part 223 are connected together, the projecting tabs 273d engage with the middle housing part 222, the details of which will be described later.

As shown in FIG. 23, the tab 273e is provided on the inner wall portion 273. The tab 273e is provided so as not to protrude relative to the edge 223a of the lower housing part 223. The tab 273e is provided on a front right portion of the lower housing part 223. Although not shown in the figures, a tab similar to the tab 273e is provided also on a front left portion of the lower housing part 223. When the middle housing part 222 and the lower housing part 223 are connected together, the tab 273e engages with the tab-receiving portion 243a of the middle housing part 222 (see FIG. 19), the details of which will be described later.

(Vibrating Section)

As shown in FIG. 23, the lower unit 270 includes the vibrating section 271. The vibrating section 271 is a vibrator for generating a vibration to vibrate the housing 211. Note that although not shown in the figures, the vibrating section 271 is electrically connected to the main substrate 246 (more specifically, the control section provided on the main substrate 246).

In the exemplary embodiment, the vibrating section 271 is a voice coil motor. That is, the vibrating section 271 can generate a vibration in response to a signal input thereto, and can also generate a sound in response to the signal. For example, when a signal of a frequency in the audible range is input to the vibrating section 271, the vibrating section 271 generates a sound (i.e., audible sound) as well as a vibration. For example, when a sound signal representing a voice (or a sound) of a character appearing in the game, the vibrating section 271 outputs the voice (or the sound) of the character. When a signal of a frequency outside the audible range is input to the vibrating section 271, the vibrating section 271 generates a vibration. Note that a signal input to the vibrating section 271 can be said to be a signal representing the wavelength of the vibration to be generated from the vibrating section 271, and can be said to be a sound signal representing the wavelength of the sound to be output from the vibrating section 271. The signal input to the vibrating section 271 may be a vibration signal intended to cause the vibrating section 271 to generate a vibration of an intended waveform, or may be a sound signal intended to cause the vibrating section 271 to output an intended sound. As described above, since the vibrating section 271 can output a vibration and a sound in the exemplary embodiment, it is possible to output a vibration and a sound from the spherical controller 200, and to simplify the internal configuration of the controller main body 201.

As shown in FIG. 23, the vibrating section 271 has a cylindrical outer shape. Since a cylindrical vibrating section is arranged in the spherical housing 211 in the exemplary embodiment, it is possible to efficiently use the space inside the housing 211. Generally, as the vibrating section 271 is larger, it is possible to generate a stronger vibration, and it is therefore easier to arrange a vibrating section capable of generating a strong vibration according to the exemplary embodiment.

In the exemplary embodiment, the vibrating section 271 includes protruding portions 271a protruding from the side surface of the cylindrical vibrating section 271. In the exemplary embodiment, the four protruding portions 271a are provided on the upper end of the side surface of the vibrating section 271. The protruding portions 271a each protrude in a direction perpendicular to the up-down direction from the side surface of the vibrating section 271. The protruding portions 271a each include a hole therein for receiving therethrough a screw for securing the vibrating section 271 on the lower housing part 223 (see FIG. 23).

As shown in FIG. 23, the vibrating section 271 is attached to the inner side of the lower housing part 223. In the exemplary embodiment, the vibrating section 271 and the lower housing part 223 are secured together via screws 274 (four screws 274 in the exemplary embodiment). As described above, four screw holes that are open on the upper side are provided in the vibrating section attachment portions 273b of the lower housing part 223. The protruding portions 271a of the vibrating section 271 have holes therein at positions corresponding to the screw holes. As shown in FIG. 23, the screws 274 are screwed into the screw holes of the lower housing part 223 through the holes of the vibrating section 271, thereby securing together the vibrating section 271 and the lower housing part 223. In the exemplary embodiment, the vibrating section 271 is provided in an orientation such that the central axis of the cylinder (in other words, the central axis of the vibrating section 271) is substantially parallel to the up-down direction. In the exemplary embodiment, the vibrating section 271 is provided in an orientation such that the vibrating direction thereof is substantially parallel to the up-down direction.

In the exemplary embodiment, the vibrating section 271 is in contact with the lower housing part 223 only via the protruding portions 271a which are screwed to the lower housing part 223. That is, the bottom surface and the side surface of the cylindrical vibrating section 271 are not in contact with the lower housing part 223. By limiting the portions where the vibrating section 271 is in contact with the lower housing part 223, it is possible to reduce variations (i.e., variations between individual products) of the vibration property when the vibration from the vibrating section 271 is transmitted to the lower housing part 223.

In the exemplary embodiment, the four connecting portions (i.e., the four protruding portions 271a) between the vibrating section 271 and the lower housing part 223 are arranged substantially in symmetry with respect to the front-rear direction and the left-right direction. That is, the four connecting portions are arranged substantially in symmetry with respect to the axis that passes through the center of the four connecting portions and is parallel to the left-right direction. The four connecting portions are arranged substantially in symmetry with respect to the axis that passes through the center of the four connecting portions and is parallel to the front-rear direction. Then, the vibration from the vibrating section 271 can be transmitted to the housing 211 in a well-balanced manner.

[2-2-4. Connection Between Units]

The controller main body 201 is obtained by connecting together the upper unit 230, the middle unit 240 and the lower unit 270 described above.

Figure 24:
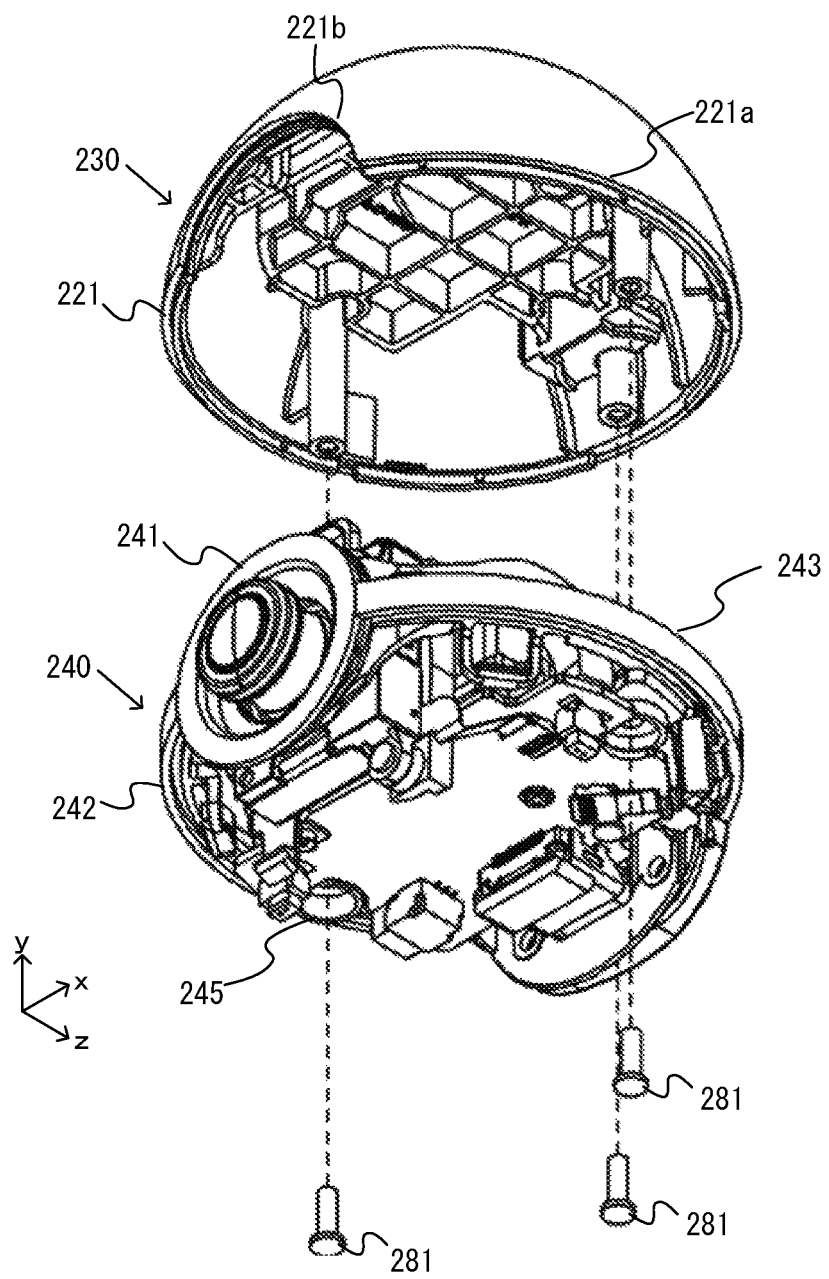
FIG. 24 is an exploded perspective view of an example of a non-limiting upper unit and an example of a non-limiting middle unit.

FIG. 24 is an exploded perspective view of an example of the upper unit 230 and an example of the middle unit 240. As shown in FIG. 24, the upper unit 230 and the middle unit 240 are secured together by screws 281 (three screws 281 in the exemplary embodiment). Specifically, three screw holes that are open on the lower side are provided on the inner surface of the upper housing part 221 (specifically, the inner wall portion 232) of the upper unit 230 (see FIG. 16). Three holes are provided in the main substrate holding portion 245 of the middle unit 240 at positions corresponding to the three screw holes (see FIG. 19). Specifically, one hole is provided on the left side of the frame portion 245a and one hole is provided on the right side thereof, and another hole is provided in the strap attachment shaft 245c (see FIG. 19). As shown in FIG. 24, the screws 281 are screwed to into the screw holes of the upper housing part 221 through the holes of the main substrate holding portion 245, thereby securing together the upper unit 230 and the middle unit 240.

Note that when the upper unit 230 and the middle unit 240 are connected together, the edge 221a of the upper housing part 221 is in contact with the band-shaped portions 242 and 243 of the middle housing part 222, and the edge 221b of the upper housing part 221 is in contact with the upper edge of the front surface portion 241 of the middle housing part 222. Thus, the upper housing part 221 and the middle housing part 222 are connected together so that there is substantially no gap therebetween. Note however that since the rear end of the left band-shaped portion 242 and the rear end of the right band-shaped portion 243 of the middle housing part 222 are not continuous with each other, the rear end portion of the upper housing part 221 is not in contact with the middle housing part 222.

Figure 25:
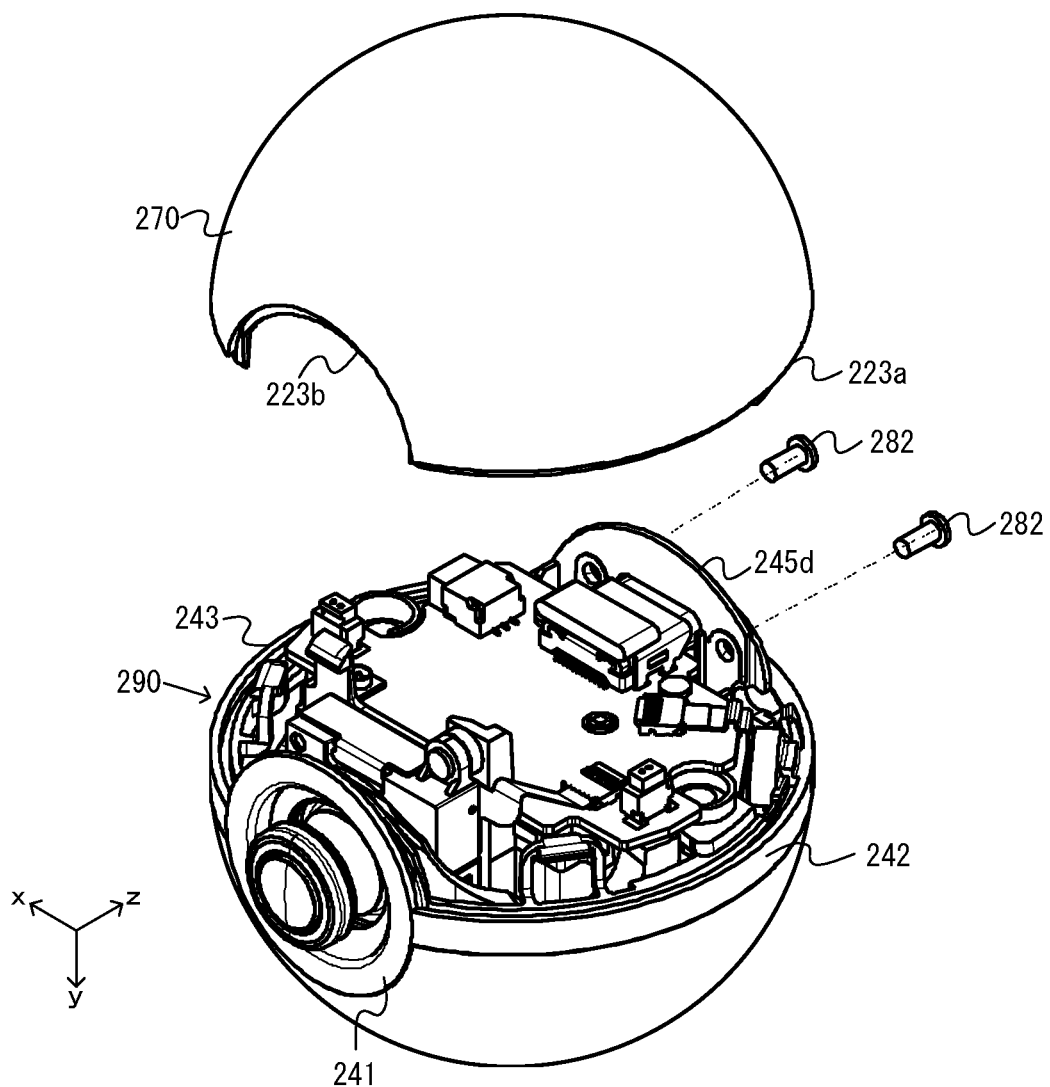
FIG. 25 is an exploded perspective view of an example of a non-limiting controller main body.
Figure 26:
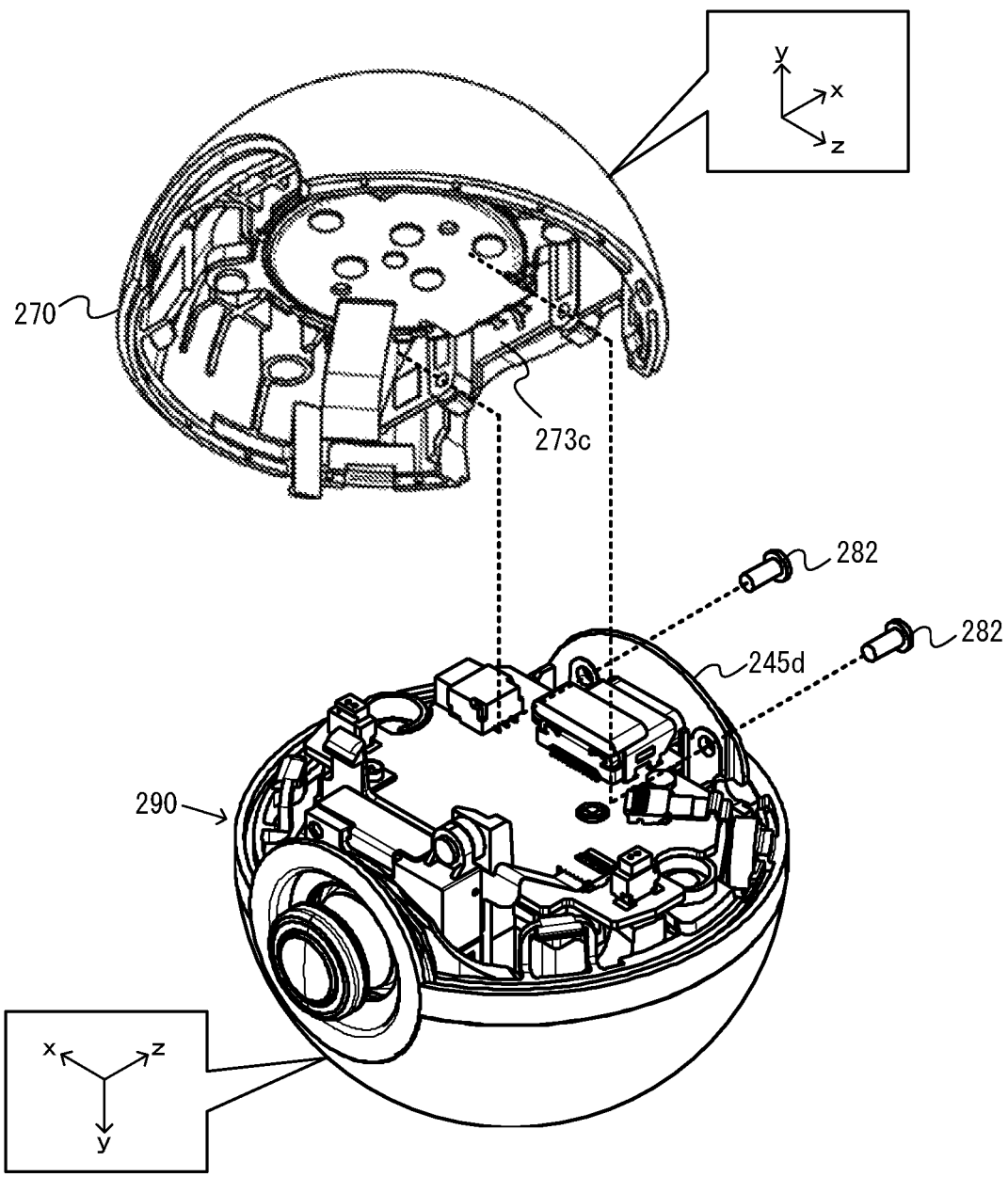
FIG. 26 is an exploded perspective view of an example of a non-limiting controller main body.

FIG. 25 and FIG. 26 are exploded perspective views showing an example of the controller main body 201. FIG. 25 is a perspective view showing an upper-middle unit 290 that includes the upper unit 230 and the middle unit 240 connected together, and the lower unit 270, as seen from the lower front side. On the other hand, FIG. 26 shows the upper-middle unit 290 as seen from the lower front side, and the lower unit 270 as seen from the upper front side.

As shown in FIG. 25 and FIG. 26, the lower unit 270 is further connected to the upper-middle unit 290 that includes the upper unit 230 and the middle unit 240 connected together. In the exemplary embodiment, the lower unit 270 is connected to the upper-middle unit 290 via tabs and screws.

As described above, four tabs (i.e., the two projecting tabs 273d and the two tabs 273e) are provided on the lower housing part 223. These tabs engage with the middle housing part 222. Specifically, the projecting tabs 273d engage with the inner side of the band-shaped portions 242 and 243 of the middle housing part 222. The tab 273e engages with the tab-receiving portion 243a of the middle housing part 222 (see FIG. 19). Thus, the lower housing part 223 and the middle housing part 222 are secured together.

As shown in FIG. 26, the upper-middle unit 290 and the lower unit 270 are secured together by screws 282. Specifically, the housing attachment portion 273c of the lower unit has two screw holes running therethrough in the front-rear direction. The recessed surface 245d of the main substrate holding portion 245 included in the upper-middle unit 290 has two holes at positions corresponding to the two screw holes. As shown in FIG. 26, the screws 282 are screwed into the screw holes of the lower housing part 223 through the holes of the recessed surface 245*d*, thereby securing together the upper-middle unit 290 and the lower unit 270.

Note that in the exemplary embodiment, when the upper-middle unit 290 and the lower unit 270 are connected together, the edge 223*a* of the lower housing part 223 is in contact with the band-shaped portions 242 and 243 of the middle housing part 222, and the edge 223*b* of the lower housing part 223 is in contact with the lower edge of the front surface portion 241 of the middle housing part 222 (see FIG. 25). Thus, the lower housing part 223 and the middle housing part 222 are connected together with substantially no gap therebetween. Note however that since the rear end of the left band-shaped portion 242 and the rear end of the right band-shaped portion 243 of the middle housing part 222 are not continuous with each other, the rear end portion of the lower housing part 223 is not in contact with the middle housing part 222. In the exemplary embodiment, the rear end of the left band-shaped portion 242 and the rear end of the right band-shaped portion 243 of the middle housing part 222, the upper housing part 221 and the lower housing part 223 together provide a hole at the rear end of the housing 211. This hole serves as the strap hole 211*c* described above (see FIG. 10).

While the exemplary embodiment is directed to a case where the components of the controller main body 201 are connected together via screws, tabs, etc., there is no limitation on the method for connecting the components together. There is no limitation on the positions and the number of screws used for connecting (in other words, securing) the components together.

[2-2-5. Internal Arrangement]
(Regarding Arrangement of Antenna)

Figure 27:
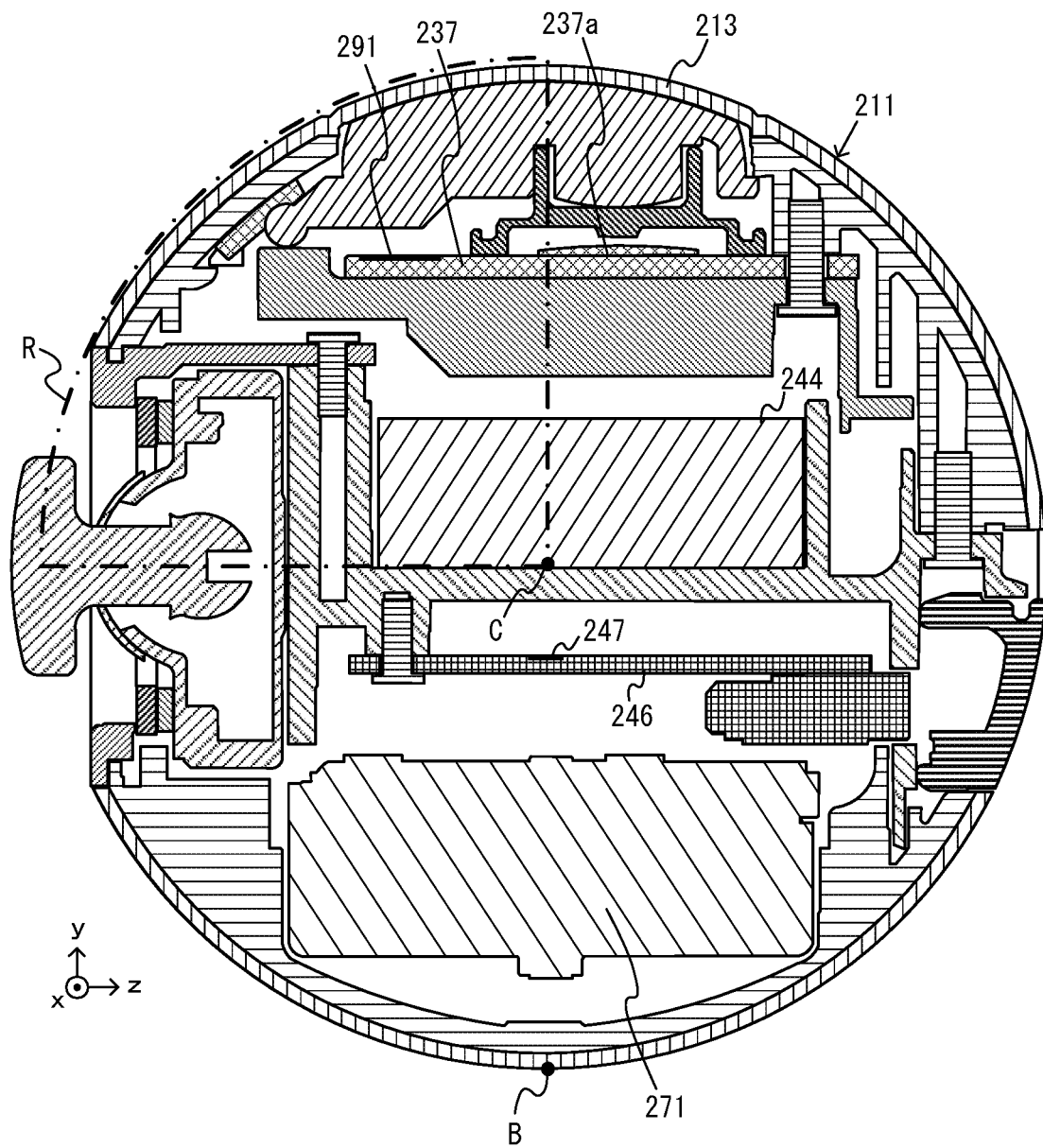
FIG. 27 is a cross-sectional view of an example of a non-limiting controller main body.

FIG. 27 is a cross-sectional view of an example of a controller main body. FIG. 27 is a cross-sectional view showing a cross section that passes through the center of the controller main body 201 and is perpendicular to the left-right direction. As described above, the antenna 291 is provided on the sub-substrate 237. In the exemplary embodiment, the antenna 291 is arranged above the center C of the housing 211 and on the front side relative to the center C (see FIG. 27).

As shown in FIG. 27, in the exemplary embodiment, the position of the antenna 291 is between the center C of the housing 211 and the operation surface 213. More specifically, the position of the antenna 291 with respect to the direction (i.e., up-down direction) parallel to the straight line (i.e., the straight line L3 shown in FIG. 13) that passes through the center C of the housing 211 and the operation surface 213 is between the position of the center C of the housing 211 with respect to the direction (i.e., the y-axis coordinate of the center C) and the position of the operation surface 213 with respect to the direction (i.e., the y-axis coordinate of the operation surface 213). In other words, in the exemplary embodiment, the antenna 291 is provided on the "up input direction" side relative to the center C of the housing 211, and the operation surface 213 is provided on the "up input direction" side relative to the antenna 291. When the antenna 291 is arranged at such a position as described above, the finger operating the operation surface 213 is unlikely to interfere with the communication by the antenna 291, improving the communication ability of the spherical controller 200 using the antenna 291.

In the exemplary embodiment, the spherical controller 200 includes an electronic substrate (i.e., the sub-substrate 237) that carries thereon the contact 237*a* for detecting a depressing operation on the operation surface 213 and the antenna 291. By using a common substrate for the contact 237*a* and the antenna 291, it is possible to more efficiently arrange components in the housing 211 and to reduce the weight and the space of the spherical controller 200. According to the description above, the antenna 291 can be arranged below the operation surface 213 with some distance from the operation surface 213. Therefore, the finger operating the operation surface 213 is unlikely to interfere with the communication by the antenna 291, improving the communication ability of the spherical controller 200 using the antenna 291.

In the exemplary embodiment, the operation surface 213 is provided on the hemispherical upper housing part 221, and the antenna 291 is provided inside the upper housing part 221 (in other words, the first hemispherical portion). Thus, in the exemplary embodiment, the antenna 291 is provided in the housing part where the operation surface 213 is provided. Then, the antenna 291 can be arranged on the same side in the spherical housing 211 as the operation surface 213. Thus, the finger operating the operation surface 213 is unlikely to interfere with the communication by the antenna 291, improving the communication ability of the spherical controller 200 using the antenna 291.

In the exemplary embodiment, the operation surface 213 is provided in the upper end portion of the housing 211, the joystick 212 is provided in the front end portion of the housing 211, and the antenna 291 is provided on the front side of and above the center C of the housing 211 (see FIG. 27). In other words, the antenna 291 is provided on the side of the joystick 212 relative to a plane (i.e., the plane P1 shown in FIG. 13) that contains the center C of the housing 211 and that is perpendicular to a straight line (i.e., the straight line L4 shown in FIG. 13) that passes through the center C and the opening 211*a*. That is, the antenna 291 is provided on the same side (specifically, the front side) of the joystick 212 with respect to the plane. Note that "the antenna 291 provided on the front side" means to include embodiments where at least a portion of the antenna 291 is on the front side.

Herein, assuming that the joystick 212 is operated with the thumb and the operation surface 213 is operated with the index finger, no finger is placed between the joystick 212 and the operation surface 213 on the surface of the housing 211 as shown in FIG. 12. Therefore, by arranging the antenna 291 on the same side as the joystick 212 as described above, the antenna 291 can be arranged at a position where the finger is unlikely to be placed. Thus, fingers holding the spherical controller 200 are unlikely to interfere with the communication by the antenna 291, improving the communication ability using the antenna 291.

In the exemplary embodiment, the antenna 291 is provided so that at least a portion of the antenna 291 is inside a fan-shaped region having a fan shape (i.e., the region R delimited by a one-dot-chain line in FIG. 27) of the circular region along a cross section that passes through the operation surface 213, the opening 211*a* and the center C of the housing 211, wherein the fan shape is defined by a radius extending between the operation surface 213 and the center C and another radius extending between the opening 211*a* and the center C, and the fan shape has a central angle that is a minor angle. Thus, when at least a portion of the antenna 291 is arranged in this region, fingers holding the spherical controller 200 are unlikely to interfere with the communication by the antenna 291, improving the communication ability using the antenna 291.

Note that in the exemplary embodiment, the joystick 212 and the operation surface 213 are arranged so that the central angle of the fan shape is 90°. In other words, the joystick 212 and the operation surface 213 are arranged so that the straight line that passes through the joystick 212 (in other words, the opening 211*a*) and the center C of the housing 211 is orthogonal to the straight line that passes through the operation surface 213 and the center C. In other embodiments, the central angle of the fan shape does not need to be 90°. Even if the central angle of the fan shape is not 90°, the antenna 291 can be arranged so that at least a portion of the antenna 291 is included in the fan-shaped region. Then, as in the exemplary embodiment, fingers holding the spherical controller 200 are unlikely to interfere with the communication by the antenna 291.

(Regarding Configuration of Operation Surface)

As described above, in the exemplary embodiment, the spherical controller 200 includes an operation section having the operation surface 213 that is integral with the surface of the housing 211. Then, since it is possible to eliminate the gap between the operation surface 213 and the rest of the housing 211 other than the operation surface 213, the shape of the controller main body 201 as seen from outside can be made closer to a sphere. Thus, it is possible to improve the feel of holding the controller main body 201. It is also possible to reduce the possibility that the operation surface 213 is operated inadvertently because something gets caught on the operation surface 213.

Note that "the operation surface is integral with the surface of the housing" means to include embodiments where there is a groove (i.e., the indication 211*b*) between the operation surface and the surface of the housing, as in the exemplary embodiment. Note that there is no limitation on the depth and the width of the groove. Moreover, "the operation surface is integral with the surface of the housing" means that at least a portion of the operation surface is integral with the surface of the housing. For example, while the entire circumference of the operation surface 213 is formed continuously on the surface of the housing 211 in the exemplary embodiment, only a portion of the circumference of the operation surface 213 may be formed continuously on the surface of the housing 211 in other embodiments. Therefore, when there is a cutout between a portion of the circumference of the operation surface 213 and the surface of the housing 211 so that they are not continuous, and the other portion of the circumference of the operation surface 213 and the surface of the housing 211 are integral together (in other words, continuous with each other), for example, it can be said that the "operation surface is integral with the surface of the housing".

As described above, in the exemplary embodiment, the operation surface 213 and the surface of the housing 211 (i.e., the outer surface portion 231) are made of an elastic material. The housing 211 also includes the inner wall portion 232 that is provided on the inner side of the surface made of an elastic material and that is harder than the elastic material. According to the description above, the operation surface 213 that is integral with the surface of the housing 211 is capable of being depressed. According to the description above, with the provision of the inner wall portion, it is possible to prevent a portion of the housing 211 other than the operation surface 213 from deforming significantly when the user holds the housing 211 with a normal force. Note that in the exemplary embodiment, the surface of the upper housing part 221 and the lower housing part 223 is made of an elastic material. Note however that in other embodiments, only a portion of the surface of the housing 211 that is around the operation surface 213 may be made of an elastic material.

In the exemplary embodiment, the operation section including the operation surface 213 includes a movable portion (specifically, the key top 235). The spherical controller 200 also includes a detection section (specifically, a detection circuit 322). The movable portion is covered by the housing 211 and the operation surface 213, and can move in response to the operation surface 213 being depressed. The detection section detects an operation performed on the operation surface 213 in response to the movement of the movable portion. According to the description above, the spherical controller 200 can detect, with a simple configuration, the operation surface being depressed.

In the exemplary embodiment, the operation surface 213 has a surface which forms a part of a spherical shape. Specifically, the operation surface 213 has a surface which forms a part of a spherical shape whose radius is substantially equal to the radius of the housing 211. Therefore, in the exemplary embodiment, the housing 211 and the operation surface 213 together form one spherical surface. Note that it can be said that the operation surface 213 is provided along the surface of the housing 211. According to the exemplary embodiment, the shape of the controller main body 201 as seen from outside can be made closer to a sphere. Note that the operation surface 213 may be (a) such that the housing 211 and the operation surface 213 are integral with each other as in the exemplary embodiment, or (b) such that the housing and the operation surface are separate from each other as opposed to the exemplary embodiment. For example, even when the operation surface separate from the housing defines the spherical surface of the same sphere as the surface of the housing, the shape of the controller main body 201 as seen from outside can be made closer to a sphere as in the exemplary embodiment.

Note that in other embodiments, the operation surface 213 may be provided so as to protrude relative to the surface of the housing 211. Then, the position of the operation surface can be made easier to see for the user. Note that even in such a case, it can be said that the controller main body 201 as a whole is spherical.

In other embodiments, the operation surface 213 may be separate from the housing 211. For example, the operation surface may be a part of an operation button that is separate from the housing 211. Specifically, the housing 211 may be provided with a button hole different from the opening 211*a* so that the operation surface (in other words, the operation button) is exposed through the button hole. Then, the position of the operation button can be made easier to see for the user. Note that in such a case, the operation surface may be provided along the housing 211, may be provided so as to protrude relative to the housing 211, or may be provided so as to be depressed relative to the housing 211.

In the exemplary embodiment, the area of the operation surface 213 is larger than the area of the operation surface 252*c* of the joystick 212. Then, it is made easier for the user to push the operation surface 213. Note that in other embodiments, there is no limitation on the size and shape of the operation surface 213, and it may be smaller than the operation surface 252*c* of the joystick 212.

(Regarding Arrangement of Joystick)

Figure 28:
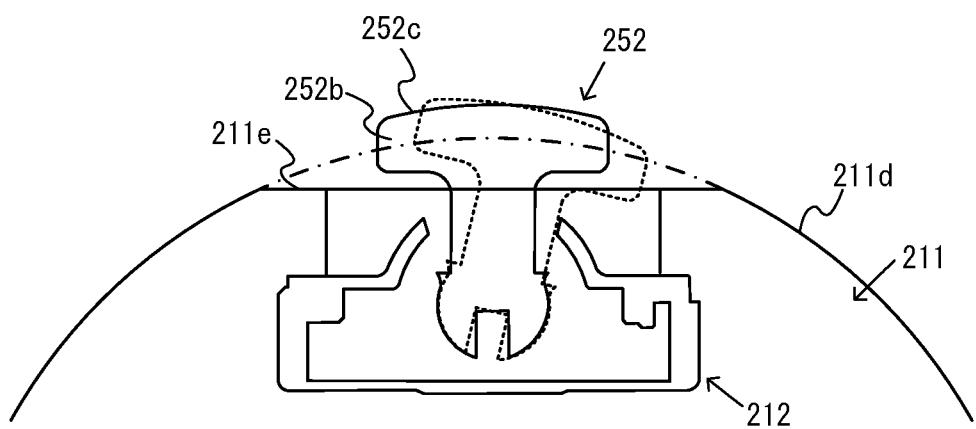
FIG. 28 is a diagram schematically showing the vicinity of a front end portion of an example of a non-limiting spherical controller.

FIG. 28 is a diagram schematically showing the vicinity of a front end portion of an example of a spherical controller. Note that FIG. 28 is a diagram showing the vicinity of the front end portion of the spherical controller 200 as seen from the left-right direction, schematically showing the relationship between the joystick 212 and the housing 211 and the opening 211*a*. In FIG. 28, the shaft portion 252 shown by a solid line represents the shaft portion 252 while not being operated, and the shaft portion 252 shown by a dotted line represents the shaft portion 252 while being tilted to the limit.

As shown in FIG. 28, the housing 211 includes a spherical surface 211d and a front end surface 211e. The spherical surface 211d is provided at a position at a predetermined distance (referred to as the "radial distance") from the center of the housing 211. The front end surface 211e is an opening surface having the opening 211a. The joystick 212 protrudes through the opening 211a toward the outside of the housing 211.

The front end surface 211e is provided at a distance from the center of the housing 211 that is shorter than the radial distance described above. In other words, the front end surface 211e is provided at a position depressed relative to the reference spherical surface (in other words, at a position that is on the inner side of the reference spherical surface). Herein, the reference spherical surface is a spherical surface of a spherical region whose center is at the center of the housing 211 and whose radius is equal to the radial distance described above (a one-dot-chain line shown in FIG. 28). That is, the spherical surface 211d of the housing 211 is provided along the reference spherical surface, and the front end surface 211e is provided so as to be depressed relative to the reference spherical surface.

According to the description above, the portion where the joystick 212 is provided (i.e., the front end surface 211e) can be provided at a position that is closer to the center of the housing 211 than the spherical surface 211d of the housing 211. Then, it is possible to suppress the amount of protrusion of the joystick 212 relative to the reference spherical surface, and it is possible to make it easier for the user to operate the joystick 212.

As shown in FIG. 28, in the exemplary embodiment, the tip portion 252b of the joystick 212 is provided at a position that overlaps the reference spherical surface. In other words, the tip portion 252b is provided at such a position that the distance from the center of the housing 211 is equal to the radial distance. Then, the operation surface 252c of the joystick 212 is provided at a position along the reference spherical surface (more specifically, at a position slightly on the outer side of the reference spherical surface).

According to the description above, although there is some variation based on the thickness of the tip portion 252b (e.g., 3 mm to 10 mm), the finger operating the joystick 212 is located substantially at the spherical surface. Therefore, the user can hold the spherical controller 200, feeling as if the finger operating the joystick 212 were placed on the spherical surface, making it even easier for the user to operate the joystick 212.

As shown in FIG. 28, in the exemplary embodiment, the tip portion 252b is located at a position that overlaps the reference spherical surface whether the joystick 212 is being operated or not. In other words, the tip portion 252b is provided at such a position that the distance from the center of the housing 211 is equal to the radial distance whether the joystick 212 is being operated or not. Note that in the exemplary embodiment, irrespective of the tilt angle of the shaft portion 252 within the movable range, the tip portion 252b is located at a position that overlaps the reference spherical surface. Then, irrespective of the tilted state of the shaft portion 252, the user can operate the joystick 212, feeling as if the finger operating the joystick 212 were placed on the spherical surface. Thus, it is possible to further improve the feel of operating the joystick 212.

(Regarding Arrangement of Acceleration Sensor)

As shown in FIG. 27, in the exemplary embodiment, the spherical controller 200 includes an inertia sensor (e.g., the acceleration sensor 247) provided in the vicinity of the center of the housing 211. Then, the inertia sensor can sense under equal conditions for the three axial directions, i.e., the up-down direction, the left-right direction and the front-rear direction. Thus, it is possible to improve the sensing accuracy of the inertia sensor.

(Regarding Arrangement of Rechargeable Battery)

As shown in FIG. 27, in the exemplary embodiment, the rechargeable battery 244 is provided inside the housing 211, specifically, at such a position that the distance from the center C of the housing 211 to the rechargeable battery 244 is shorter than the distance from the center of the housing 211 to the vibrating section 271. Thus, the rechargeable battery 244 is provided in the vicinity of the center of the housing 211. Therefore, it is possible to reduce the transmission of the shock from outside the controller main body 201 to the rechargeable battery 244, thereby safely protecting the rechargeable battery 244.

Note that in the exemplary embodiment, the main substrate holding portion 245 includes holes for receiving therethrough screws for connecting the main substrate holding portion 245 to the middle housing part 222 (see FIG. 19). Herein, these holes are provided on the outside of the frame portion 245a accommodating the rechargeable battery 244. Therefore, in the exemplary embodiment, it is possible to further reduce the transmission of the shock from outside the controller main body 201 to the rechargeable battery 244.

(Regarding Arrangement of Vibrating Section)

In the exemplary embodiment, the spherical controller 200 includes the following components.

the spherical housing 211.

the vibrating section 271 provided inside the housing 211 for generating a vibration to vibrate the housing 211.

the inertia sensor (specifically, the acceleration sensor 247) provided inside the housing 211 at a position that is closer to the center of the spherical housing than the vibrating section.

the operation section having the operation surface 213 that is capable of being depressed and is provided at a position on the housing 211 on the opposite side from the vibrating section 271 with respect to the center C of the housing 211 (specifically, on the opposite side from the vibrating section 271 in the housing 211 with respect to a plane (i.e., the xz plane) that includes the center C and is perpendicular to the straight line passing through the center C of the housing 211 and the vibrating section 271).

a transmission section (a communication section 323 to be described later) for transmitting, to outside, information regarding an operation on the operation section and information output from the inertia sensor.

Note that the "position on the opposite side from the vibrating section 271 with respect to the center C of the housing 211" means a position on the opposite side from the vibrating section 271 with respect to a plane (i.e., the xz plane) that includes the center of the housing 211 and is perpendicular to a straight line passing through the center of the vibrating section 271 and the center of the housing 211.

Note that in the above description, "(the inertia sensor) provided at a position that is closer to the center of the spherical housing than the vibrating section" means that it is provided at such a position that the distance from the center C of the housing 211 to the inertia sensor is shorter than the distance from the center C to the vibrating section 271, and more specifically, it means that the distance from the lower end of the inertia sensor to the center C of the housing 211 is shorter than the distance from the upper end of the vibrating section 271 to the center C of the housing 211.

With the configuration above, by arranging the inertia sensor in the vicinity of the center of the housing 211, it is possible to improve the sensing accuracy of the inertia sensor as described above. By arranging the inertia sensor away from the vibrating section 271, the inertia sensor is unlikely to be influenced by the vibrations from the vibrating section 271. Thus, it is possible to improve the sensing accuracy of the inertia sensor. By arranging the operation section and the vibrating section 271 on the opposite side from each other with respect to the center of the housing 211, it is possible to make it more difficult for the vibrations of the vibrating section 271 to be transmitted to the operation section. Thus, operations on the operation section are less likely to be influenced by the vibrations, and it is possible to improve the operability of the operation section.

In the exemplary embodiment, the "operation section" is a member including a movable portion (specifically, the key top 235) that is capable of moving in response to the operation surface 213 being depressed. That is, in the exemplary embodiment, the "operation section" is an input device including the movable portion. Note however that the "operation section" may be any input device. For example, in other embodiments, the operation section may be an analog stick similar to the joystick 212, a cross-shaped key, or a button that can be depressed.

In the exemplary embodiment, the spherical controller 200 includes, as the operation section, a first input device including the key top 235, and a second input device (specifically, the joystick 212) in addition to the first input device. In other embodiments, the spherical controller 200 may include the first input device but not the second input device. For example, in other embodiments, an opening (i.e., an opening similar to the opening 211a) may be provided at the position of the operation surface 213 in the exemplary embodiment, and the joystick 212 may be provided as the operation section so as to be exposed through the opening. Then, the spherical controller 200 does not need to include the operation surface 213 and the key top 235.

When the spherical controller 200 includes the first input device as the operation section, and the second input device, the first input device and the second input device may be input devices of the same type or may be input devices of different types as in the exemplary embodiment. For example, in other embodiments, the spherical controller 200 may include, on the housing 211, the operation surface 213 described above, and a second operation surface at a position different from the operation surface 213. Then, the spherical controller 200 may include, as the operation section, a first input device including the key top 235, and a second input device (i.e., an input device including a key top that is capable of moving in response to the second operation surface being depressed) of the same type as the first input device.

In the exemplary embodiment, "transmit to outside" is to transmit to the main body apparatus 2, but it may be to transmit to any apparatus (see "[3. Variations]" to be described later).

As shown in FIG. 27, the vibrating section 271 is provided between the center C of the housing 211 and the lower end B. The vibrating section 271 is arranged below the center C of the housing 211. In the exemplary embodiment, the vibrating section 271 is heavier than components (specifically, the key top 235, the key rubber 236, the sub-substrate 237, the sub-substrate holding portion 238, the rechargeable battery 244 and the joystick 212) arranged above the center C of the housing 211. The vibrating section 271 may be heavier than the sum of the weights of the components.

According to the description above, in the exemplary embodiment, the center of gravity position of the spherical controller 200 (specifically, the controller main body 201) is located between the center C of the housing 211 and the lower end B of the surface of the housing 211. Note that in the exemplary embodiment, it can be said that the lower end B of the housing 211 is the floor contact portion of the surface of the housing 211. Note that the "center of gravity position being located between the center C and the lower end B" means that the position of the center of gravity with respect to the direction (i.e., the up-down direction) of the straight line that connects between the center C and the lower end B lies between the position of the center C with respect to this direction and the position of the lower end B with respect to this direction. That is, the center of gravity position does not need to be located on a line segment that connects between the center C and the lower end B. Therefore, in other embodiments, the lower end B of the housing 211 does not always need to be the floor contact portion, but a position shifted from the lower end B may be the floor contact portion.

According to the description above, when the spherical controller main body 201 is placed on a horizontal surface with no external force applied thereto, the controller main body 201 sits in an attitude such that the lower end B is in contact with the horizontal surface. In other words, when placed on a horizontal surface with no external force applied thereto, the controller main body 201 sits in an attitude such that the down input direction (i.e., the opposite direction to the "up input direction" described above) substantially coincides with the direction of gravity. When the user places the controller main body 201 on a horizontal surface in an attitude such that a position of the housing 211 that is different from the lower end B is in contact with the horizontal surface, the controller main body 201 automatically (in other words, naturally) turns into an attitude such that the floor contact portion (i.e., the lower end B) is in contact with the horizontal surface.

Since the controller main body 201 is spherical, it may become difficult for the user to recognize the up-down orientation based only on the outer shape of the controller main body 201. In contrast, according to the exemplary embodiment, the user can check the up-down orientation by placing the controller main body 201 on a horizontal surface, and the up-down orientation of the spherical controller 200 can be made easy-to-understand for the user.

Note that in the exemplary embodiment, it is possible to adjust the center of gravity position of the spherical controller 200 by using the vibrating section 271, which is heavier than the components. Specifically, by providing the vibrating section 271 between the center of the housing 211 and the floor contact portion, the center of gravity position can be arranged below the center. Thus, in the exemplary embodiment, the center of gravity position of the spherical controller 200 can be set without using a weight, and it is therefore possible to simplify the configuration of the spherical controller 200.

Note that in the exemplary embodiment, it can be said that the center of gravity position of the controller main body 201 is located on the side of the vibrating section 271 with respect to the center C of the housing 211. That is, the center of gravity position of the controller main body 201 is located on the side of the vibrating section 271 relative to a plane (i.e., the xz plane) that includes the center C and is perpendicular to the straight line (i.e., a straight line extending in the up-down direction) passing through the center C of the housing 211 and the center of the vibrating section 271. In other embodiments, the center of gravity position of the controller main body 201 does not need to be on a line segment that connects together the center C of the housing 211 and the lower end B, and may be at any position that is on the side of the vibrating section 271 relative to the plane. Also in this case, as in the exemplary embodiment, the user can check the up-down orientation by placing the controller main body 201 on a horizontal surface.

In the exemplary embodiment, the floor contact portion is at a position on the housing 211 different from the position where the joystick 212 is provided, and is a position that is on the opposite side from the operation surface 213 with respect to the center of the housing 211. Herein, the "position on the opposite side from the operation surface 213 with respect to the center of the housing 211" means a position that is opposite from the operation surface 213 with respect to a plane (i.e., the xz plane) that includes the center of the housing 211 and is perpendicular to a straight line passing through the center of the operation surface 213 and the center of the housing 211. Note that it can also be said that the vibrating section 271 is provided on an extension of the straight line that extends from the operation surface 213 to the center of the housing 211.

According to the description above, when the controller main body 201 is placed on a horizontal surface with no external force applied thereto, the controller main body 201 sits in an attitude such that the operation surface 213 faces up. Then, it is easy for the user to recognize the position of the operation surface 213 when the controller main body 201 is placed on a horizontal surface. According to the description above, the possibility that the operation surface 213 comes into contact with the horizontal surface is reduced. Therefore, it is possible to reduce the possibility that the operation surface 213 inadvertently hits the horizontal surface, resulting in the operation surface 213 being operated without the user intending to do so. When the controller main body 201 is placed on a horizontal surface with no external force applied thereto, the controller main body 201 sits in an attitude such that the operation surface 213 can be operated, thereby making it easy to operate the operation surface 213.

In the exemplary embodiment, the vibrating section 271 is provided at a position on the inner wall of the housing 211 that opposes the reverse side of the floor contact portion (see FIG. 27). Then, the center of gravity position of the controller main body 201 can be brought closer to the floor contact portion, and the controller main body 201 is more likely to be stable while being in contact with the floor contact portion when the controller main body 201 is placed on a horizontal surface with no external force applied thereto.

In the exemplary embodiment, the spherical controller 200 includes the rechargeable battery 244 provided inside the housing 211, and the charging terminal 249 that is provided at a position different from the floor contact portion and is electrically connected to the rechargeable battery 244. Then, when the controller main body 201 is placed on a horizontal surface with no external force applied thereto, the charging terminal 249 does not face down, making it easy for the user to find the charging terminal 249 and connect a charger, etc., to the charging terminal 249. Thus, in the exemplary embodiment, it is possible to make it easy for the user to charge the spherical controller 200, and improve the usability of the spherical controller 200.

In the exemplary embodiment, the charging terminal 249 is at a position recessed from the surface of the housing 211 (i.e., the recessed surface 245*d*). Thus, it is possible to reduce the possibility that the charging terminal 249 comes into contact with the floor on which the controller main body 201 is placed. For example, even when the controller main body 201 placed on the floor rolls over, the possibility that the charging terminal 249 comes into contact with the floor is reduced.

In the exemplary embodiment, the housing 211 includes the vibrating section attachment portions 273*b* on the reverse side of the housing 211, and the vibrating section 271 is secured directly on the vibrating section attachment portions 273*b* (see FIG. 23). Thus, since the vibrating section 271 is secured directly on the housing 211 (specifically, the lower housing part 223), the vibration from the vibrating section 271 can be efficiently transmitted to the housing 211. When the controller main body 201 is placed on a horizontal surface, the vibration from the vibrating section 271 can be easily transmitted also to the horizontal surface via the housing 211.

In the exemplary embodiment, there is an interval between the vibrating section 271 and the sensor electronic substrate (i.e., the main substrate 246) that carries thereon the acceleration sensor 247 (see FIG. 27). That is, the vibrating section 271 is not in direct contact with the substrate that carries thereon the acceleration sensor 247. Then, the acceleration sensor 247 is unlikely to be influenced by the vibration from the vibrating section 271. Thus, it is possible to reduce the possibility that the acceleration sensor 247 detects the vibration and fails to accurately detect the acceleration of the controller main body 201.

In the exemplary embodiment, the vibrating section 271 is secured directly on the housing 211 (specifically, the lower housing part 223), and the main substrate holding portion 245 that holds the sensor electronic substrate (i.e., the main substrate 246) that carries thereon the acceleration sensor 247 is secured directly on the housing 211 (specifically, the middle housing part 222 and the lower housing part 223). Therefore, the vibrating section 271 is connected indirectly, but not directly, to the substrate that carries thereon the acceleration sensor 247. Thus, the acceleration sensor 247 is unlikely to be influenced by the vibration from the vibrating section 271, and it is possible to reduce the possibility that the acceleration sensor 247 fails to accurately detect the acceleration of the controller main body 201.

(Regarding Configuration on Rear Side of Housing)

Figure 29:
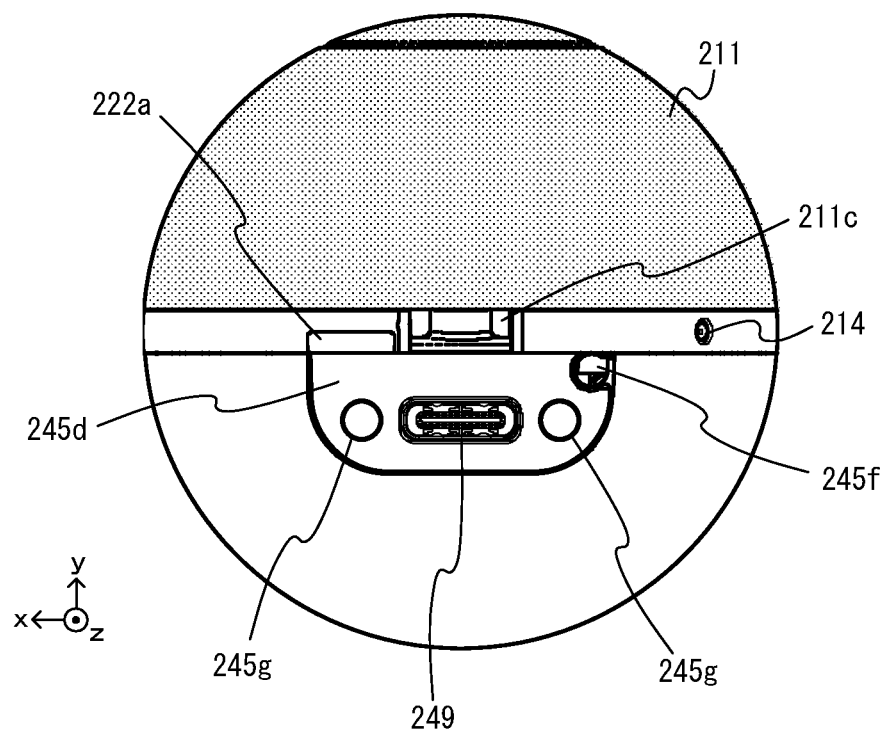
FIG. 29 is a back view of an example of a non-limiting controller main body with a cover portion removed.

FIG. 29 is a back view of an example of a controller main body with the cover portion 215 removed. As shown in FIG. 29, the recessed surface 245*d* described above is provided inside the cover portion 215. Note that although not shown in FIG. 29, the cover portion 215 is attached to the recessed surface 245*d* by inserting the rod-shaped portion 259 described above into the hole 245*f* provided in the recessed surface 245*d*. Note that as shown in FIG. 29, a notch 222*a* is provided at a position adjacent to the cover portion 215 of the middle housing part 222. The notch 222*a* is provided for the purpose of making it easy for the user to hook a finger or a fingernail of the user on the cover portion 215 when removing the cover portion 215 from the position where it is covering the recessed surface 245*d*.

As shown in FIG. 29, the recessed surface 245*d* is provided with the charging terminal 249. That is, the charging terminal 249 is provided so as to be exposed through a hole of the recessed surface 245*d*. The recessed surface 245*d* is also provided with holes 245*g* used for screwing together the upper-middle unit 290 (specifically, the main substrate holding portion 245 having the recessed surface 245d) and the lower unit 270 (specifically, the lower housing part 223).

As described above, in the exemplary embodiment, the spherical controller 200 includes the recessed surface 245d provided at a position recessed from a first surface of a housing part which forms a part of a spherical shape (specifically, the surface of the lower housing part 223). The recessed surface 245d is formed with the holes 245g for receiving therethrough screws for securing together the lower housing part 223 having the first surface and the recessed surface 245d (see FIG. 29). The spherical controller 200 also includes the cover portion 215 that covers the recessed surface 245d and has a second surface which forms a part of a spherical shape.

As described above, in the exemplary embodiment, screw holes for connecting together the upper-middle unit 290 and the lower unit 270 are covered by the cover portion 215. Then, the controller main body 201 can be configured with no screw holes on the surface thereof. Therefore, according to the exemplary embodiment, the shape of the controller main body 201 as seen from outside can be made closer to a sphere.

As shown in FIG. 29, the strap hole 211c to which a strap can be attached is at the rear end of the housing 211. That is, the strap hole 211c is at a position on a straight line that is extended from the center of the housing 211 in the opposite direction from the direction from the center of the housing 211 toward the center of the operation surface 252c of the joystick 212. Then, a strap can be attached at a position that is unlikely to interfere with operations on the joystick 212. Thus, it is possible to improve the operability of the spherical controller 200.

In the exemplary embodiment, the operation surface of the reboot button 214 shown in FIG. 29 is recessed from the surface of the housing 211. Then, it is possible to reduce the possibility that the reboot button 214 is operated inadvertently. Note that in other embodiments, the operation surface of the reboot button 214 may be provided along the surface of the housing 211 or may be provided so as to protrude relative to the surface of the housing 211.

[2-3. Configuration Related to Light Emission]

Figure 30:
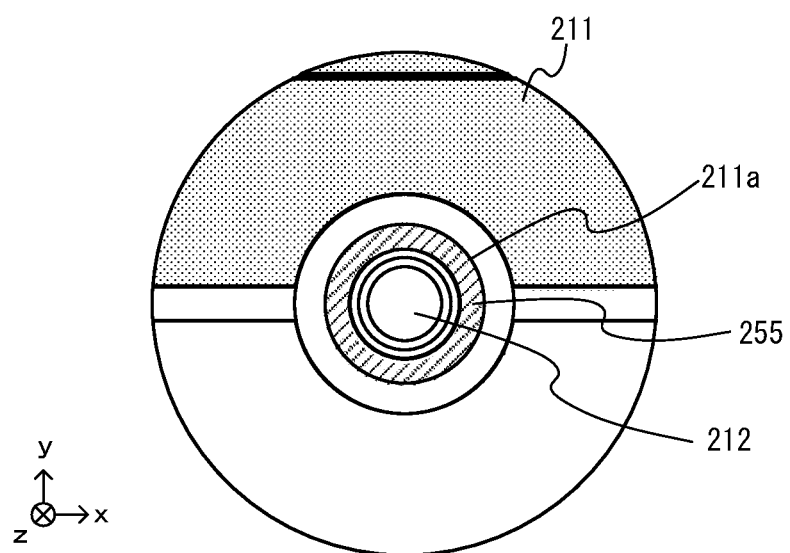
FIG. 30 is a diagram showing an example of how a non-limiting controller main body emits light.

Next, the configuration of the controller main body 201 related to light emission will be described. FIG. 30 is a diagram showing an example of how the controller main body emits light. As shown in FIG. 30, in the exemplary embodiment, the joystick 212 (specifically, the shaft portion 252) is provided so as to be exposed through the opening 211a of the housing 211, and the diffusion sheet 255 provided surrounding the joystick 212 (and the surrounding portion 256 and the reflective portion 253 on the rear side thereof) is provided so that it is visually recognizable from outside the housing 211. When light is emitted from the light-emitting section 248 inside the housing 211, light having passed through the inside of the lightguide 254 described above is output from the light-exiting surface of the lightguide 254. Thus, as shown in FIG. 30, the surrounding portion around the joystick 212 appears lit. Note that in FIG. 30, the light emission from the surrounding portion around the joystick 212 is represented by hatching. The light emission of the controller main body 201 will now be described in detail focusing on the configuration of the lightguide 254.

Figure 31:
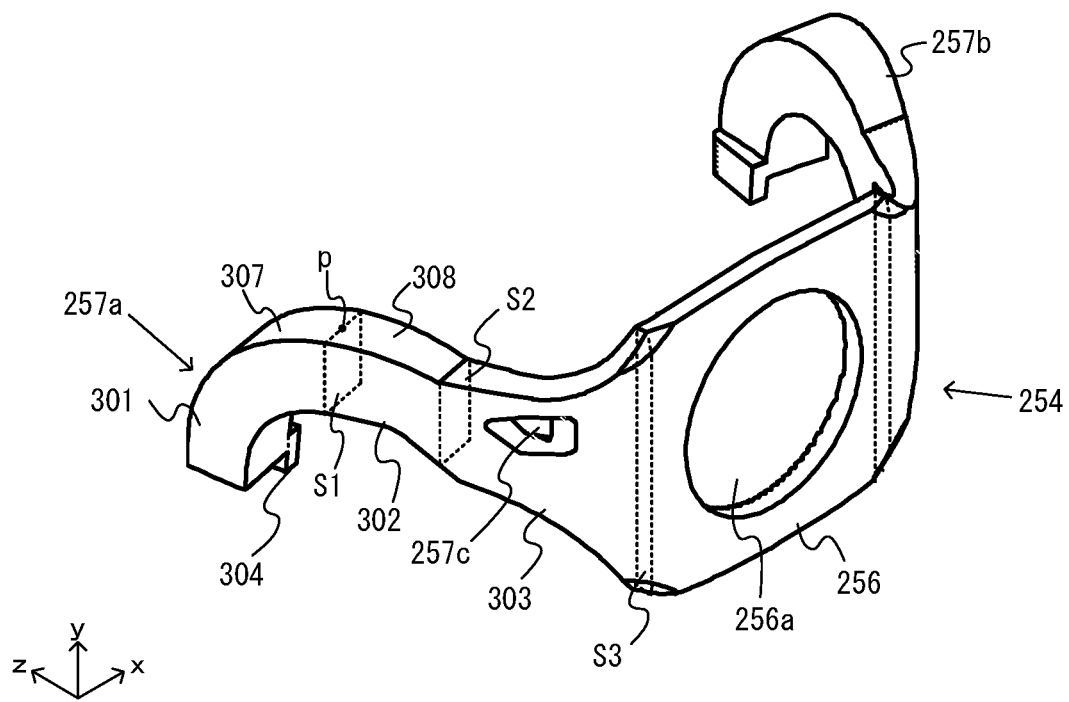
FIG. 31 is a perspective view showing an example of a non-limiting lightguide.
Figure 32:
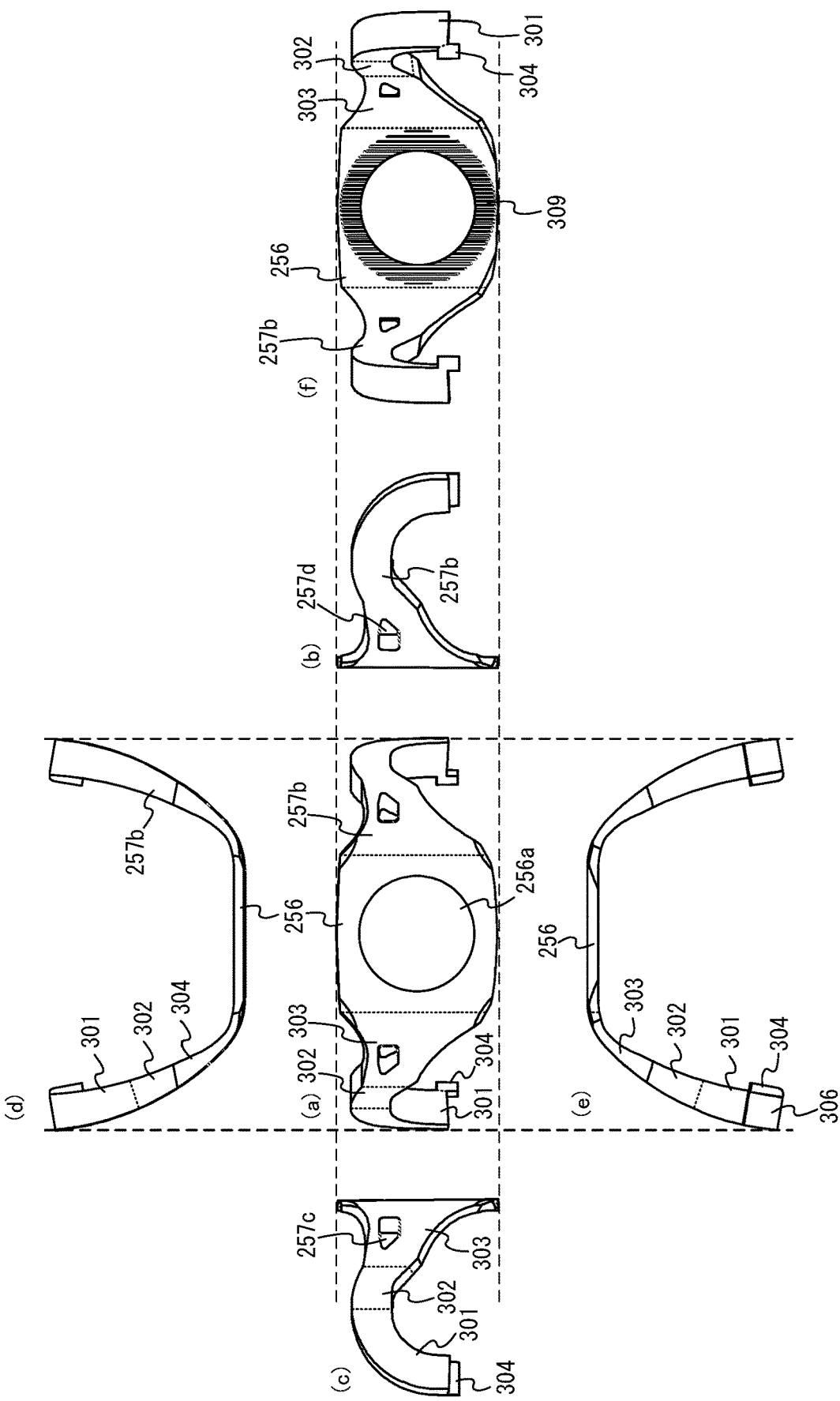
FIG. 32 shows six orthogonal views showing an example of a non-limiting lightguide.

FIG. 31 is a perspective view showing an example of the lightguide. FIG. 32 shows six orthogonal views showing an example of the lightguide. Herein, in the present specification, the lightguide 254 will be described as a plurality of parts for the purpose of discussion, and cross sections that are boundaries between these parts are drawn in dotted lines in FIG. 31 and FIG. 32. Note that in the exemplary embodiment, the lightguide 254 is an integral member and is not divided into these parts. Note however that in other embodiments, the lightguide 254 may be composed of these separate parts.

As described above, the lightguide 254 includes the surrounding portion 256, the left extended portion 257a and the right extended portion 257b. As shown in FIG. 31, the surrounding portion 256 has a quadrilateral plate shape. The left extended portion 257a is provided so as to extend from the left side surface of the surrounding portion 256, and the right extended portion 257b is provided so as to extend from the right side surface of the surrounding portion 256. Note that in the exemplary embodiment, the third cross section S3 is the cross section to be the boundary between the surrounding portion 256 and the left extended portion 257a.

In the exemplary embodiment, a flat plate-shaped portion of the lightguide 254 that is provided perpendicular to the front-rear direction is defined as the surrounding portion 256, and a portion thereof that extends curved rearward from the flat plate-shaped portion is defined as the extended portion 257 (see FIG. 31). Note however that in other embodiments, the surrounding portion 256 does not need to be composed only of the flat plate-shaped portion, and it does not need to be flat plate-shaped as a whole.

Note that in the exemplary embodiment, the lightguide 254 is formed in left-right symmetry. Therefore, the configuration of the right extended portion 257b is equal to the left extended portion 257a except that it is left-right inverted. Therefore, the left extended portion 257a will be described below in detail, and the right extended portion 257b will not be described in detail.

[2-3-1. Extended Portion]

As shown in FIG. 31 and FIG. 32, the left extended portion 257a has an arm-like shape. Note that the "extended portion having an arm-like shape" means that the extended portion is narrower than the surrounding portion 256 at least in a predetermined direction. Specifically, in the exemplary embodiment, the left extended portion 257a extends while becoming narrower in the up-down direction than the surrounding portion 256. The width of the extended portion 257 in the up-down direction gradually decreases over a portion thereof as the extended portion 257 extends from the surrounding portion 256 (in other words, away from the surrounding portion 256). Therefore, it can also be said that the extended portion 257 is an arm portion provided on the surrounding portion 256. In the exemplary embodiment, since the left extended portion 257a has an arm-like shape, the left extended portion 257a is unlikely to interfere with other components to be arranged inside the housing 211. Note that in other embodiments, the left extended portion 257a does not need to become narrower as it extends away from the surrounding portion 256. For example, the left extended portion 257a may have a constant cross-sectional area in a direction perpendicular to the direction in which it extends from the surrounding portion 256.

As shown in FIG. 31 and (d) of FIG. 32, the left extended portion 257a extends from the surrounding portion 256 and is then curved toward the inner side of the housing 211. Thus, a light-receiving surface 306 can be arranged on the inner side of the housing 211 relative to the surrounding portion 256. Note that while the entirety of the left extended portion 257a is curved toward the inner side of the housing 211 in the exemplary embodiment, only a portion of the left extended portion 257a may be curved toward the inner side of the housing 211 in other embodiments. That is, the left extended portion 257a includes a portion that extends from the surrounding portion 256 and is curved toward the inner side of the housing 211.

Note that in the exemplary embodiment, the left extended portion 257a includes a portion that extends from the surrounding portion 256 and is curved toward the inner side of the housing 211, and has an arm-like shape. Note however that in other embodiments, the left extended portion 257a may have an arm-like shape that does not include the curved portion, or may be a shape that is not an arm-like shape and includes the curved portion. There is no limitation on the shape of the left extended portion 257a, and it may not be an arm-like shape and not include the curved portion in other embodiments.

As shown in FIG. 22, the left extended portion 257a is provided so as to extend toward the left light-emitting section 248a. Specifically, in the exemplary embodiment, the tip portion of the left extended portion 257a extends to the vicinity of the left light-emitting section 248a (more specifically, the vicinity above the left light-emitting section 248a). Therefore, the light-receiving surface 306 provided at the tip portion is arranged in the vicinity of the left light-emitting section 248a. Thus, it is easy to arrange the light-receiving surface 306 at such a position that light from the left light-emitting section 248a can be received efficiently.

As shown in FIG. 31, the left extended portion 257a includes a first lightguide portion 301, a second lightguide 302 and a third lightguide 303. The first lightguide portion 301 is a portion of the left extended portion 257a from the light-receiving surface 306 shown in FIG. 32 to the first cross section S1. The second lightguide portion 302 is a portion of the left extended portion 257a from the first cross section S1 to the second cross section S2. The third lightguide portion 303 is a portion of the left extended portion 257a from the second cross section S2 to the third cross section S3.

The first cross section S1 is a cross section that is substantially perpendicular to the light-receiving surface 306 and that includes a position (the position p shown in FIG. 31) at which the normal direction to the outer surface on the upper side of the left extended portion 257a is the upward direction. Note that in the exemplary embodiment, the light-receiving surface 306 is provided substantially parallel to the up-down direction. The second cross section S2 is a cross section in the left extended portion 257a that is between the first cross section S1 and the third cross section S3 and that is substantially perpendicular to the light-receiving surface 306.

The first lightguide portion 301 includes the light-receiving surface 306 facing down (see FIG. 32). Note that in the present specification, the orientation of a surface refers to the normal direction to the surface. In the exemplary embodiment, the light-receiving surface 306 is provided at a position opposing the left light-emitting section 248a provided on the main substrate 246 (see FIG. 22). Specifically, the light-receiving surface 306 is provided above the left light-emitting section 248a with an interval from the left light-emitting section 248a.

In the exemplary embodiment, the left extended portion 257a includes a protruding portion 304. As shown in FIG. 31 and FIG. 32, the protruding portion 304 protrudes relative to the light-receiving surface 306 from the side (herein, the right side) of the light-receiving surface 306. Herein, the amount by which the protruding portion 304 protrudes is greater than the amount by which the left light-emitting section 248a protrudes. That is, the length by which the protruding portion 304 protrudes from the light-receiving surface 306 is longer than the length by which the left light-emitting section 248a protrudes from the main substrate 246. Note that the protruding portion 304 may or may not be in contact with the main substrate 246.

Therefore, in the exemplary embodiment, if the lightguide 254 moves inside the housing 211 so that the light-receiving surface 306 moves toward the left light-emitting section 248a, the protruding portion 304 comes into contact with the main substrate 246, preventing the light-receiving surface 306 from coming into contact with the left light-emitting section 248a. That is, in the exemplary embodiment, if the light-receiving surface 306 is moved in the direction toward the left light-emitting section 248a, the protruding portion 304 serves as a contact portion that comes into contact with the main substrate 246 before the light-receiving surface 306 comes into contact with the left light-emitting section 248a. Thus, even when the lightguide 254 is shifted inside the housing 211 for some reason, it is possible to reduce the possibility that the lightguide 254 damages the light-emitting section 248 by coming into contact with the light-emitting section 248.

As shown in FIG. 31 and FIG. 32, the first lightguide portion 301 has a curved rod-like shape. Specifically, the first lightguide portion 301 extends from the light-receiving surface 306 upward while being bent forward. In other words, the first lightguide portion 301 has a shape that is curved toward the forward direction while extending upward from the light-receiving surface 306. Therefore, an inner wall surface 307 of the upper side surface of the side surfaces of the first lightguide portion 301 (i.e., the surfaces that connect together the light-receiving surface 306 and the first cross section S1) faces forward and downward (see FIG. 33 to be discussed later). Note that the cross-sectional area of the first lightguide portion 301 (specifically, the cross-sectional area along a cross section of the first lightguide portion 301 that is parallel to the normal direction to the side surface; in other words, the cross-sectional area along a cross section that is perpendicular to the direction extending from the light-receiving surface 306 to the first cross section S1) is substantially constant. This cross section has substantially the same quadrilateral shape as the light-receiving surface 306.

As shown in FIG. 31 and FIG. 32, the second lightguide portion 302 has a curved rod-like shape. Specifically, the second lightguide portion 302 extends from the first cross section S1 forward while being bent slightly downward. In other words, the second lightguide portion 302 has a shape that is curved downward while extending forward from the first cross section S1. Therefore, an inner wall surface 308 of the upper side surface of the side surfaces of the second lightguide portion 302 (i.e., the surfaces that connect together the first cross section S1 and the second cross section S2) faces downward and rearward (see FIG. 33 to be discussed later). Note that the cross-sectional area of the second lightguide portion 302 (specifically, the cross-sectional area along a cross section of the second lightguide portion 302 that is parallel to the normal direction to the side surface; in other words, the cross-sectional area along a cross section that is perpendicular to the direction extending from the first cross section S1 to the second cross section S2) is substantially constant. This cross section has substantially the same quadrilateral shape as the light-receiving surface 306.

As shown in FIG. 31 and FIG. 32, the third lightguide portion 303 has such a shape that the width thereof in the up-down direction gradually increases in the forward direction. It can be said that the third lightguide portion 303 has a plate shape that is wider on the front side. The third lightguide portion 303 is curved to the right in the forward direction.

The hole 257c is in the third lightguide portion 303. The hole 257c is a hole passing through the plate-shaped third lightguide portion 303 in the left-right direction (it can also be said to be the front-rear direction). As shown in FIG. 31, in the exemplary embodiment, the shape of the hole 257c is pointed on the rear side.

Figure 33:
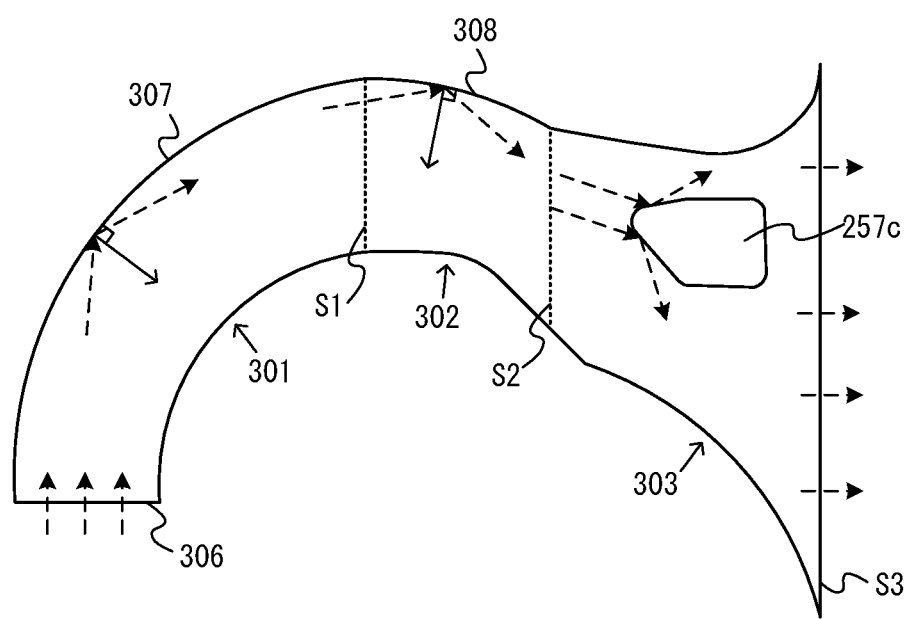
FIG. 33 is a diagram schematically showing an example of how light passes through a non-limiting left extended portion.

FIG. 33 is a diagram schematically showing an example of how light passes through the left extended portion. Note that in the present specification, "to schematically show" means to show the size and shape of an component or components of interest and the positional relationship between components in a different manner from other figures for the purpose of making the component or components of interest (e.g., the left extended portion in FIG. 33) more conspicuous. Note that while the left extended portion 257a is curved to the right whose extending forward from the light-receiving surface 306 in the exemplary embodiment, the description of FIG. 33 neglects the bending of light with respect to the left-right direction (in other words, assuming that the left extended portion 257a is not curved in the left-right direction) for the purpose of discussing how light travels in the up-down direction and the front-rear direction.

As shown in FIG. 33, light emitted from the left light-emitting section 248a enters the inside of the first lightguide portion 301 of the left extended portion 257a via the light-receiving surface 306 (see the arrow shown in FIG. 33). Note that while directions of travel of light are denoted by dotted arrows in FIG. 33, the direction of travel of light through the left extended portion 257a is not uniform, and there are light components that travel in directions different from those denoted by the dotted arrows shown in FIG. 33.

Light having been received via the light-receiving surface 306 travels generally upward through the first lightguide portion 301. Herein, on the inner wall surface 307 on the upper side of the first lightguide portion 301, the normal direction (see the arrow shown in FIG. 33) faces forward and downward (more specifically, the normal direction faces more downward at higher positions). Therefore, when light is reflected at the inner wall surface 307, the direction of travel changes toward the front side (in other words, the direction becomes closer to the forward direction) (see the dotted arrows shown in FIG. 33). Note that since the first lightguide portion 301 is curved by 90° (in other words, the light-receiving surface 306 and the first cross section S1 are substantially perpendicular to each other), most of the light having been received via the light-receiving surface 306 of the first lightguide portion 301 is reflected at a position on the inner wall surface 307 to change its direction of travel. As described above, light having been received via the light-receiving surface 306 travels through the first lightguide portion 301 while changing its direction of travel generally from the upward direction to the forward direction. Then, light in the first lightguide portion 301 enters the second lightguide portion 302 through the first cross section S1.

In the second lightguide portion 302, light having entered through the first cross section S1 travels generally in the forward direction. Herein, on the inner wall surface 308 on the upper side of the second lightguide portion 302, the normal direction faces downward and rearward (see the arrow shown in FIG. 33). Therefore, when light is reflected at the inner wall surface 308, the direction of travel changes toward the lower side (in other words, the direction becomes closer to the downward direction) (see the dotted arrows shown in FIG. 33). Thus, in the second lightguide portion 302, light having entered through the first cross section S1 travels generally in the forward direction, and a portion of the light is reflected at the inner wall surface 308 to change its direction of travel downward and travel through the second lightguide portion 302. Then, light in the second lightguide portion 302 enters the third lightguide portion 303 through the second cross section S2.

In the third lightguide portion 303, since the width in the up-down direction is increased, light is output from the third cross section S3 that is longer in the up-down direction than the second cross section S2. Herein, the hole 257c is provided in the third lightguide portion 303. Therefore, light reflected at the inner wall surface that is the circumference of the hole 257c changes its direction of travel toward the upper side or the lower side of the hole 257c (see the dotted arrows shown in FIG. 33). Light traveling through the third lightguide portion 303 is divided into portions that pass through the upper side of the hole 257c and portions that pass through the lower side of the hole 257c, entering the surrounding portion 256 through the third cross section S3. Note that while FIG. 33 shows dotted arrows that are oriented perpendicular to the third cross section S3, the direction of travel of light passing through the third cross section S3 is not limited to the direction of these arrows.

Herein, when light travels through a curved lightguide, as with the left extended portion 257a, the amount of light traveling through the outer portion of the curved lightguide is larger than the amount of light traveling through the inner portion thereof. Therefore, if the second lightguide portion 302 is configured so that the inner wall surface 308 on the upper side does not face rearward (i.e., so that it faces directly downward or forward), the amount of light traveling through the upper portion of the third lightguide portion 303 will be large and the amount of light traveling through the lower portion thereof will be small. As a result, a large amount of light will enter the surrounding portion 256 from the upper portion of the third cross section S3 while only a small amount of light will enter the surrounding portion 256 from the lower portion of the third cross section S3. Then, at the light-exiting surface of the surrounding portion 256, the amount of light emission from the upper portion and that from the lower portion will differ. As a result, only the upper portion of the light-exiting surface will possibly be lit strongly, thereby failing to uniformly light the light-exiting surface.

In contrast, in the exemplary embodiment, the inner wall surface 308 on the upper side of the second lightguide portion 302 is configured to face downward and rearward. Then, it is possible to increase the amount of light traveling through the lower portion of the third lightguide portion 303, thereby increasing the amount of light to be output from the lower portion of the light-exiting surface of the surrounding portion 256.

Note that when the inner wall surface 308 on the upper side of the second lightguide portion 302 faces downward and rearward, the amount of light traveling through the lower portion of the third lightguide portion 303 may increase, thereby relatively reducing the amount of light traveling through the upper portion. In view of this, in the exemplary embodiment, the hole 257c is provided in the third lightguide portion 303. Thus, light reflected at the inner wall surface on the upper side of the hole 257c in the third lightguide portion 303 changes its direction of travel toward the upper side, and it is therefore possible to ensure sufficient light traveling through the upper portion of the third light-guide portion 303. Therefore, in the exemplary embodiment, light can be made to uniformly enter the surrounding portion 256 through the upper portion and from the lower portion of the third cross section S3, making it possible to uniformly light the light-exiting surface.

[2-3-2. Surrounding Portion]

As shown in FIG. 31 and FIG. 32, the surrounding portion 256 is formed with a hole 256a running through the surrounding portion 256 in the front-rear direction. In the exemplary embodiment, a region of the surface (i.e., the front side surface) of the surrounding portion 256 that is surrounding the hole 256a is visually recognizable from outside the controller main body 201, and this region serves as the light-exiting surface.

Figure 34:
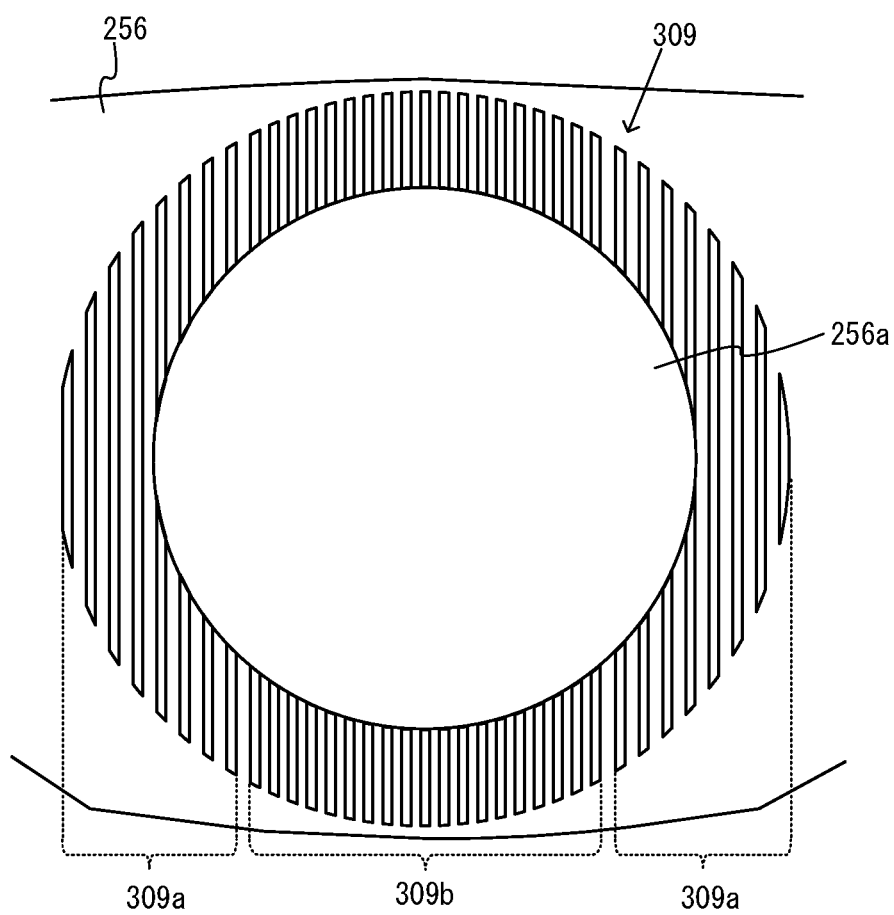
FIG. 34 is a diagram showing an example of a reverse surface of a non-limiting surrounding portion.

FIG. 34 is a diagram showing an example of the reverse surface of the surrounding portion 256. As shown in FIG. 34, cutouts (specifically, slits 309) are on the reverse surface (i.e., the surface on the rear side) of the surrounding portion 256. In the exemplary embodiment, the slits 309 are in the annular region within a predetermined distance from the hole 256a. Specifically, the slits 309 are linear grooves extending in the up-down direction. The slits 309 are provided for the purpose of increasing the amount of light to be output from the light-exiting surface, the details of which will be described later.

Figure 35:
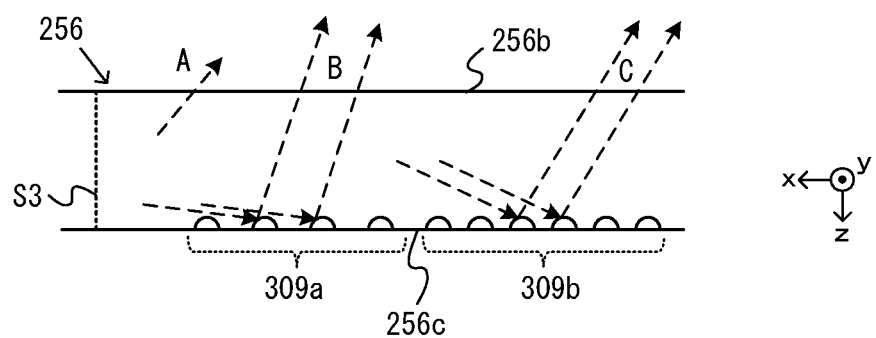
FIG. 35 is a cross-sectional view schematically showing an example of a cross section of a non-limiting surrounding portion.

FIG. 35 is a cross-sectional view schematically showing an example of the cross section of the surrounding portion. Note that FIG. 35 is a cross-sectional view showing a portion of a cross section perpendicular to the up-down direction. As shown in FIG. 35, light having entered the surrounding portion 256 through the third cross section S3 is output from a light-exiting surface 256b. Specifically, a portion of light having entered the surrounding portion 256 through the third cross section S3 that travels forward is output, as it is (i.e., without being reflected), through the light-exiting surface 256b (see the dotted arrow A shown in FIG. 35). On the other hand, a portion of light having entered the surrounding portion 256 through the third cross section S3 that travels rearward is reflected at a reverse surface 256c. Herein, in the exemplary embodiment, the slits 309 (slits 309a and 309b in FIG. 34 and FIG. 35) are on the reverse surface 256c. Therefore, a portion of light having entered the surrounding portion 256 through the third cross section S3 that travels rearward is reflected by the slits 309 so that it is likely to be reflected forward (see dotted arrows B and C shown in FIG. 35). Therefore, with the provision of the slits 309, it is possible to increase the amount of light to be output from the light-exiting surface 256b.

As described above, in the exemplary embodiment, with the surrounding portion 256, light having been received via the light-receiving surface and guided through the extended portion 257 is reflected by the reverse surface 256c of the light-exiting surface 256b toward the light-exiting surface 256b. That is, it can be said that on the reverse side of the light-exiting surface 256b of the surrounding portion 256, the surrounding portion 256 has a reflection surface for reflecting light that has been received via the light-receiving surface and guided through the extended portion 257 toward the light-exiting surface 256b. Owing to this reflection surface, it is possible with the spherical controller 200 to increase the amount of light to be output from the light-exiting surface. Note that in other embodiments, there is no need to provide cutouts on the reflection surface. Even when cutouts are not provided, the reflection surface has the function of reflecting light toward the light-exiting surface 256b.

In the exemplary embodiment, one or more cutouts (specifically, the slits 309) are provided on the reflection surface. Thus, it is possible to increase the amount of light to be reflected by the reflection surface and output from the light-exiting surface 256b. Note that while the linear slits 309 are provided as the cutouts in the exemplary embodiment, there is no limitation on the shape and the number of cutouts. For example, in other embodiments, the cutout may be a dot-shaped cutout (specifically, as hemispherical cutout having a semicircular cross section), and there may be a plurality of dot-shaped cutouts on the reflection surface.

Note that in the exemplary embodiment, since the extended portions 257a and 257b are provided on opposite (left and right) sides of the surrounding portion 256, light enters the surrounding portion 256 from opposite (left and right) sides and is output from the light-exiting surface 256b.

Herein, the slits 309 are provided to extend in a direction that crosses the direction of travel (herein, the left-right direction) of light having been received via the light-receiving surface and guided through the extended portion 257 to the surrounding portion 256. Specifically, the extended portion 257 extends from a predetermined portion (i.e., the left and right end portions) on the outer side surface of the surrounding portion 256, and the slits 309 are provided to extend in a direction that has a component of the direction (i.e., the up-down direction) that is perpendicular to the direction from the center of the surrounding portion 256 toward the predetermined portion. Then, light from the extended portion 257 can be efficiently reflected by the slits 309, and it is therefore possible to increase the amount of light to be output from the light-exiting surface 256b.

Note that while the slits 309 are provided to extend substantially parallel to the direction (specifically, the up-down direction) parallel to the side surface of the surrounding portion 256 in the exemplary embodiment, the slits 309 in other embodiments may be provided to extend in any direction crossing a straight line (i.e., a straight line extending in the left-right direction) that is perpendicular to the side surface of the surrounding portion 256. In other words, the slits 309 may be provided to extend in any direction that has a component of the up-down direction. For example, the slits 309 may be provided to extend in a diagonally upward direction. Then, as in the exemplary embodiment, it is possible to increase the amount of light to be output from the light-exiting surface 256b.

In the exemplary embodiment, as shown in FIG. 34 and FIG. 35, the interval between the slits 309a provided in the outer region of the light-exiting surface is wider than the interval between the slits 309b provided in the inner region thereof. Note that the outer region is a region of the light-exiting surface that is near the extended portion (more accurately, the closer one of the extended portions 257a and 257b provided on the left and right of the surrounding portion 256), and specifically is a region within a predetermined distance from the extended portion. In the exemplary embodiment, since the extended portions are provided on opposite (left and right) sides of the surrounding portion 256, regions of the surface of the surrounding portion 256 near the left and right edges are the outer regions. The inner region is a region of the light-exiting surface that is sandwiched between the two (left and right) outer regions.

Therefore, in the exemplary embodiment, in the inner region away from the extended portions 257a and 257b on the left and right of the surrounding portion 256, the density of the slits 309 is higher than that in the outer region near one of the extended portions 257a and 257b. Herein, since light beams from the extended portions less easily reach the inner region as compared with the outer region, if the inner region and the outer region have the same density of the slits 309, more light will be output from the outer region than from the inner region. As a result, the amount of light output will differ between the outer region and the inner region, and it will be difficult to uniformly light the light-exiting surface. In contrast, in the exemplary embodiment, the density of the slits 309b in the inner region is higher than the density of the slits 309a in the outer region, thereby increasing the amount of light to be reflected by the slits 309b and output from the light-exiting surface 256b (see arrows C shown in FIG. 35), relative to the amount of light to be reflected by the slits 309a and output from the light-exiting surface 256b (see arrows B shown in FIG. 35). Then, the amount of light to be output from the outer region and the amount of light to be output from the inner region can be made close to each other, thereby making it easier to uniformly light the light-exiting surface.

As described above, in the exemplary embodiment, the reflection surface includes a first region where the cutouts are with a first interval therebetween (specifically, a region where the slits 309b are provided) and a second region where the cutouts are with a second interval therebetween that is smaller than the first interval (specifically, a region where the slits 309a are provided). Thus, the amount of light to be output from the light-exiting surface can be adjusted for each region. Moreover, in the exemplary embodiment, the distance from the second region to the extended portion 257 is shorter than the distance from the first region to the extended portion 257. Thus, the spherical controller 200 is more likely to be able to uniformly light the light-exiting surface.

Note that in the exemplary embodiment, the density of cutouts in the surrounding portion 256 is set in two levels for the first region and for the second region. Herein, in other embodiments, the density of cutouts in the surrounding portion 256 may be set in three or more levels. In other embodiments, the slits may be provided so that the density changes gradually. Note that in embodiments where the density is set in three or more levels, the first region is one of three or more regions having different densities, and the second region is another one of the three or more regions. In embodiments where the density changes gradually, the first region is a position (in other words, region) where the density is at a certain level, and the second region is a position where the density is at a lower level. That is, "the reflection surface including the first region and the second region" means to include embodiments where the density is set in three or more levels, and embodiments where the density changes gradually.

Although not shown in FIG. 35, in the exemplary embodiment, a white reflective portion 253 is provided on the reverse surface (in other words, the surface that faces toward the inner side of the housing 211) of the surrounding portion 256 (see FIG. 19). Therefore, with the white reflective portion 253, it is possible to reduce the amount of light that passes from the reverse surface of the surrounding portion 256 to the rear side of the surrounding portion 256 and the amount of light that is absorbed by the reflective portion 253. As a result, it is possible to increase the amount of light to be output from the light-exiting surface 256b.

Figure 36:
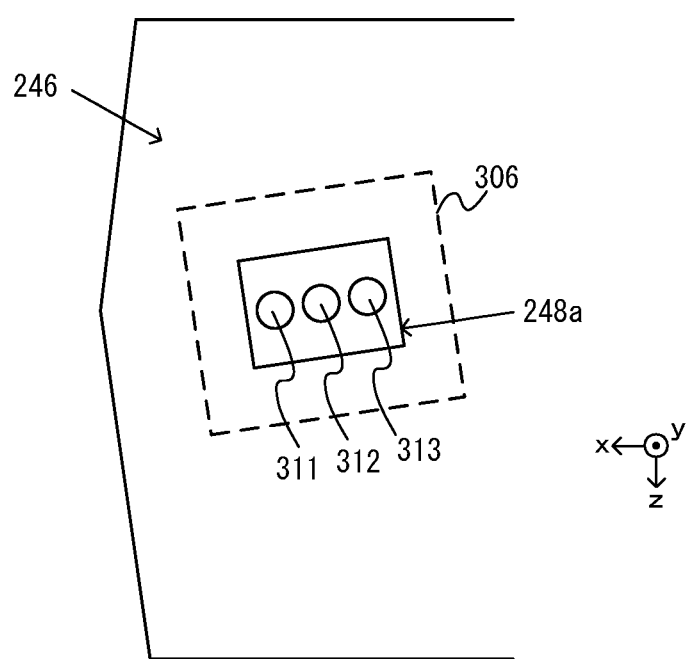
FIG. 36 is a diagram showing an example of an arrangement of light-emitting elements in a non-limiting light-emitting section.

FIG. 36 is a diagram showing an example of an arrangement of light-emitting elements in a light-emitting section. In the exemplary embodiment, as shown in FIG. 36, the left light-emitting section 248a includes three light-emitting elements (e.g., LEDs) 311 to 313. The light-emitting elements 311 to 313 emit different colors of light. Specifically, the light-emitting element 311 emits red light, the light-emitting element 312 emits green light, and the light-emitting element 313 emits blue light. The light beams from the light-emitting elements 311 to 313 of the left light-emitting section 248a each travel through the lightguide 254 via the light-receiving surface 306 to be output from the light-exiting surface 256b. Then, since the colors of light from the light-emitting elements 311 to 313 are mixed together and output from the light-exiting surface 256b, color-mixed light is output from the light-exiting surface 256b. Thus, the spherical controller 200 can emit various colors of light.

In the exemplary embodiment, the left light-emitting section 248a is provided so that the light-emitting elements 311 to 313 are arranged next to each other in the longitudinal direction of the light-receiving surface 306 (see FIG. 36). Herein, the longitudinal direction of the light-receiving surface is one of the directions of the two sides of the quadrilateral-shaped light-receiving surface that is closer to the left-right direction of the controller main body 201. Note that while the longitudinal direction of the light-receiving surface does not coincide with the left-right direction of the controller main body 201 in the exemplary embodiment, the longitudinal direction of the light-receiving surface may coincide with the left-right direction of the controller main body 201 in other embodiments.

Herein, in the exemplary embodiment, the left extended portion 257a of the lightguide 254 has a curved shape as seen from the longitudinal direction of the light-receiving surface 306 (see FIG. 35). Therefore, if the light-emitting elements 311 to 313 are arranged next to each other in the width direction of the light-receiving surface 306 (i.e., the direction perpendicular to the longitudinal direction of the light-receiving surface 306), different colors of light from the light-emitting elements 311 to 313 are likely to be received by the light-receiving surface 306 from different positions with respect to the width direction of the light-receiving surface 306. Then, the different colors of light will be likely to travel through different paths with respect to the up-down direction in the second lightguide portion 302 and the third lightguide portion 303, and will not be sufficiently mixed together through the left extended portion 257a. As a result, different colors of light may be output from the upper portion and from the lower portion of the third cross section S3, and light beams output from the upper portion and the lower portion of the light-exiting surface 256b of the surrounding portion 256 may appear in different colors.

In contrast, in the exemplary embodiment, the light-emitting elements 311 to 313 are arranged next to each other in the longitudinal direction of the light-receiving surface 306. That is, the light-emitting elements 311 to 313 are arranged at substantially the same position with respect to the width direction of the light-receiving surface 306, and different colors of light from the light-emitting elements 311 to 313 are likely to travel through the same path with respect to the up-down direction in the second lightguide portion 302 and the third lightguide portion 303. As a result, it is possible to reduce the possibility that light beams output from the upper portion and the lower portion of the light-exiting surface 256b of the surrounding portion 256 appear in different colors.

Note that while the arrangement of the light-emitting elements 311 to 313 of the left light-emitting section 248a has been described above with reference to FIG. 36, the arrangement of light-emitting elements of the right light-emitting section 248b is similar to the left light-emitting section 248a. That is, the right light-emitting section 248b includes three light-emitting elements that emit red light, green light and blue light, and the three light-emitting elements are arranged next to each other in the longitudinal direction of the light-receiving surface of the right extended portion 257b. Therefore, it is possible to reduce the possibility that light beams from the right light-emitting section 248b that are output from the upper portion and the lower portion of the light-exiting surface 256b appear in different colors.

[2-3-3. Configuration Related to Light Emission]

As described above, in the exemplary embodiment, the spherical controller 200 includes the following components.

the housing 211 with the opening 211a.

the operation section at least a portion of which is exposed through the opening 211a (specifically, the joystick 212).

the light-emitting section 248 provided inside the housing 211 for emitting light.

the lightguide 254 including a light-receiving surface (e.g., the light-receiving surface 306) for receiving light generated from the light-emitting section 248, and a light-exiting surface (i.e., the light-exiting surface 256b) for outputting light having been received via the light-receiving surface to the outside of the housing 211.

Herein, the lightguide includes the surrounding portion 256 that has a light-exiting surface and is provided so as to surround the circumference of the operation section, and the extended portion 257 that is provided to extend from the surrounding portion 256 and has a light-receiving surface at the tip portion thereof (more specifically, an end portion that is opposite from the side where it is continuous with the surrounding portion 256).

With the configuration above, as the lightguide 254 includes the extended portion 257, it is possible to arrange the light-receiving surface at a position different from the light-exiting surface. Thus, it is possible to improve the degree of freedom regarding the arrangement of the light-emitting section 248. For example, it is possible to arrange the light-emitting section at a position away from the operation section.

Note that "(the surrounding portion) provided so as to surround the circumference of the operation section" means to include embodiments where the surrounding portion with a cutout is provided around the operation section, as well as embodiments where the surrounding portion completely surrounds the entire circumference of the operation section. Moreover, "(the surrounding portion) provided so as to surround the circumference of the operation section" does not mean to define the interval between the surrounding portion and the operation section, but means to include both embodiments where the surrounding portion and the operation section are in contact with each other and embodiments where the surrounding portion and the operation section are not in contact with each other.

While the extended portion 257 includes a curved portion (e.g., the first lightguide portion 301 and the second lightguide portion 302) in the exemplary embodiment, the extended portion 257 may include a bent portion. That is, the extended portion 257 may include at least one of a curved portion and a bent portion. Then, the light-receiving surface can be arranged at a position different from the light-exiting surface, and it is possible to improve the degree of freedom regarding the arrangement of the light-emitting section.

In the exemplary embodiment, the light-receiving surface faces toward a direction (i.e., the downward direction) that is different from the direction opposite to the direction toward which the light-exiting surface faces (i.e., the forward direction) (see FIG. 32). In other words, the light-receiving surface faces toward a direction that is not parallel to the direction toward which the light-exiting surface faces. It can also be said that the light-receiving surface is oriented so that the plane extending along the light-receiving surface crosses the plane extending along the light-exiting surface. It can also be said that the light-receiving surface is oriented so that the angle formed between the normal direction to the light-receiving surface (i.e., the downward direction) and the normal direction to the light-exiting surface (i.e., the forward direction) is other than 180 degrees. Specifically, in the exemplary embodiment, the light-exiting surface is provided substantially perpendicular to the light-receiving surface. That is, in the exemplary embodiment, the light-exiting surface faces toward the forward direction whereas the light-receiving surface faces toward the downward direction. Note that in other embodiments, the light-receiving surface does not need to be provided substantially perpendicular to the light-exiting surface. For example, in other embodiments, the normal direction to the light-receiving surface may be in an orientation at 450, or in an orientation at 120°, with respect to the normal direction to the light-exiting surface.

According to the description above, it is possible to improve the degree of freedom in the arrangement of the light-emitting section 248. For example, when light is emitted in the forward direction as in the exemplary embodiment, the light-emitting section 248 can be arranged so as to emit light in the upward direction.

In the exemplary embodiment, the spherical controller 200 includes an electronic substrate (i.e., the main substrate 246) that carries thereon the light-emitting section 248, and the electronic substrate is oriented inside the housing 211 in a different direction (i.e., the upward direction) from the direction of the light-exiting surface (see FIG. 19). Specifically, in the exemplary embodiment, the electronic substrate is provided substantially perpendicular to the light-exiting surface. Thus, when the light-emitting section 248 is provided on the electronic substrate, it is possible, with the lightguide, to improve the degree of freedom in the arrangement of the electronic substrate. In the exemplary embodiment, the electronic substrate may be oriented in the up-down direction while the light-exiting surface is oriented in the forward direction.

In the exemplary embodiment, the extended portion 257 extends from the outer circumference (specifically, the left and right side surfaces) of the surrounding portion 256 in a direction toward the outer side of the outer circumference and toward the inner side of the housing 211 (see FIG. 19 and FIG. 31). In other words, the extended portion 257 extends from the outer circumference of the surrounding portion 256 toward the outer side of the outer circumference and toward the inner side of the housing 211. Then, components different from the light-emitting section 248 can be arranged on the reverse side of the surrounding portion 256 (in other words, the reverse side of the light-exiting surface). In the exemplary embodiment, the base portion 251 of the joystick 212 is provided on the reverse side of the surrounding portion 256. Thus, according to the exemplary embodiment, it is possible to further improve the degree of freedom in the arrangement of components in the housing 211.

In the exemplary embodiment, the extended portion 257 includes the portions (a) to (c) as follows.

(a) the first lightguide portion (e.g., the first lightguide portion 301) extending from the light-receiving surface to the cross section of the extended portion (e.g., the first cross section S1) that is perpendicular to the orientation of the light-receiving surface.

(b) the second lightguide portion (e.g., the second lightguide portion 302) that is continuous with the first lightguide portion.

(c) the third lightguide portion (e.g., the third lightguide portion 303) whose first end is continuous with the second lightguide portion and whose second end is continuous with the surrounding portion, wherein the width of the third lightguide portion in the direction (i.e., the up-down direction) parallel to the orientation of the light-receiving surface gradually increases from the first end toward the second end.

On the wall surface (i.e., the wall surface on the upper side) that is on the opposite side from the orientation of the light-receiving surface, the second lightguide portion has a wall surface (e.g., the inner wall surface 308 shown in FIG. 33) whose interior angle with respect to the cross section is less than 90°.

With the configuration above, it is possible, with the wall surface of the second lightguide portion, to change the direction of travel of light toward the same side as the orientation of the light-receiving surface. Thus, light entering the surrounding portion from the third lightguide portion can be made more uniform with respect to the direction parallel to the orientation of the light-receiving surface.

In the exemplary embodiment, the extended portion 257 has a hole (e.g., the hole 257c) that is capable of changing the path of light having been received via the light-receiving surface. With this hole, it is possible to adjust the path of light entering the surrounding portion 256 from the extended portion 257. Moreover, in the exemplary embodiment, the hole includes a lightguide portion (e.g., the third lightguide portion 303) of the extended portion 257 whose width in the direction perpendicular to the light-receiving surface gradually increases toward the surrounding portion 256. Then, light traveling through the lightguide portion can be divided by the hole into a light component that passes through one side of the hole and another light component that passes through the other side of the hole. As a result, light entering the surrounding portion from the third lightguide portion can be made more uniform.

Note that in the exemplary embodiment, the hole (e.g., the hole 257c) in the lightguide portion has a shape of which an end portion further away from the surrounding portion 256 is tapered toward the tip thereof (see FIG. 33). Then, it is possible to reduce the possibility that light reflected at the wall surface of the hole travels toward the light-receiving surface. As a result, it is possible to increase the amount of light to be output from the light-exiting surface.

In the exemplary embodiment, the housing 211 includes an engagement portion (e.g., the tab 243b shown in FIG. 19) that engages with the hole (e.g., the hole 257c) in the lightguide portion. Thus, with the hole, light entering the surrounding portion from the third lightguide portion can be made more uniform, and it is possible to reduce the possibility that the position of the lightguide 254 is misaligned with the housing 211.

In the exemplary embodiment, as the light-emitting section 248, the spherical controller 200 includes a first light-emitting section (i.e., the left light-emitting section 248a) and a second light-emitting section (i.e., the right light-emitting section 248b) provided at a position different from the first light-emitting section. As the extended portion 257, the lightguide 254 includes a first extended portion (i.e., the left extended portion 257a) and a second extended portion (i.e., the right extended portion 257b). The first extended portion is provided so as to extend from the surrounding portion 256, and a first light-receiving surface (i.e., the light-receiving surface 306) is provided at a position opposing the first light-emitting section. The second extended portion is provided so as to extend from the surrounding portion 256, and a second light-receiving surface is provided at a position opposing the second light-emitting section (see FIG. 22). Thus, in the exemplary embodiment, extended portions are provided corresponding respectively to the two light-emitting sections, and light beams from the two extended portions can be output from one light-exiting surface, thereby increasing the amount of light to be output from the light-exiting surface.

In the exemplary embodiment, the first extended portion is provided to extend from one side in a predetermined direction (specifically, the left side) of the surrounding portion 256, and the second extended portion is provided to extend from the other side in the predetermined direction (specifically, the right side) of the surrounding portion 256. Then, it is possible to reduce the possibility that light output from the light-exiting surface becomes non-uniform.

In the exemplary embodiment, the first extended portion and the second extended portion are provided with the operation section (i.e., the joystick 212) sandwiched therebetween (see FIG. 19). That is, the first extended portion and the second extended portion are provided so that the operation section is located between the first extended portion and the second extended portion. Then, the extended portions and the operation section can be efficiently arranged inside the housing 211. For example, in the exemplary embodiment, the extended portion 257 may be located so as not to interfere with other components while avoiding the joystick 212.

In the exemplary embodiment, the spherical controller 200 includes a diffusion portion (specifically, a diffusion sheet) provided on the light-exiting surface so as to overlap at least a portion of the light-exiting surface for diffusing light output from the light-exiting surface. Thus, light output from the light-exiting surface can be made more uniform. For example, in the exemplary embodiment, portions of the slits 309 provided on the reverse side of the light-exiting surface may possibly appear brighter than other portions other than the slits 309, but it is possible, with the diffusion portion, to reduce such a possibility.

In the exemplary embodiment, the light-emitting section 248 includes a first light-emitting element for generating light of a first color, and a second light-emitting element for generating light of a second color different from the first color. The lightguide 254 outputs light through the light-exiting surface, wherein the light is obtained by mixing together the light of the first color and the light of the second color that have been received via light-receiving surfaces. Therefore, with the spherical controller 200, it is possible to increase the variety of colors of light to be output from the light-exiting surface. Note that while the light-emitting section 248 includes three light-emitting elements in the exemplary embodiment, the light-emitting section 248 may include any number (two or more) of light-emitting elements or may include only one light-emitting element in other embodiments.

In the exemplary embodiment, the extended portion 257 includes a portion that is curved (or bent) as seen from a predetermined direction (i.e., the longitudinal direction of the light-receiving surface). Then, the first light-emitting element and the second light-emitting element are arranged next to each other in the predetermined direction. Thus, it is possible to reduce the possibility that the color of the light output from the light-exiting surface appears to vary depending on the position on the light-exiting surface.

[2-4. Configuration of Strap Portion]

Next, referring to FIG. 8 and FIG. 9, the strap portion 202 will be described. As shown in FIG. 8 and FIG. 9, the strap portion 202 includes a strap chord 401. The strap chord 401 is a rope-like or belt-like chord member formed in a loop. The strap chord 401 is used by the user whose wrist is passed through the strap portion 202 when holding the controller main body 201.

In the exemplary embodiment, the strap portion 202 is fixedly attached to the controller main body 201. A strap attachment shaft (i.e., the strap attachment shaft 245c of FIG. 20) is provided inside the controller main body 201, the details of which will be described later. As shown in (f) of FIG. 10, the strap hole 211c is provided on the surface of the housing 211 of the controller main body 201. The strap chord 401 is provided so as to extend from the strap hole 211c to the outside of the housing 211 with the strap chord 401 passed around the strap attachment shaft. Therefore, in the exemplary embodiment, the strap portion 202 can be fixedly attached to the controller main body 201. According to the exemplary embodiment, the strap portion 202 can be attached firmly to the controller main body 201.

Note that in other embodiments, the spherical controller 200 may be configured so that the strap portion can be attached to and detached from the spherical controller 200. For example, in other embodiments, the strap chord may be attached to the strap attachment shaft so that it can be detached therefrom.

As shown in FIG. 8 and FIG. 9, the strap portion 202 includes an adjustment portion 403. The adjustment portion 403 is a member for adjusting the size of the loop of the strap chord 401. Specifically, two holes are provided running through the adjustment portion 403, and the strap chord 401 is passed through the holes. By pressing the portion of the strap chord 401 that is in the hole of the adjustment portion 403, the strap chord 401 is fixed relative to the adjustment portion 403. Thus, a portion of the strap chord 401 that is on the opposite side, with respect to the adjustment portion 403, from the side where the strap chord 401 is attached to the controller main body 201 forms a loop. The user holds the controller main body 201 with the user's wrist passed through the loop when using the spherical controller 200.

Herein, in the exemplary embodiment, the adjustment portion 403 includes an adjustment button 403a (see FIG. 9). Although there is no limitation on the specific mechanism of the adjustment portion 403, in the exemplary embodiment, the adjustment portion 403 presses a portion of the strap chord 401 that is in the hole while the adjustment button 403a is not being depressed, and the adjustment portion 403 does not press the strap chord 401 while the adjustment button 403a is being depressed. Therefore, while the adjustment button 403a is being depressed, the user can easily move the adjustment portion 403 relative to the strap chord 401, and while the adjustment button 403a is not being depressed, the adjustment portion 403 is fixed relative to the strap chord 401 (in other words, it is less easily moved).

Thus, the user can adjust the size of the loop formed by the strap chord 401. For example, the user adjusts the size of the loop of the strap chord 401 using the adjustment portion 403 so that the strap portion 202 does not come off the wrist of the user's hand holding the controller main body 201.

As shown in FIG. 8 and FIG. 9, the strap portion 202 includes a finger hook portion 404. The finger hook portion 404 has a ring shape with a cutout. The finger hook portion 404 is attached to the strap chord 401. Specifically, the finger hook portion 404 is provided between a portion of the strap chord 401 that is attached to the controller main body 201 and a portion thereof that is attached to the adjustment portion 403. Note that the finger hook portion 404 is movable between these two portions.

The user passes one finger (e.g., the middle finger or the ring finger) of the user's hand holding the controller main body 201 through the finger hook portion 404. Then, even when the user inadvertently lets go of the controller main body 201, the finger hook portion 404 is on the finger and it is possible to reduce the possibility that the controller main body 201 comes off the hand.

[2-5. Electrical Configuration]

Figure 37:
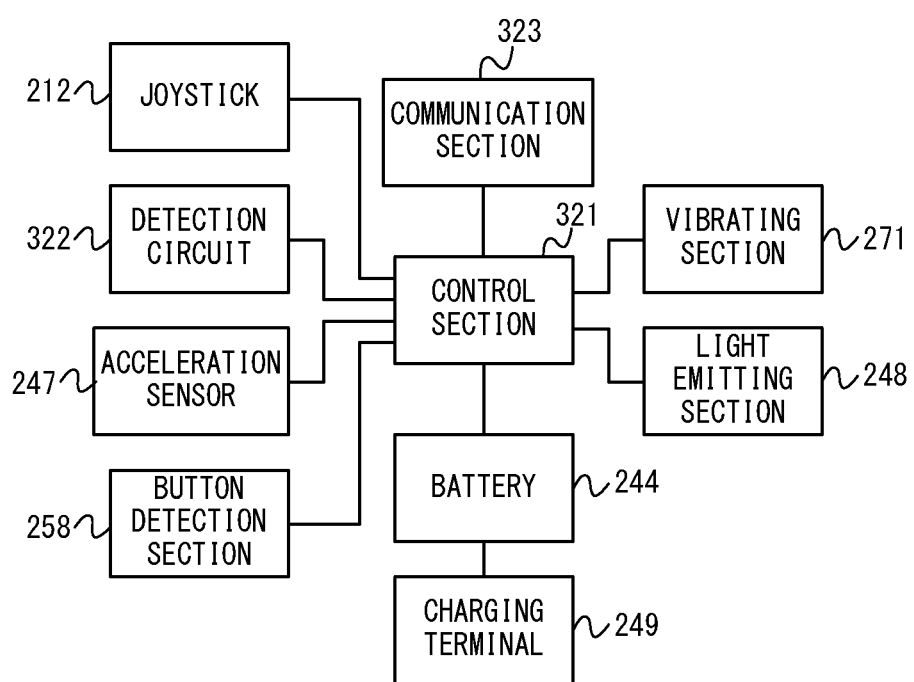
FIG. 37 is a block diagram showing an example of electric connections of a non-limiting spherical controller.

FIG. 37 is a block diagram showing electrical connections of the spherical controller 200. As shown in FIG. 37, the spherical controller 200 includes a control section 321. The control section 321 is provided on the main substrate 246. The control section 321 includes a processor and a memory for storing data. In the exemplary embodiment, the control section 321 controls the communication process with the main body apparatus 2, and controls the power supply to the various electrical components shown in FIG. 37. Note that the memory may store data used in the control operations, or may store data used in an application (e.g., a game application) using the spherical controller 200 to be executed on the main body apparatus 2.

The control section 321 is electrically connected to the input means included in the spherical controller 200. In the exemplary embodiment, as input means, the spherical controller 200 includes the joystick 212, the detection circuit 322, the acceleration sensor 247 and the button detection section 258. The detection circuit 322 is a detection circuit for detecting the key rubber 236 coming into contact with the contact 237a when the operation surface 213 described above is operated. The control section 321 obtains, from each input means, information (in other words, data) regarding operations performed on the input means.

The control section 321 is electrically connected to the communication section 323. The communication section 323 includes the antenna 291, and wirelessly communicates with the main body apparatus 2. That is, the control section 321 transmits information (in other words, data) to the main body apparatus 2 using the communication section 323 (in other words, via the communication section 323), and receives information (in other words, data) from the main body apparatus 2 using the communication section 323. For example, the control section 321 transmits information obtained from the joystick 212, the detection circuit 322 and the acceleration sensor 247 to the main body apparatus 2 via the communication section 323. Note that in the exemplary embodiment, the communication section 323 (and/or the control section 321) functions as a transmission section for transmitting information regarding the operation performed on the joystick 212 to the main body apparatus 2. The communication section 323 (and/or the control section 321) also functions as a transmission section for transmitting information regarding the operation performed on the operation surface 213 to the main body apparatus 2. The communication section 323 (and/or the control section 321) functions as a transmission section for transmitting information output from the acceleration sensor 247 to the main body apparatus 2. In the exemplary embodiment, the communication section 323 performs communication compliant with the Bluetooth (registered trademark) standard with the main body apparatus 2.

Note that in other embodiments, the communication section 323 may perform wired communication with the main body apparatus 2, instead of wireless communication. The communication section 323 may have both functions of performing wireless communication and performing wired communication with the main body apparatus 2.

The control section 321 is electrically connected to output means included in the spherical controller 200. In the exemplary embodiment, as output means, the spherical controller 200 includes the vibrating section 271 and the light-emitting section 248. The control section 321 controls the operation of the output means. For example, the control section 321 may refer to the information obtained from the input means and control the operation of the output means in accordance with the operation performed on the input means. For example, the control section 321 may vibrate the vibrating section 271 or light the light-emitting section 248 in response to the operation surface 213 being depressed. For example, the control section 321 may control the operation of the output means based on information received from the main body apparatus 2 via the communication section 323. That is, the control section 321 may vibrate the vibrating section 271 or light the light-emitting section 248 in response to a control command from the main body apparatus 2. The main body apparatus 2 may transmit, to the spherical controller 200, a signal representing a waveform used for vibrating the vibrating section 271, and the control section 321 may vibrate the vibrating section 271 in accordance with the waveform. That is, the antenna 291 of the communication section 323 may receive a signal for vibrating the vibrating section 271 from outside (i.e., the main body apparatus 2), and the vibrating section 271 may vibrate based on the signal received via the antenna 291. Note that in the exemplary embodiment, since the vibrating section 271 is a voice coil motor capable of outputting a sound, the control section 321 can also cause the vibrating section 271 to output a sound in accordance with the waveform.

The control section 321 is electrically connected to the rechargeable battery 244. The control section 321 controls the power supply from the rechargeable battery 244 to the various input means, the various output means and the communication section. Note that the rechargeable battery 244 may be connected directly to the various input means, the various output means and the communication section. In the exemplary embodiment, the control section 321 controls the power supply based on information obtained from the button detection section 258 (i.e., information representing whether or not the reboot button 214 is being depressed). Specifically, when the reboot button 214 is depressed (in other words, while it is being depressed), the power supply from the rechargeable battery 244 to the various input means, the various output means and the communication section is stopped. When the reboot button 214 is not depressed (in other words, while it is not being depressed), the control section 321 supplies power from the rechargeable battery 244 to the various input means, the various output means and the communication section. Thus, in the exemplary embodiment, the reboot button 214 is a button for giving an instruction to reboot (in other words, reset) the spherical controller 200. It can also be said that the reboot button 214 is a button for giving an instruction to turn ON/OFF the power supply of the spherical controller 200.

The rechargeable battery 244 is electrically connected to the charging terminal 249 described above. The charging terminal 249 is a terminal for connecting a charging device (not shown) (e.g., an AC adaptor, etc.). In the exemplary embodiment, the charging terminal 249 is a USB connector (more specifically, a female connector). In the exemplary embodiment, when a charging device, to which commercial power is supplied, is electrically connected to the charging terminal 249, power is supplied to the rechargeable battery 244 via the charging terminal 249, thereby charging the rechargeable battery 244.

[3. Variations]

(Variations Regarding Joystick)

In the embodiment described above, the spherical controller 200 includes, as a direction input section, a joystick having a shaft portion that can be tilted. Herein, in other embodiments, the spherical controller 200 may include, as a direction input section, any input device that is capable of making a direction input. For example, in a variation of the embodiment described above, the direction input section may be an input device having a slide portion that is slidable (specifically, a slide stick). That is, the spherical controller 200 may include a direction input section having a slide portion that is slidable at least a portion of which is exposed through the opening 211a. According to this variation, the user can use a game controller having a spherical outer shape and perform a direction input operation by sliding a slide portion. Then, also in this variation, as in the embodiment described above, it is possible to improve the usability of a game controller having a spherical outer shape. In other embodiments, the direction input section may be a cross-shaped key. Note that in the exemplary embodiment, by using a joystick having a shaft portion that can be tilted, it is possible to reduce the size of the opening 211a of the housing 211. Thus, the shape of the controller main body 201 as seen from outside can be made closer to a sphere.

(Variations Regarding Shape of Game Controller)

The embodiment above has been directed to an example of a game controller having a spherical outer shape (i.e., the spherical controller 200). Herein, in other embodiments, the game controller may have any outer shape. For example, the configuration in which the lightguide 254 described above is used to emit light to the outside of the game controller is applicable to a game controller of any shape. That is, even when the lightguide is used in any game controller whose outer shape is not spherical, it is possible to improve the degree of freedom in the arrangement of the light-emitting section as in the embodiment described above.

(Variations Regarding Communication)

In the embodiment described above, the spherical controller 200 includes a transmission section (i.e., the communication section 323) for transmitting information (e.g., information regarding operations on the joystick and information regarding operations on the operation surface) to the outside. Herein, "transmit information to the outside" is not limited to the transmission of information to the main body apparatus 2, but means to include embodiments where information is transmitted to any other apparatus other than the spherical controller 200. That is, in a variation of the embodiment described above, the spherical controller 200 may be capable of communicating with other types of information processing apparatuses other than the main body apparatus 2. For example, the spherical controller 200 may be capable of wirelessly communicating with a smartphone and/or a tablet, or may be capable of wirelessly communicating with other types of portable game apparatuses other than the main body apparatus 2. The spherical controller 200 may communicate with another game controller (e.g., the left controller 3 or the right controller 4 described above). Then, information from the spherical controller 200 may be transmitted to an information processing apparatus (e.g., the main body apparatus 2) via the other game controller. Note that in this variation, the communication between the spherical controller 200 and the other apparatus may be wireless communication or may be wired communication.

(Variations Regarding Controller)

The embodiment described above has been directed to the spherical controller 200 as an example of a game controller for use in video games. Herein, the spherical controller 200 may be used for any other applications other than video games. For example, when an information processing program (e.g., a browser) different from a game program is executed on the main body apparatus 2, the spherical controller 200 may be a controller (in other words, the controller device) used for performing operations related to the information processing program.

The embodiment described above is applicable for example to game controllers, and the like, with the aim of allowing for various types of operations, for example.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A game controller comprising:
   a spherical housing including a first hemispherical portion and a second hemispherical portion;
   a joystick protruding from a surface of the spherical housing, the joystick is positioned at a boundary between the first hemispherical portion and the second hemispherical portion;
   an operation section having an operation surface that is capable of being depressed and is integral with the surface of the spherical housing, the operation surface of the operation section is at an apex portion of the first hemispherical portion; and
   a transmitter transmitting, to outside, information regarding an operation on the joystick and information regarding an operation on the operation section.

2. The game controller according to claim 1, wherein where a direction in which a shaft portion of the joystick is tilted in order to give an up instruction is defined as an upward direction, the operation surface of the operation section is at a position that crosses a straight line that extends in the upward direction from a center of the spherical housing.

3. The game controller according to claim 1, wherein where a direction in which a shaft portion of the joystick is tilted in order to give an up instruction is defined as an upward direction, the operation surface of the operation section is on an upward direction side relative to the joystick.

4. The game controller according to claim 1, wherein the transmitter includes an antenna; and
   the antenna is inside the first hemispherical portion.

5. The game controller according to claim 1, wherein:
   the operation section includes a movable portion that is covered by the spherical housing and the operation surface of the operation section and moves in response to the operation surface of the operation section being depressed, the movable portion is capable of pivoting about a rotation shaft that is substantially perpendicular to a straight line that connects between a center of the spherical housing and a center of the operation surface of the operation section and the rotation shaft is at such a position that a distance from the joystick to the rotation shaft is shorter than a distance from the joystick to the operation surface of the operation section; and
   the game controller comprises a detector configured to detect an operation on the operation surface of the operation section in response to the movement of the movable portion, the detector is configured to detect an operation on the operation surface of the operation section in response to the pivoting of the movable portion.

6. The game controller according to claim 1, wherein the spherical housing includes:
   a first portion that is surrounding the joystick; and
   a second portion that is surrounding the first portion and whose surface is made of a material softer than a surface of the first portion.

7. The game controller according to claim 1, wherein at least a portion of a surface of the spherical housing is made of an elastic material.

8. The game controller according to claim 1, further comprising an inertia sensor in a vicinity of a center of the spherical housing.

9. The game controller according to claim 1, wherein the spherical housing includes a strap hole thereon at a position on a straight line extended from a center of the spherical housing in a direction opposite to a direction from the center of the spherical housing toward a center of an operation surface of the joystick, wherein a strap can be attached to the strap hole.

10. The game controller according to claim 1, further comprising a reboot button used to reboot the game controller,
    wherein an operation surface of the reboot button is recessed from a surface of the spherical housing.

11. A game controller comprising:
    a spherical housing including:
       a hemispherical first housing part; and
       a hemispherical second housing part;
    a joystick protruding from a surface of the spherical housing, the joystick is positioned between the first housing part and the second housing part;
    an operation section having an operation surface that is capable of being depressed and is integral with the surface of the spherical housing, the operation surface of the operation section is at an apex portion of the first housing part; and
    a transmitter transmitting, to outside, information regarding an operation on the joystick and information regarding an operation on the operation section.

12. The game controller according to claim 11, wherein:
    the transmitter includes an antenna; and
    the antenna is inside the first housing part.

13. The game controller according to claim 11, wherein where a direction in which a shaft portion of the joystick is tilted in order to give an up instruction is defined as an upward direction, the operation surface of the operation section is at a position that crosses a straight line that extends in the upward direction from a center of the spherical housing.

14. The game controller according to claim 11, wherein:
    the operation section includes a movable portion that is covered by the spherical housing and the operation surface of the operation section and moves in response to the operation surface of the operation section being depressed, the movable portion is capable of pivoting about a rotation shaft that is substantially perpendicular to a straight line that connects between a center of the spherical housing and a center of the operation surface of the operation section and the rotation shaft is at such a position that a distance from the joystick to the rotation shaft is shorter than a distance from the joystick to the operation surface of the operation section; and the game controller comprises a detector configured to detect an operation on the operation surface of the operation section in response to the movement of the movable portion, the detector is configured to detect an operation on the operation surface of the operation section in response to the pivoting of the movable portion.

15. The game controller according to claim 11, wherein the spherical housing includes a strap hole thereon at a position on a straight line extended from a center of the spherical housing in a direction opposite to a direction from the center of the spherical housing toward a center of an operation surface of the joystick, wherein a strap can be attached to the strap hole.

16. The game controller according to claim 11, wherein where a direction in which a shaft portion of the joystick is tilted in order to give an up instruction is defined as an upward direction, the operation surface of the operation section is on an upward direction side relative to the joystick.

17. The game controller according to claim 11, wherein the spherical housing includes:
a first portion that is surrounding the joystick; and
a second portion that is surrounding the first portion and whose surface is made of a material softer than a surface of the first portion.

18. The game controller according to claim 11, wherein at least a portion of a surface of the spherical housing is made of an elastic material.

19. The game controller according to claim 11, further comprising an inertia sensor in a vicinity of a center of the spherical housing.

20. The game controller according to claim 11, further comprising a reboot button used to reboot the game controller,
wherein an operation surface of the reboot button is recessed from a surface of the spherical housing.

21. A game controller comprising:
a spherical housing including a first hemispherical portion and a second hemispherical portion;
a joystick protruding from a surface of the spherical housing;
an operation section having an operation surface that is capable of being depressed and is integral with the surface of the spherical housing;
a boundary between the first hemispherical portion and the second hemispherical portion includes a line portion that appears linear as the game controller is seen in a direction from a center of an operation surface of the joystick toward a center of the spherical housing, wherein the joystick is on an extension of the line portion as the game controller is seen from a direction from the center of the operation surface of the joystick toward the center of the spherical housing; and
a transmitter transmitting, to outside, information regarding an operation on the joystick and information regarding an operation on the operation section.

22. The game controller according to claim 21, wherein the line portion is formed on both sides of the joystick.

23. The game controller according to claim 21, wherein where a direction in which a shaft portion of the joystick is tilted in order to give an up instruction is defined as an upward direction, the operation surface of the operation section is at a position that crosses a straight line that extends in the upward direction from a center of the spherical housing.

24. The game controller according to claim 21, wherein:
the operation section includes a movable portion that is covered by the spherical housing and the operation surface of the operation section and moves in response to the operation surface of the operation section being depressed, the movable portion is capable of pivoting about a rotation shaft that is substantially perpendicular to a straight line that connects between a center of the spherical housing and a center of the operation surface of the operation section and the rotation shaft is at such a position that a distance from the joystick to the rotation shaft is shorter than a distance from the joystick to the operation surface of the operation section; and the game controller comprises a detector configured to detect an operation on the operation surface of the operation section in response to the movement of the movable portion, the detector is configured to detect an operation on the operation surface of the operation section in response to the pivoting of the movable portion.

25. The game controller according to claim 21, wherein the spherical housing includes a strap hole thereon at a position on a straight line extended from a center of the spherical housing in a direction opposite to a direction from the center of the spherical housing toward a center of an operation surface of the joystick, wherein a strap can be attached to the strap hole.

26. The game controller according to claim 21, wherein where a direction in which a shaft portion of the joystick is tilted in order to give an up instruction is defined as an upward direction, the operation surface of the operation section is on an upward direction side relative to the joystick.

27. The game controller according to claim 21, wherein the spherical housing includes:
a first portion that is surrounding the joystick; and
a second portion that is surrounding the first portion and whose surface is made of a material softer than a surface of the first portion.

28. The game controller according to claim 21, wherein at least a portion of a surface of the spherical housing is made of an elastic material.

29. The game controller according to claim 21, further comprising an inertia sensor in a vicinity of a center of the spherical housing.

30. The game controller according to claim 21, further comprising a reboot button used to reboot the game controller,
wherein an operation surface of the reboot button is recessed from a surface of the spherical housing.

31. A game controller comprising:
a spherical housing including a first housing part, a second housing part and a spherical zone-shaped third housing part between the first housing part and the second housing part;
a joystick protruding from a surface of the spherical housing, the joystick is at least partially within the third housing part;
an operation section having an operation surface that is capable of being depressed and is integral with the surface of the spherical housing; and a transmitter transmitting, to outside, information regarding an operation on the joystick and information regarding an operation on the operation section.

32. The game controller according to claim 31, wherein where a direction in which a shaft portion of the joystick is tilted in order to give an up instruction is defined as an upward direction, the operation surface of the operation section is at a position that crosses a straight line that extends in the upward direction from a center of the spherical housing.

33. The game controller according to claim 31, wherein:
the operation section includes a movable portion that is covered by the spherical housing and the operation surface of the operation section and moves in response to the operation surface of the operation section being depressed, the movable portion is capable of pivoting about a rotation shaft that is substantially perpendicular to a straight line that connects between a center of the spherical housing and a center of the operation surface of the operation section and the rotation shaft is at such a position that a distance from the joystick to the rotation shaft is shorter than a distance from the joystick to the operation surface of the operation section; and
the game controller comprises a detector configured to detect an operation on the operation surface of the operation section in response to the movement of the movable portion, the detector is configured to detect an operation on the operation surface of the operation section in response to the pivoting of the movable portion.

34. The game controller according to claim 31, wherein the spherical housing includes a strap hole thereon at a position on a straight line extended from a center of the spherical housing in a direction opposite to a direction from the center of the spherical housing toward a center of an operation surface of the joystick, wherein a strap can be attached to the strap hole.

35. The game controller according to claim 31, wherein where a direction in which a shaft portion of the joystick is tilted in order to give an up instruction is defined as an upward direction, the operation surface of the operation section is on an upward direction side relative to the joystick.

36. The game controller according to claim 31, wherein the spherical housing includes:
a first portion that is surrounding the joystick; and
a second portion that is surrounding the first portion and whose surface is made of a material softer than a surface of the first portion.

37. The game controller according to claim 31, wherein at least a portion of a surface of the spherical housing is made of an elastic material.

38. The game controller according to claim 31, further comprising an inertia sensor in a vicinity of a center of the spherical housing.

39. The game controller according to claim 31, further comprising a reboot button used to reboot the game controller,
wherein an operation surface of the reboot button is recessed from a surface of the spherical housing.

* * * * *